(12) United States Patent  (10) Patent No.: US 7,062,913 B2
Christensen et al.  (45) Date of Patent: Jun. 20, 2006

(54) HEAT ENGINE

(75) Inventors: Richard N. Christensen, Upper Arlington, OH (US); Jiming Cao, Dublin, OH (US); E. Thomas Henkel, Chapel Hill, NC (US)

(73) Assignee: The Ohio State University, Columbus, OH (US)

( * ) Notice: Subject to any disclaimer, the term of this patent is extended or adjusted under 35 U.S.C. 154(b) by 471 days.

(21) Appl. No.: 10/168,169

(22) PCT Filed: Dec. 15, 2000

(86) PCT No.: PCT/US00/34015

§ 371 (c)(1),
(2), (4) Date: Jun. 15, 2002

(87) PCT Pub. No.: WO01/44658

PCT Pub. Date: Jun. 21, 2001

(65) Prior Publication Data

US 2003/0000213 A1 Jan. 2, 2003

Related U.S. Application Data

(60) Provisional application No. 60/243,164, filed on Oct. 25, 2000, and provisional application No. 60/172,188, filed on Dec. 17, 1999.

(51) Int. Cl.
*F01K 25/08* (2006.01)

(52) U.S. Cl. .............. 60/651; 60/653; 60/671; 60/679

(58) Field of Classification Search ............ 60/653, 60/679, 680, 681, 651, 671, 618; 110/245, 110/345
See application file for complete search history.

(56) References Cited

U.S. PATENT DOCUMENTS

| 3,774,397 | A | * | 11/1973 | Engdahl ................ 60/107 |
|---|---|---|---|---|
| 3,979,914 | A |   | 9/1976 | Weber |
| 4,044,559 | A | * | 8/1977 | Kelly ................ 60/525 |
| 4,185,465 | A | * | 1/1980 | Shaw ................ 60/678 |
| 4,237,696 | A | * | 12/1980 | Coblentz ................ 62/93 |
| 4,307,574 | A | * | 12/1981 | Gamell ................ 60/676 |
| 4,712,380 | A |   | 12/1987 | Smith |
| 4,712,610 | A | * | 12/1987 | Kesten et al. ......... 165/104.12 |
| 4,882,907 | A | * | 11/1989 | Brown, II ................ 60/649 |
| 5,033,413 | A | * | 7/1991 | Zenz et al. ............ 122/4 D |
| 5,228,293 | A |   | 7/1993 | Vitale |
| 5,522,356 | A | * | 6/1996 | Palmer ................ 123/236 |
| 5,526,646 | A |   | 6/1996 | Bronicki et al. |
| 6,029,454 | A |   | 2/2000 | Kefer et al. |
| 6,195,997 | B1 |   | 3/2001 | Lewis et al. ............ 60/648 |
| 6,250,100 | B1 |   | 6/2001 | Funai et al. ............ 62/497 |

* cited by examiner

*Primary Examiner*—Hoang Nguyen
(74) *Attorney, Agent, or Firm*—Kremblas, Foster, Philips & Pollick

(57) ABSTRACT

A heat engine (10) achieves operational efficiencies by: 1) recovering waste heat from heat engine expander (14) to preheat heat-engine working fluid, 2) using super-heated working fluid from compressor (402) to pre-heat heat-engine working fluid, and 3) using reject heat from condenser (93) and absorber (95) to heat the heat-engine boiler (12). A dual heat-exchange generator (72) affords continuous operation by using gas-fired heat exchanger (212) to heat generator (72) when intermittent heat source (40), e.g., solar, is incapable of heating generator (72). The combination of heat engine (10) and absorption and compression heat transfer devices (60, 410) allows use of low-temperature heat sources such as solar, bio-mass, and waste heat to provide refrigeration, heating, work output including pumping and heating of subterranean water and electrical generation.

99 Claims, 37 Drawing Sheets

HEAT ENGINE

CROSS REFERENCE TO RELATED APPLICATIONS

This application is the United States national stage of and claims the benefit of PCT Application PCT/US00/34015 filed on Dec. 15, 2000 (published as WO 01/44658 on Jun. 21, 2001) which claims the benefit of U.S. Provisional Application 60/172,188 filed on Dec. 17, 1999 and U.S. Provisional Application 60/243,164 filed on Oct. 25, 2000 all of which are incorporated by reference as if completely written herein.

BACKGROUND OF THE INVENTION

1. Field of the Invention

This invention pertains to heat engines more particularly to the use of heat engines in combination with various low energy heat sources and cooling and/or heating absorption and compression cycles and the use of heat engine working fluid to preheat a boiler and capture frictional and other heat loss from an expander and other pumps in the system.

2. Background of the Invention

In most of the developing third world, adequate supplies of drinking water and water for irrigation are a scarce commodity. In many places in Africa, India and Central and South America, adequate supplies of water are found only at considerable depth below the surface. These locations generally do not have the infrastructure to provide an electrical grid to pump the water with electricity nor do they have the infrastructure to provide roads to bring in electrical generators or even the fuel for those generators.

Therefore without an electrical grid, or without generators to generate electricity, isolated areas do not have potable water nor do they have the refrigeration to keep medicine or foodstuffs from spoiling. Even in the United States, there are communities such as the Amish communities where electricity is banned. Here the lack of cooling capabilities severely limits the production of various products. Because of the lack of cooling, milk production is limited to Grade B.

To solve these problems, it is an object of this invention to make use of an improved efficiency heat engine in combination with a variety of energy sources and absorption or compression heat transfer devices.

It is also an object of the present invention to provide for heat engine working-fluid heat recovery from an expander exhaust stream.

Also an object of the present invention is to provide for heat engine pump cooling using the heat engine working fluid.

A further object of the present invention is to provide for heat engine expander cooling using the heat engine working fluid.

Another object of the present invention is to improve heat engine efficiency by effective use of ground water.

Another object of the present invention is to provide for effective heat engine condenser cooling.

Another object of the present invention is to use the heat engine expander for electricity generation.

Another object of the present invention is to use a variety of heat sources for heat engine boiler operation.

It is another object of the present invention to use low energy heat sources such as solar, dung, combustion engine coolant heat and exhaust heat, and industrial discharge waste heat.

Another object of the present invention is to use an absorption cycle as a heat source for heat engine boiler operation.

Another object of the present invention is to use a generator-absorber heat exchange device as a heat source for the heat engine boiler.

Another object of the present invention is to use the absorber and condenser as a heat source for the heat engine boiler.

Another object of the present invention is to use a heat source for heating the heat engine boiler or the heating/cooling device or both.

Another object of this invention is to improve the operating efficiency of a close-coupled expander and compression heat transfer device.

Another object of this invention is to lower the cost of space heat and cooling using a close coupled expander and compression heat transfer device.

Yet another object of this invention is to use the superheat of a working fluid in a compression heat transfer device as a pre-heater to a boiler in a heat engine.

Another object of this invention is to use the working fluid from a heat engine to cool the compressor of a compression heat transfer device.

A further object of the present invention is to provide a dual heat-exchange generator for an absorption chiller system that enhances energy efficiencies.

Another object of the present invention is to provide a dual heat-exchange generator that utilizes solar energy as a main energy source.

Another object of the present invention is to provide a dual heat-exchange generator that utilizes fossil-fuel heating as a back-up heating mode when solar energy is unavailable or insufficient.

Another object of the present invention is to provide a dual heat-exchange absorption system generator that reduces initial capital costs of the absorption system.

It is another object of the present invention to provide a dual heat exchange generator that improves the environment by reducing absorption system dependence on fossil-based energy.

A further object of the present invention is to provide an absorption system generator that eliminates ozone-depleting chlorofluorocarbons found in electrically driven cooling systems.

It is an object of the present invention to provide a solar-based absorption cooling system that eliminates the need for backup generators during periods of reduced or non-existent solar energy.

It is an object of the present invention to provide an absorption cooling system that reduces the increasing summer electric demand for air-conditioner operation.

It is an object of the present invention to provide an absorption cooling system that reduces the amount of Greenhouse emissions associated with fossil-fuel produced electricity and fossil-fuel based absorption cooling systems.

The foregoing and other objects of the present invention will become apparent from the following disclosure In which one or more preferred embodiments of the invention are described and illustrated in detail.

SUMMARY OF THE INVENTION

A heat engine operating with a low boiling working fluid and a positive displacement rotating expander such as a gerotor or scroll obtains improved efficiencies using superheated working fluid to preheat the fluid prior to entering the boiler or use of cool working fluid to cool systems pumps and the expander. The heat engine is combined with a variety of absorption and compression heat transfer devices to use low temperature heat sources such as solar, bio-mass, and waste heat to provide refrigeration, and heating, work output including pumping and heating of subterranean water and electrical generation.

A heat engine comprises a boiler with an inlet and an outlet connected to receive a liquid working fluid and vaporize the fluid to a vapor on input of heat from a heat source input. A positive displacement rotating expander such as a scroll or gerotor with an inlet and outlet is adapted for receiving and expanding the vapor from the boiler outlet at high pressure to produce a work output and provide the vapor at low pressure at the expander outlet. A condenser with an inlet for receiving vapor from the expander outlet condenses the vapor back to a liquid. A pump with an inlet and outlet receives the liquid working fluid from the condenser at low pressure and provides it to the boiler inlet at high pressure.

The working fluid typically is a refrigerant such as the chlorofluroethanes R113 or R123 or ammonia. The operating pressures and temperatures of such refrigerants are considerably lower than the operating pressures and temperatures of the usual water working fluid used in heat engines. Because of the lower operating temperatures, a wide variety of heat sources can be used with the expander including solar arrays, geothermal input, waste heat, biomass combustion heat, and fossil fuel combustion heat.

Because of the availability of organic and ammonia superheats, superheated working fluid from the expander outlet can be used to pre-heat the working fluid by passing it through a heat exchanger before it enters the boiler thereby considerably improving the efficiencies of the heat engine. In addition, cool working fluid leaving the condenser can be used to recapture otherwise lost work heat from the pump and expander by passing the cool working fluid through heat exchange passages and jackets in and on the pump and expander. This captured heat likewise preheats the working fluid prior to its entry into the boiler and improves heat engine operational efficiencies.

Using readily available heat sources such as biomass, solar panels, or even dung, the heat engine becomes a ready source of electricity by coupling the expander work output to an electrical generator and can provide electricity to satisfy many basic needs for food and shelter in underdeveloped countries. The work output can also be used to pump ground water from underground wells and reservoirs thereby providing a ready source of potable water in areas of water sacristy. By passing the cool ground water through a heat exchanger in the condenser in order to cool the condenser, additional heat engine efficiencies are obtained as compared to air cooling of the condenser. The heated water from the condenser heat exchanger can be stored in tanks to provide a source of hot potable water.

By coupling the heat engine with an absorption heat transfer device, a wide variety of refrigeration and heating and cooling needs can be satisfied. Many ways of coupling the various components of the heat engine and absorption heat transfer device can be used.

The basic absorption heat transfer device consists of interconnected components including a generator to separate a strong solution into its refrigerant vapor and absorbent components through the application of heat, a condenser for liquefying the refrigerant vapor with the release of heat, an evaporator for evaporating the refrigerant vapor with the application of heat, and an absorber for combining the refrigerant vapor with the absorbent to form a strong solution with the release of heat. After the refrigerant vapor and the absorbent are combined in the absorber to form the strong solution, the strong solution is sent to the generator to repeat the cycle. A pump is used to pressurize the strong solution as it moves to the high pressure generator. Pressure control devices are used to lower the pressure of the high pressure refrigerant as it moves from the condenser to the evaporator and the high pressure absorbent as it moves from the high pressure generator to the low pressure absorber.

In a basic combination, the heat engine and absorption device are combined by sharing a common heat source such as a solar array. A heat transfer loop with an interconnected heat source heat-exchanger, a generator heat exchanger, a boiler heat exchanger and a pump for circulating a heat transfer fluid among the components can be plumbed with valves to provide heat to both the generator and the boiler in parallel or series flow or to one or the other devices. Heat from the heat source is transferred to the heat-transfer fluid in the heat source exchanger. The hot heat-transfer fluid is then pumped to the generator heat exchanger or the boiler heat exchanger or both in either parallel or series relation depending on the plumbing and valve settings.

One disadvantage of this arrangement is that when the absorption heat transfer device is used for cooling, the heat from the condenser and evaporator is put to no further use and discharged to a heat sink such as a cooling tower. To take advantage of this lost heat, a second heat transfer loop having interconnected components including an absorber heat exchanger, an absorption device condenser heat exchanger, a boiler heat exchanger and a heat transfer fluid pump is incorporated into the system. In this arrangement, the heat source, e.g., solar panel, is used to heat only the generator by means of the heat source heat exchanger and generator heat exchanger heat transfer loop. The second heat transfer loop transfers heat from the absorber and condenser to the boiler heat exchanger to operate the heat engine. To further improve system efficiencies, the boiler and boiler heat exchanger can be removed from the second heat transfer loop. In this embodiment, the heat exchanger in the absorber or condenser or both can be used as the boiler for the heat engine. For a further increase in absorption device efficiency, a portion of the absorber and a portion of the generator of the absorption device can be operated so that heat exchange takes place between these two portions of the absorber and generator which is commonly referred to as a generator-absorber heat-exchange absorption device.

The disadvantage to using the absorber and/or condenser as the boiler for the heat engine is that it assumes that heat at these two components is always available. However, when a heat source such as a solar array is used, nights and inclement weather may preclude absorption device operation. In such a situation, a backup boiler may be added to the absorber/condenser heat transfer loop with appropriate valves to direct heat transfer fluid to either the absorber/condenser boiler arrangement or to the backup boiler. In addition to the solar heat source, an alternate heat source such as a gas-fired burner is plumbed into the heat source heat transfer loop.

As a further refinement to the overall heat engine and absorption heat-transfer device system, a three loop heat exchanger system can be used. In this arrangement, the heat source heat transfer loop is used to heat the boiler and transfer heat to a second heat transfer loop via a first to second loop heat exchanger. The hot heat-transfer fluid in the second loop heats the generator after which it is used to heat the heat transfer fluid (in the same second loop) in a recuperator that transfers heat to the heat transfer fluid as it goes to the first to second loop heat exchanger. Remaining available heat in the second heat transfer loop is transferred to heat-transfer fluid in a third loop via a second to third loop heat exchanger. After the final transfer of heat to the third loop, the cool heat transfer fluid in the second loop picks up heat (cools) the heat engine absorber. It then passes to the recuperator where it receives additional heat from the second loop heat transfer fluid coming from the generator. The second-loop heat-transfer fluid leaves the recuperator and returns to the first to second loop heat exchanger to repeat the process. Finally the third heat transfer loop consists of an absorption device condenser heat exchanger, an absorber heat exchanger, a second to third loop heat exchanger, a heat sink (cooling tower) and a pump to circulate a third heat transfer fluid among the third loop components. The cool third heat-transfer fluid coming from the cooling tower is pumped to the absorption device condenser and absorber where it picks up heat via the condenser and absorber heat exchangers. It then passes to the second to third loop heat exchanger where it acquires additional heat from the second loop heat transfer fluid after which it passes to the cooling tower to discharge the heat to the environment.

As noted above with respect to the use of the absorber absorption device condenser as a boiler for the heat engine, a lost of the primary generator heat source may mean loss of heat engine power for electrical or pumping operations and the loss of heat and cooling by the absorption system. Such loss of generator and/or boiler heat source is the rule rather than the exception when using a heat source such as a solar array. Also as noted above, this situation can be remedied by the use of a backup heat source and, if necessary, a backup heat engine boiler. As will be seen, another alternative to the loss of the primary heat source is the use of a dual heated generator in which two heat sources are provided to heat the absorption system generator. This has the significant advantage that if the first heat source is down, the second heat source continues to heat the generator and advantage can be taken of otherwise lost condenser and absorber heat.

In this configuration, the heat engine and absorption heat transfer device have the same basic configuration as described above, i.e., the heat engine has an interconnected boiler, expander, condenser, and pump while the absorption heat transfer device has an interconnected generator, absorber, condenser, and evaporator. The system also has two heat sources; a high-temperature heat-exchange loop having an interconnected a) heat-source heat exchanger, b) a generator first heat exchanger, and c) a high-temperature pump circulating a heat-transfer medium through the high-temperature loop; a generator second heat exchanger; and a low temperature heat-exchange loop comprising an interconnected a) absorption heat-transfer device condenser heat exchanger, b) absorber heat exchanger, c) a boiler heat exchanger, and d) a low-temperature pump for circulating a heat-transfer medium in the high-temperature loop. The first heat source is configured to transfer heat to the heat-source heat exchanger. The second heat source is configured to transfer heat to the generator second heat exchanger. The generator first heat exchanger and the generator second heat exchanger are configured to transfer heat to the generator. The absorption heat transfer device condenser transfers heat to the absorption heat transfer device condenser heat exchanger. The absorber transferring heat to said absorber heat exchanger. And the heat-engine boiler heat exchanger transferring heat to said boiler. Such a system is particularly effective when the first heat source is a solar array and the second heat source is a gas burner. In such a situation, the gas burner can be ignited and heat delivered to the generator when solar power is not available, i.e., the gas burner serves as a backup heat source. In a basic configuration, the generator second heat exchanger is a vertical annular tube. Hot combustion gases from the gas burner are passed through the annular interior space of the tube heat the tube and transferring heat to the strong solution within the generator and contacting the outside of the vertical annular tube. The generator heat sources can transfer heat to the generator individually or both may be used together such as when the primary heat source is only partially available, e.g., a solar array operating at half power because of overcast skies.

In another two generator heat source system, the first heat source transfers heat both to the boiler and to the generator. When insufficient heat is available to the generator from the first heat source, the second heat source is used to transfer heat to the generator. Depending on the operational temperatures of the heat engine and the absorption heat transfer device, it may be possible to use relatively cool heat transfer fluid coming from the first generator heat exchanger to cool the heat engine condenser prior to returning to the first heat source.

A three fluid space generator is used with the dual heat source configuration. A substantially first vertical surface separates a first fluid space from a second fluid space and a substantially second vertical surface separates the first fluid space from a third fluid space. The first fluid space is typically an annular space formed by an inclosure consisting of a center portion of an inner cylinder, 2) a center portion of an outer cylinder, 3) an upper separation plate, and 4) a lower separation plate. An upper passage provides for the entrance of strong solution and egress of refrigerant vapor while a lower passage provides for egress of a weak (absorbent) liquid. The upper passage may be formed as two separate ports, an inlet for the strong solution and an outlet for the refrigerant vapor.

The first fluid space contains the generator and has a downward flowing liquid, i.e., the strong solution, and an upward flowing gas within said downward flowing liquid. That is, as the refrigerant separates from the absorbent with the application of heat, it forms vapor bubbles in the strong solution that bubble upward in the downward flowing solution. A fluid distribution surface with an aperture formed in it provides for the downward passage and distribution of said downward flowing liquid and the upward passage and distribution of said upward flowing gas in the first fluid space. The fluid distribution surface is substantially perpendicular to the first vertical surface that separates the first fluid space from the second fluid space and the second vertical surface that separates the first fluid space from the third fluid space. The fluid distribution surface is typically formed as an annular plate when used with an annular first fluid space. The aperture in the plate is formed by removing a pie-shaped segment from the annular plate and is of sufficient size to pass both said liquid and said vapor through it. Several plates are arranged in spaced-apart relation with each other in the annular first fluid space with the aperture of each successively spaced-apart annular plate being place on the side opposite the aperture of the previous plate.

The second fluid space contains a first heat-transfer fluid that heats the first fluid space and the third fluid space contains a second heat-transfer fluid that transfers heat to the first fluid space. The vertical surface separating the first fluid space from the second fluid space typically is an open inner cylinder with the center of said cylinder forming the second fluid space. The first fluid space is an annular space formed by an enclosure that is formed from the center portion of the open inner cylinder outer surface, 2) the center portion of an outer cylinder inner surface, 3) an upper separation plate, and 4) a lower separation plate.

The vertical surface separating said first fluid space from said third fluid space is typically a tube. Preferably several vertical tubes are used. The vertical tubes are joined at the top so as to be open to an annular upper manifold formed from an upper portion of an outer cylinder, an upper portion of an inner cylinder, c) a top, and an upper separation plate. The manifold contains a port or passage for the entrance or exit of a heat exchange fluid.

The tubes are joined at their lower ends into an annular lower manifold that is formed from a) a lower portion of the outer first fluid cylinder, b) a lower portion of the inner second fluid cylinder, c) a lower separation plate, and d) a bottom. As with the upper manifold, the lower manifold has a port or passage for the passage of a second heat-transfer fluid. In operation, the heat-transfer fluid enters the passage in one of the manifolds and flows through the vertical tubes to the to the other manifold at the other end of the tubes and then exits through the passage in the manifold.

To provide for additional generator efficiencies, heat from the hot absorbent solution (weak solution) leaving the bottom of the generator can be transferred back to the absorber to enhance the desorption process. An inlet receives the hot absorbent from the lower first fluid space lower passage (outlet). The absorbent passes through a heat exchanger in the first fluid space which transfers heat to the strong solution to desorb the absorbent, The absorbent then leaves the heat exchanger (and the first fluid space) by means of a heat exchanger outlet.

The generator is typically combined with other components of an absorption heat transfer device as previously described. A heat exchange loop with a first heat source and the third fluid space is used to heat the generator by circulating heat transfer fluid from a first heat source exchanger to the third fluid space (the vertical tubes with upper and lower manifolds) and then circulating the heat transfer fluid back to the heat source exchanger with a pump. A heat engine boiler can also be added to this loop as previously described. In addition and when the heat transfer fluid is at sufficiently low temperature, it can be used to cool the condenser of the heat engine prior to returning to the heat source. The three fluid space generator can also be used as only a portion of the generator with another portion being in heat exchange with a portion of the absorber.

In another system configuration, a second heat source, e.g., a solar heat source transfers heat to the third fluid space of the dual heat generator in a simple transfer loop containing the heat source heat exchanger, a pump, and the third fluid space, i.e., the vertical tubes with upper and lower manifolds. A second heat transfer loop transfers heat from the absorption device condenser and absorber to drive the boiler of a heat engine.

As a final set of embodiments, the heat engine can be used with a compression heat transfer device, typically by close coupling the work output of the heat engine expander with the compressor of a compression heat transfer device. Such a system has the advantage of reducing considerably the number of components found in the overall system since the compression heat transfer device only involves an interconnected compressor, condenser, evaporator and a throttling value. The expander and compressor of the two devices are typical of similar scroll or gerotor configuration, one device allowing for contraction of a working fluid while the other provides for compression of a working fluid. Working fluids for the compression heat transfer device are similar to or identical with those of the heat engine, preferably organic refrigerants such as chlorofluorohydrocarbons and especially chlorofluoroethanes and ammonia.

System efficiencies are enhanced by using the superheated working fluid coming from the compressor to transfer heat to the heat engine working fluid as it enter the boiler. Similarly the cool heat transfer fluid from the heat engine condenser can be used to cool the compressor with a compressor heat exchanger, i.e., passages and ports through the compressor along with a compressor cooling jacket.

The system shows considerable saving in heating and cooling a living space over that achieved with conventional furnaces and heat pumps. In a typical heating arrangement the heat engine and compressor are dose coupled through a common shaft. The common shaft serves as the expander work output and the compressor work input shaft. Superheat from compressed working fluid leaving the compressor is circulated to the heat engine working fluid to preheat the heat engine working fluid before it enters the boiler. The working fluid of the compression device is then circulated back to the inlet of the compression cycle condenser. A heat source loop to a solar array heat source transfer heat from the solar array to a heat-transfer fluid, e.g., a hydronic fluid. The heat transfer fluid is then sent to the heat engine boiler where it transfers heat to the boiler by means of a boiler heat exchanger. The heat-transfer fluid than is passed to the compression device evaporator where it provides heat to the evaporator after which it returns to the solar array heat source to repeat the cycle. A pump is employed to circulate the heat transfer fluid through the various components of the heat source heat transfer loop. A second heat-transfer loop employs heat transfer heat exchangers in both the heat engine and compression device condensers to receive heat from the condensers and provides them to a heat exchanger in the living space for heating purposes. A second pump circulates the heat transfer fluid among the interconnected heat transfer components.

In cooling mode, the heat engine and compression device are dosed coupled with superheat from the compressor used to heat the heat engine working fluid prior to entry into the boiler in the same fashion as was used in heating mode. Heat from the heat source is used only for heating the boiler of the heat engine by means of a heat transfer loop containing a pump, heat source heat exchanger, and boiler heat exchanger. Heat from the heat exchangers in both the condensers is sent to a heat sink such as a cooling tower. Finally the load, i.e., the living space, is cooled by transferring heat to the compression device evaporator by means of a cooling loop having a heat transfer fluid pump, an evaporator heat exchanger, and a load heat exchanger. Heat from the load, i.e., the living space, is transferred to the compression device evaporator The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
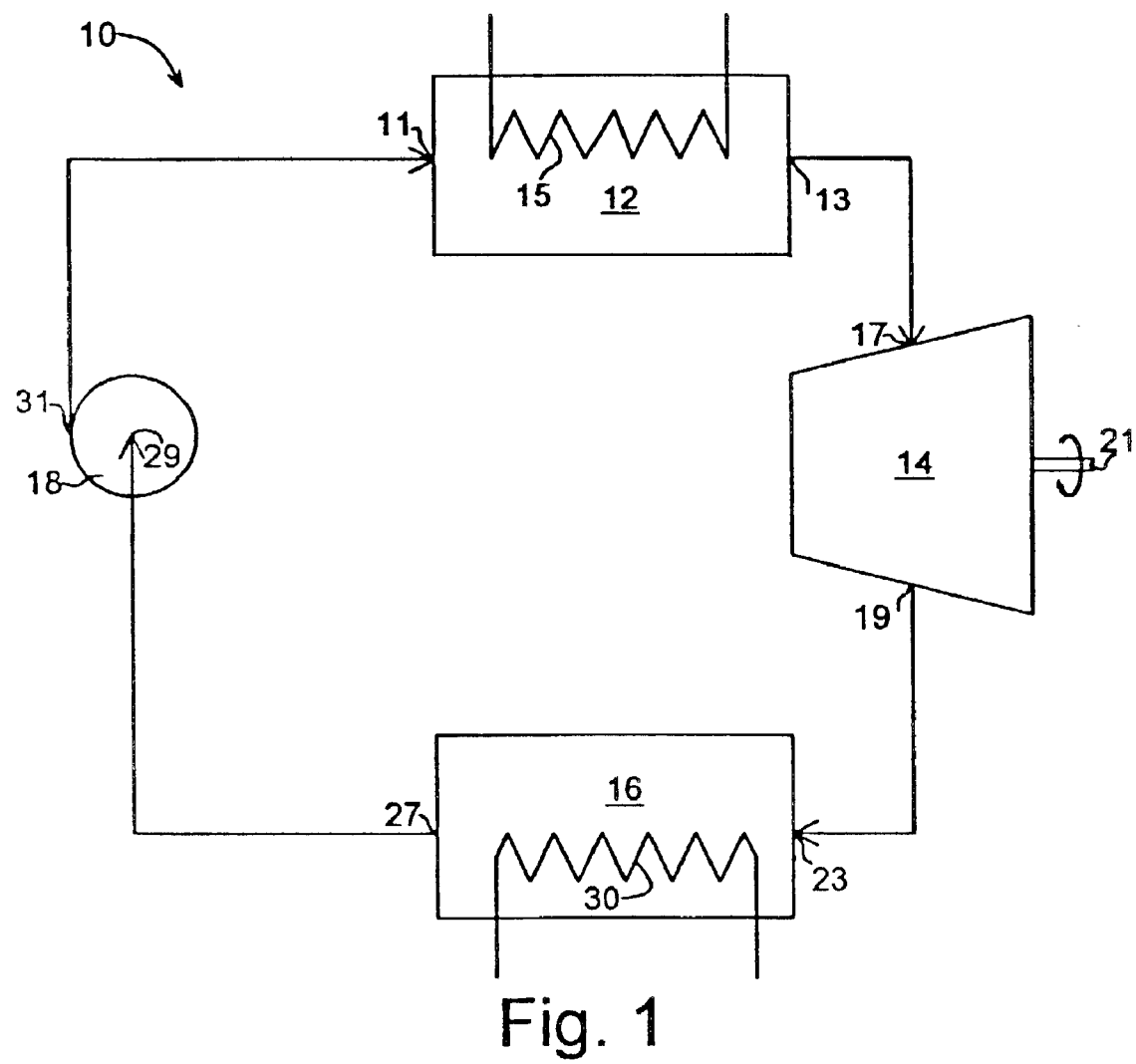
FIG. 1 is a schematic view of a prior art heat engine using a positive displacement rotating expander.

In describing the preferred embodiment of the invention which is illustrated in the drawings, specific terminology is resorted to for the sake of clarity. In addition, the same component numbers are used for similar components throughout the figures. However, it is not intended that the invention be limited to the specific terms and numbers so selected and it is to be understood that each specific term and number includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 2:
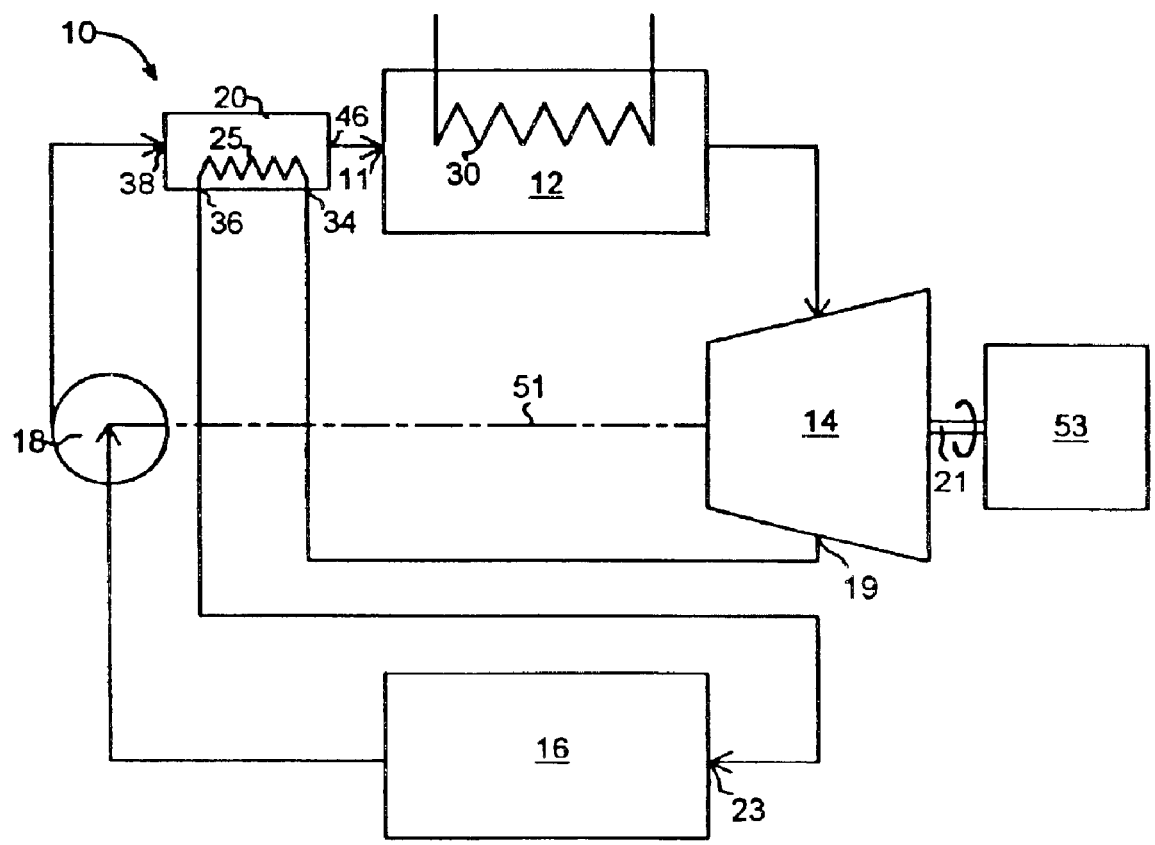
FIG. 2 is a schematic view of the heat engine of the present invention Illustrating use of superheat from the working fluid leaving the expander to preheat the working fluid prior to input into the boiler.

With reference to the drawings and initially FIG. 1, a heat engine 10 for the transformation of heat into useful work is shown having 1) a boiler 12 having an inlet 11 and an outlet 13 and connected to receive a liquid working fluid and vaporizing said liquid to a vapor on input of heat from a heat source input such as boiler heat exchanger 15; 2) a positive displacement device 14 such as a rotating expander, e.g., a scroll or gerotor, used in expansion mode and having an inlet 17 and outlet 19 and adapted for receiving and expanding said vapor from said boiler outlet 13 at high pressure to produce a work output 21 and providing said vapor at low pressure at said outlet 19, 3) a condenser 16 having an inlet 23 for receiving said vapor from said expander outlet 19 and condensing said vapor back to a fluid liquid; and 4) a pump 18 with an inlet 29 and outlet 31 for taking the fluid liquid from condenser outlet 27 at low pressure and providing it to boiler inlet 11 at high pressure. As shown in FIG. 2, work output such as provided by rotating shaft 21 can be put to a variety of uses including its use to drive pumps including pump 18 as indicated by dotted line 51 and for the production of electricity when connected to a suitable electrical generator 53. For clarity, the use of expander output to drive generators and/or one or more system pumps is not illustrated for each of the embodiments shown in the various figures. When it is not convenient to drive system pumps directly from expander output 21, the expander 14 can be used to drive an electrical generator which in turn is used to power electrical system pumps.

Typically water has been the working fluid used in most prior art heat engines. Unfortunately water becomes a wet vapor upon expansion from a saturated vapor and excess superheat is generally not available for recovery. By using an organic working fluid such as R113 (1,1,2-trichlorotrifluoroethane) or R123 (2,2-dichloro-1,1,1-trifluoroethane), it is possible to recover the superheat from the expander exhaust stream as shown in FIG. 2. In FIG. 2, organic working fluid from expander outlet 19 is sent to boiler pre-heater 20 where it is used to preheat the working fluid prior to entry into the boiler 12 after which it is sent to condenser inlet 23. Hot working fluid from expander outlet 19 enters heat exchanger 25 of pre-heater 20 via inlet 34, heats the working fluid in pre-heater 20, and leaves exchanger 25 via outlet 36 from which it flows to inlet 23 of condenser 16. Cooler working fluid from pump 18 enters pre-heater 20 via inlet 38 and leaves via outlet 46 from which the heated working fluid flows to boiler inlet 11.

Figure 3:
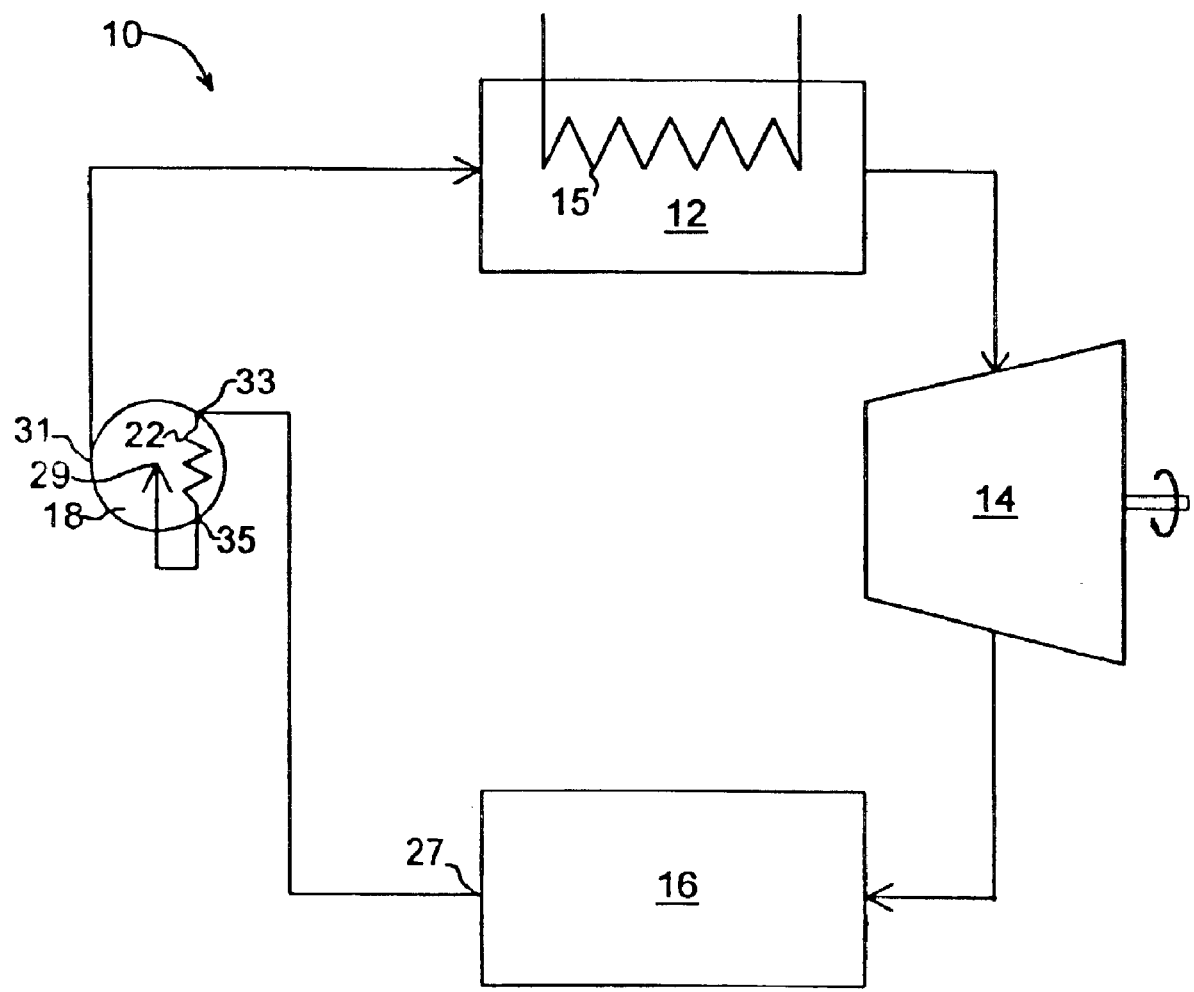
FIG. 3 is a schematic view of the heat engine of the present invention showing the use of the working fluid to cool the heat engine pump using a pump cooling jacket.

As shown in FIG. 3, it is possible to also increase the efficiencies of the heat engine by recovering waste work heat produced by frictional and other lost work heat of the pump 18, by using a heat exchanger such as cooling jacket or passages or both as designated by the numeral 22 to capture the otherwise lost work heat. Cool working fluid from condenser outlet 27 is passed to cooling heat exchanger 22 via cooling jacket inlet 33, and after removing waste work heat via cooling jacket heat exchanger 22, leaves the cooling jacket 22 via outlet 35 after which it passes to pump inlet 29.

Figure 4:
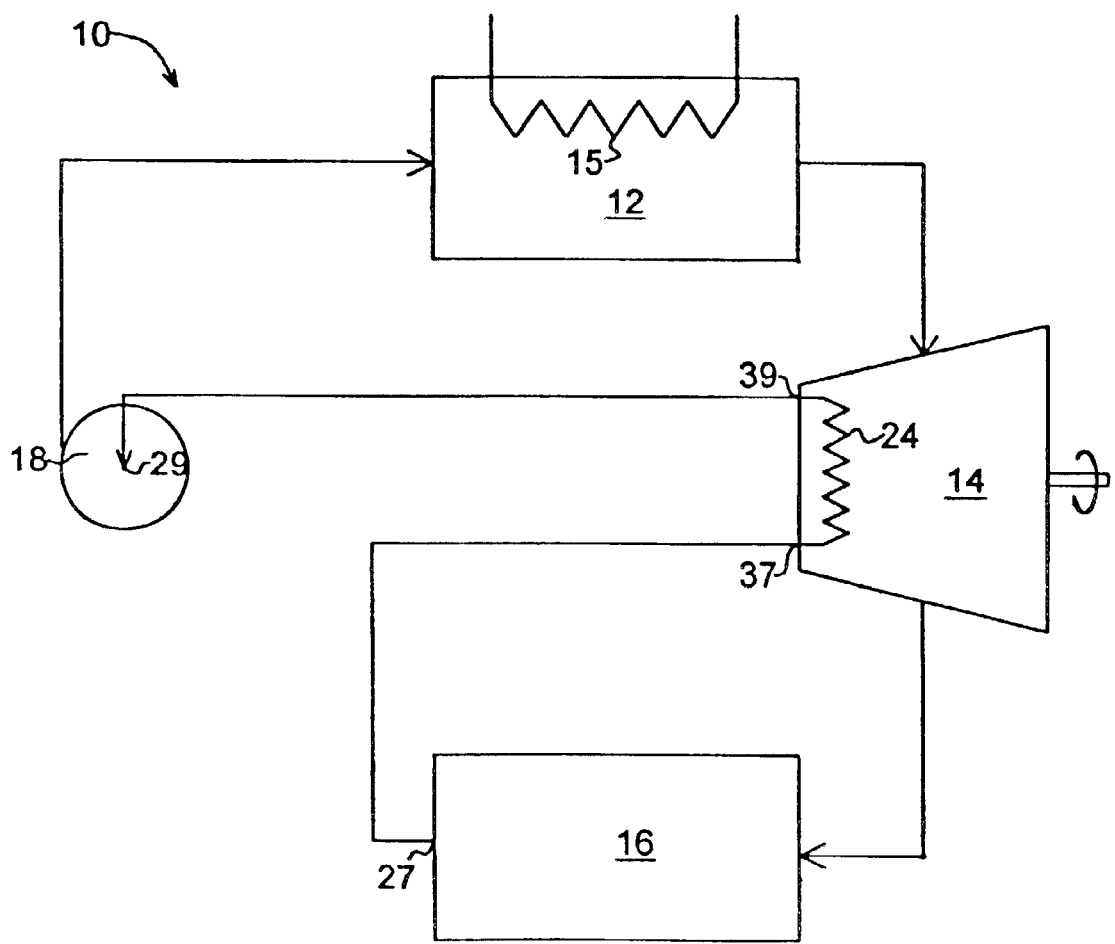
FIG. 4 is a schematic view of the heat engine of the present invention showing the use of the working fluid to cool the expander of the heat engine.
Figure 5:
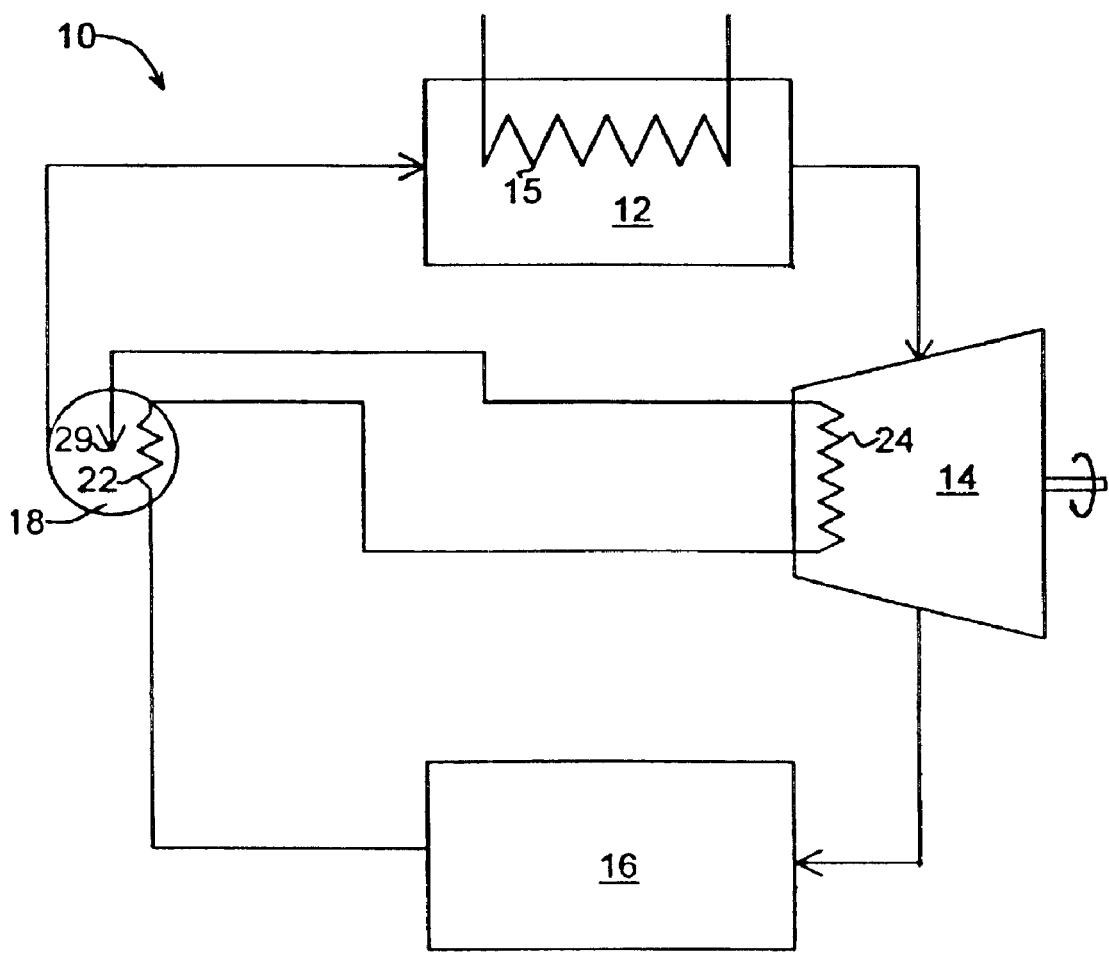
FIG. 5 is a schematic view of the heat engine of the present invention showing the use of the working fluid to cool both the heat engine pump and expander.

As shown in FIG. 4, a similar waste heat recapture can be used with expander 14. Cool working fluid from condenser outlet 27 is passed to a cooling passage, jacket or similar heat exchanger 24 in expander 14 via inlet 37. After recovering waste work heat from the expander, the working fluid leaves via outlet 39 from which it is passed to pump inlet 29. FIG. 5 illustrates the use of heat exchangers 22 and 24, e.g., cooling jackets or fluid passages, in series. Preheating of the working fluid by recapture of waste work heat from expander 24 and pump 29 along with expanded fluid superheat reduces the entropy generation of the heat engine and increases its thermal efficiency.

Figure 6:
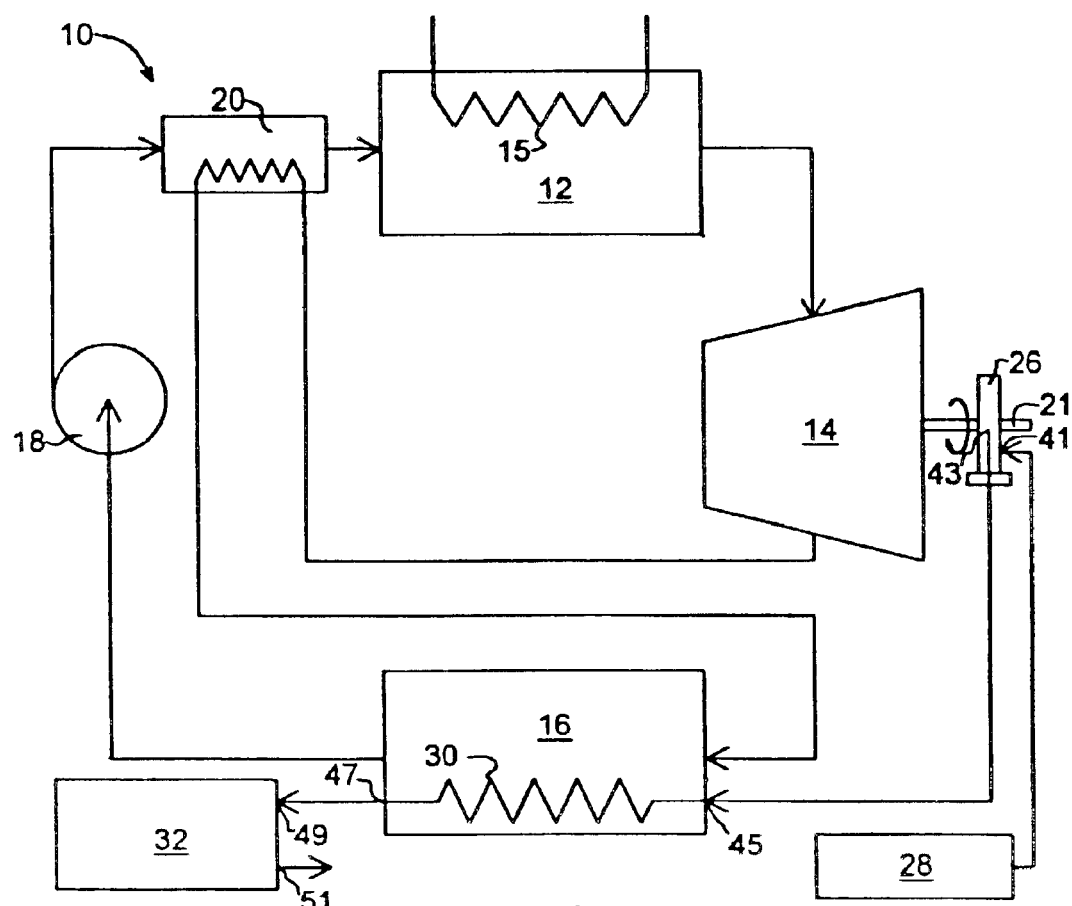
FIG. 6 is a schematic view of the heat engine of the present invention illustrating the use of a ground water reservoir to cool the condenser for more efficient operation and also providing hot water storage capability.

To further increase the efficiencies of the heat engine, ground water can be used to cool condenser 16 rather than typical air cooling. As shown in FIG. 6, pump 26 can be attached to the work output shaft 21 and driven to pump ground water from an underground reservoir 28. Cool water from reservoir 28 enters pump 26 via inlet 41 and is discharged via outlet 43 to the condenser heat exchange inlet 45. The water removes heat from the condensing working fluid by means of heat exchanger 30 after which the water may be passed to a water storage tank 32 via condenser heat exchange outlet 47. If the water in the underground reservoir 28 is potable, water storage tank 32 becomes a source of heated potable water via outlet 51.

Figure 7:
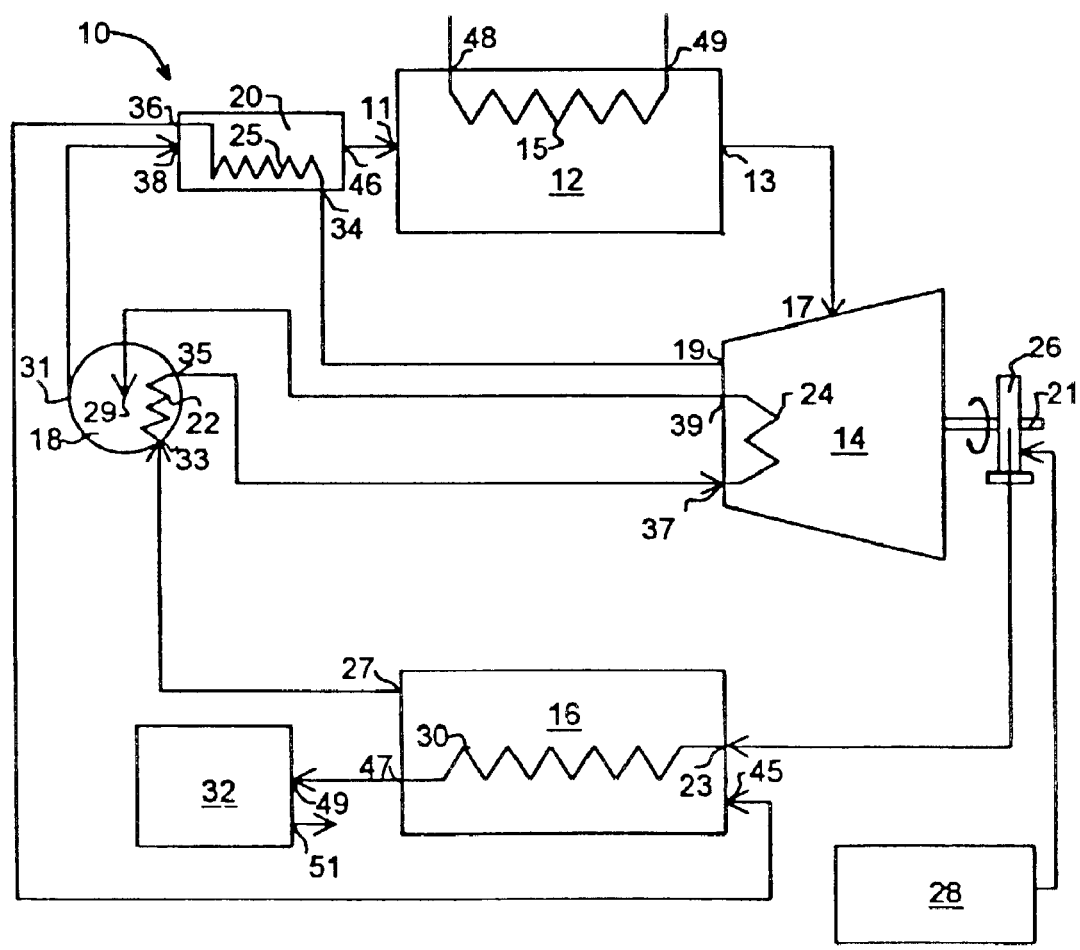
FIG. 7 is a schematic view of the heat engine of the present invention illustrating the use of a heat source for an absorption heat transfer device in parallel with the heat input of the heat engine boiler.

FIG. 7 illustrates the use of heat engine working fluid to improve the operating efficiencies of the heat engine 10 by combining the various features illustrated in the previous figures. Here, hot working fluid leaves expander 14 via outlet 19 and preheats cooler working fluid in pre-heater 20 before it enters boiler 12. The hot working fluid from outlet 19 enters inlet 34 of pre-heater heat exchanger 25 where it exchanges heat to the relatively cool working fluid that has entered pre-heater 20 via inlet 38. The preheated working fluid leaves pre-heater 20 via outlet 46 from which it enters boiler 12 via inlet 11. Meanwhile, the working fluid in heat exchanger 25 leaves the pre-heat exchanger 25 via outlet 36 from which it passes to inlet 45 of condenser 16 where it is condensed. The relatively cool condensed fluid leaves condenser 16 via outlet 27 and flows to cooling jacket inlet 33 of pump 18 where frictional and other lost work heat in pump 18 is extracted into the working fluid by cooling jacket 22. The working fluid leaves cooling jacket 22 via outlet 35 from which it passes to cooling jacket inlet 37 of expander cooling jacket 24. Here frictional and other lost work heat of the expander is extracted into the working fluid in cooling jacket 24 after which it leaves cooling jacket 24 via outlet 39 after which it passes to pump 18 via inlet 29 where it is pressurized and leaves via pump outlet 31. From outlet 31, the warm working fluid then passes into pre-heater 20 where it is further heated via the hot working fluid passing through heat exchanger 25 as noted above after which it passes from pre-heater 20 via outlet 46 to inlet 11 of boiler 12.

As noted previously, heat engine efficiencies can be improved further by using a lower temperature heat sink for extraction of heat from condenser 16. This is accomplished by using the work output shaft 21 to drive pump 26 and pump relatively cool water (in comparison to an air cooled condenser) from an underground reservoir 28 and using the water to cool the working fluid in condenser 16 by means of heat exchanger 30. The heated water can then be stored in water tank 32 for use as a source of hot water. Of course If the reservoir contains potable water and care is taken to avoid contamination, tank 32 becomes a source of hot potable water.

It is to be understood that a variety of heat sources may be used for heat input to boiler heat exchanger 15 in the heating of the working fluid in boiler 12. Because of the low operating temperatures of many organic fluids, it is possible to make use of low temperature heat sources such as solar thermal, geothermal, waste heat recovery, biomass combustion and fossil-fuel combustion. As will be shown and described later, another heat source alternative is the use of a heat-actuated absorption heat transfer device having an interconnected generator with a generator heat input source, an absorber, a condenser, an evaporator and an absorption device working fluid.

Figure 8:
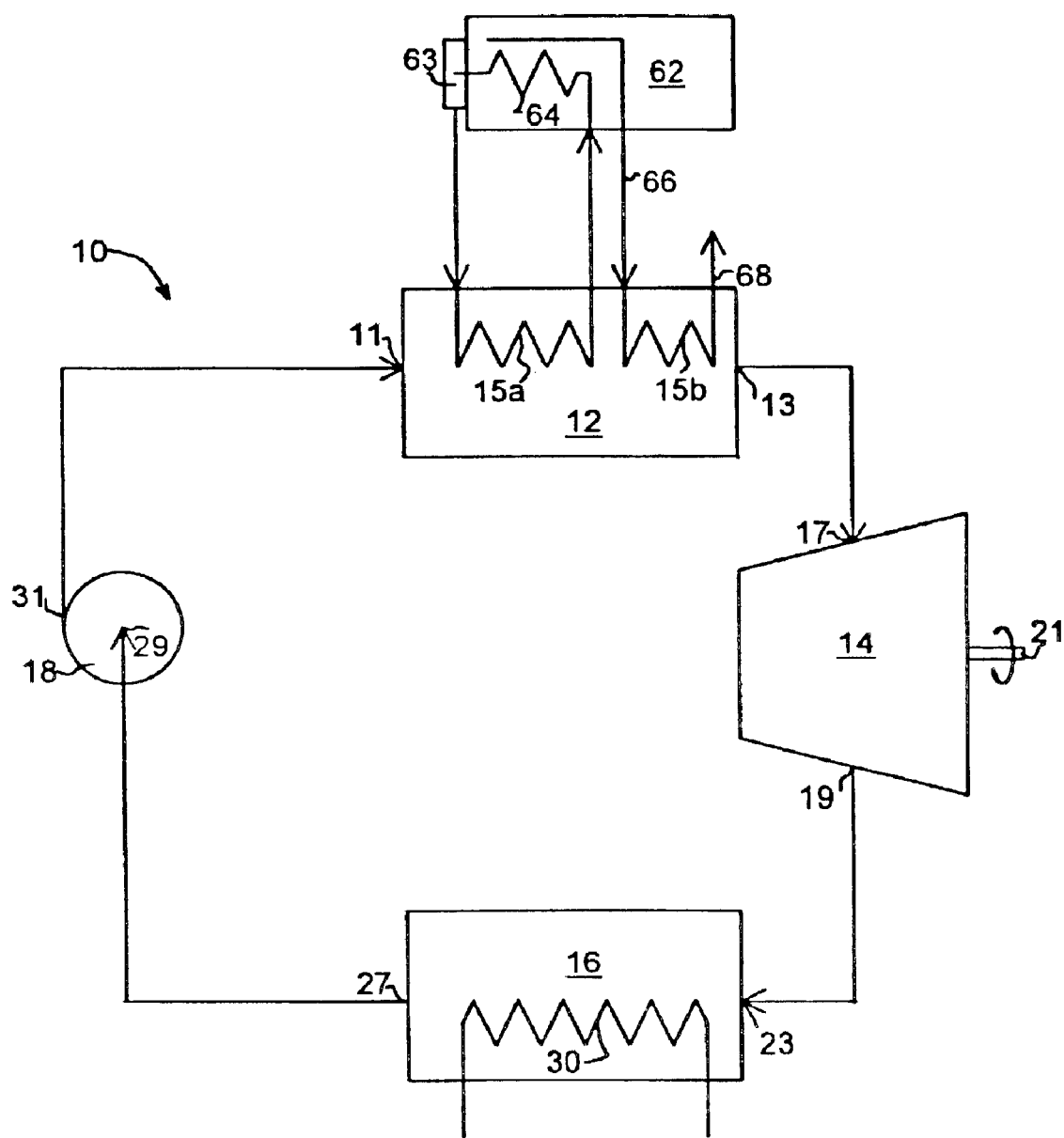
FIG. 8 is a schematic view of the heat engine of the present invention illustrating the use an internal combustion engine coolant heat and exhaust heat to heat the engine boiler.

FIG. 8 illustrates an embodiment in which waste heat from a combustion engine 62 is used as a heat source for boiler 12 of the heat engine 10. For clarity, the various working fluid features heat transfer features shown in FIGS. 2–7 in which the working fluid is used to pre-heat the working fluid prior to entry into boiler 12 and to capture frictional and other lost work heat in the expander 14 and pumps such as pump 29 and a water pump such as pump 26 have been omitted. However, all, some or none of the various superheat and lost work heat features of the prior figures may be used in conjunction with the combustion heating of boiler 12. Condenser 16 may be either air or liquid cooled using heat exchanger 30. Engine coolant passes through various passages in engine 62 to remove excess heat from the combustion chambers as indicated by heat exchanger 64. The hot coolant is circulated by means of pump 63, typically driven by engine 62, to heat exchanger 15a to heat the working fluid in boiler 12 after which the coolant is returned to the engine heat exchanger 64. In addition, hot exhaust gases from the combustion engine 62 are sent via line 66 to boiler heat exchanger 15b to further heat the working fluid in boiler 12 after which the cool exhaust gases are vented via outlet 68.

Figure 9:
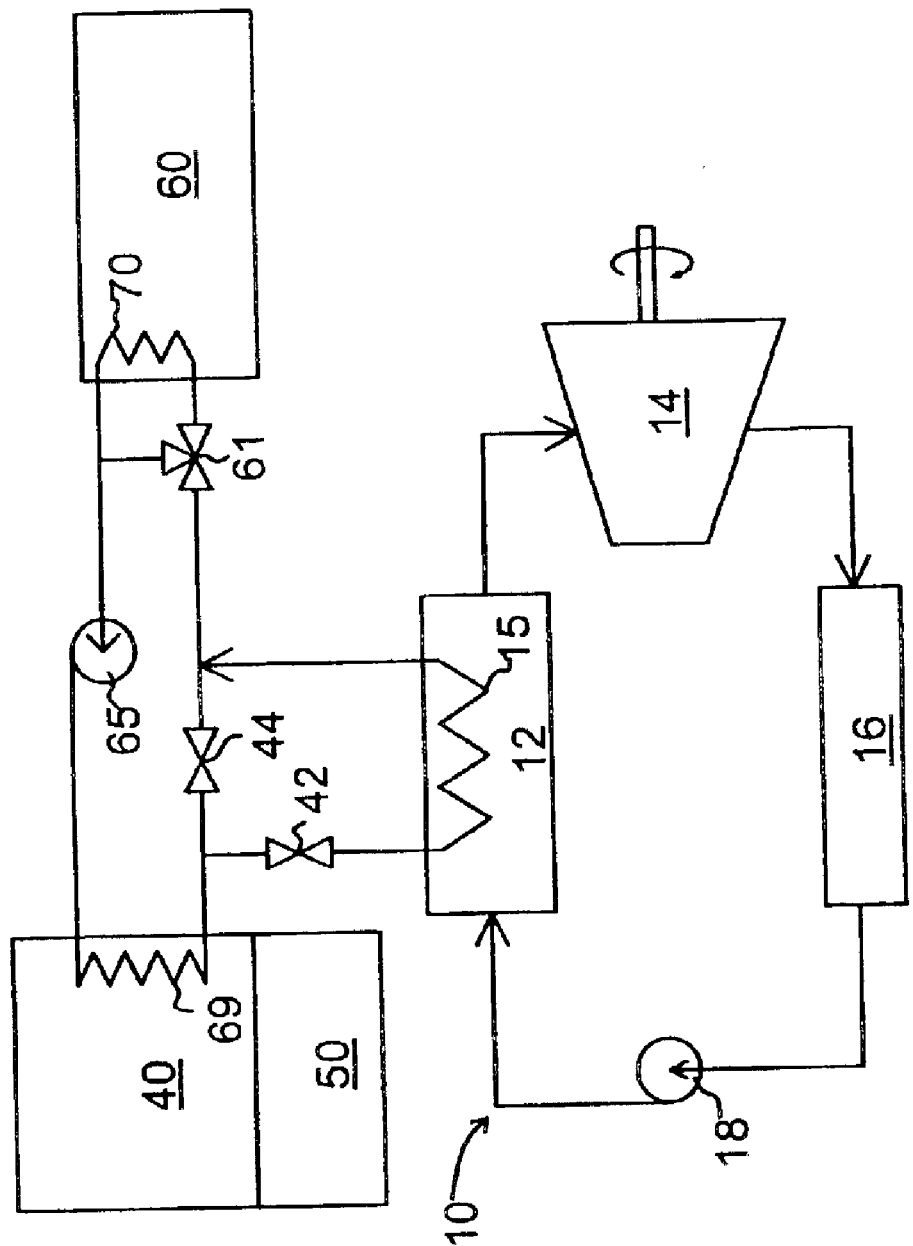
FIG. 9 is a schematic view of the present invention illustrating the coupling of a heat source to the boiler of the heat engine and an absorption heat transfer device.

FIG. 9, illustrates a heat source 40 for an absorption heat transfer device 60 such as a lithium bromide/water or ammonia/water chiller or heat pump that can also be used to heat boiler 12 of the heat engine 10. Valves 42, 44, 61 and pump 65 allow for either parallel or series connection of the boiler 12 and the heat transfer device 60 to heat source 40. As a result, heat source 40 may be used for selected delivery of heat to: 1) the absorption heat transfer device 60 alone(by closing valve 42 and opening the three-way valve 61 to permit flow to the absorption device 60), 2) both the heat engine boiler 12 and the absorption heat transfer device 60 in either a) parallel flow or b) series flow, or 3) to the boiler 12 alone (by opening valve 42 and positioning valve 61 for bypass flow around absorption device 60). Series flow to both boiler 12 and absorption device 60 is accomplished by dosing valve 44, opening valve 42, and positioning three-way valve 61 for flow to absorption device 60. Parallel flow is accomplished by partially opening valves 42 and 44 with valve 61 positioned for flow to absorption device 60. It is to be realized that those skilled in the art will recognize that a variety of valve and pump combinations can be used to achieve a particular flow scheme for a particular device configuration. Heat source 40 may be any one or more of a number of devices including solar thermal, geothermal, waste heat recovery, biomass combustion and fossil-fuel combustion heat sources.

Figure 10:
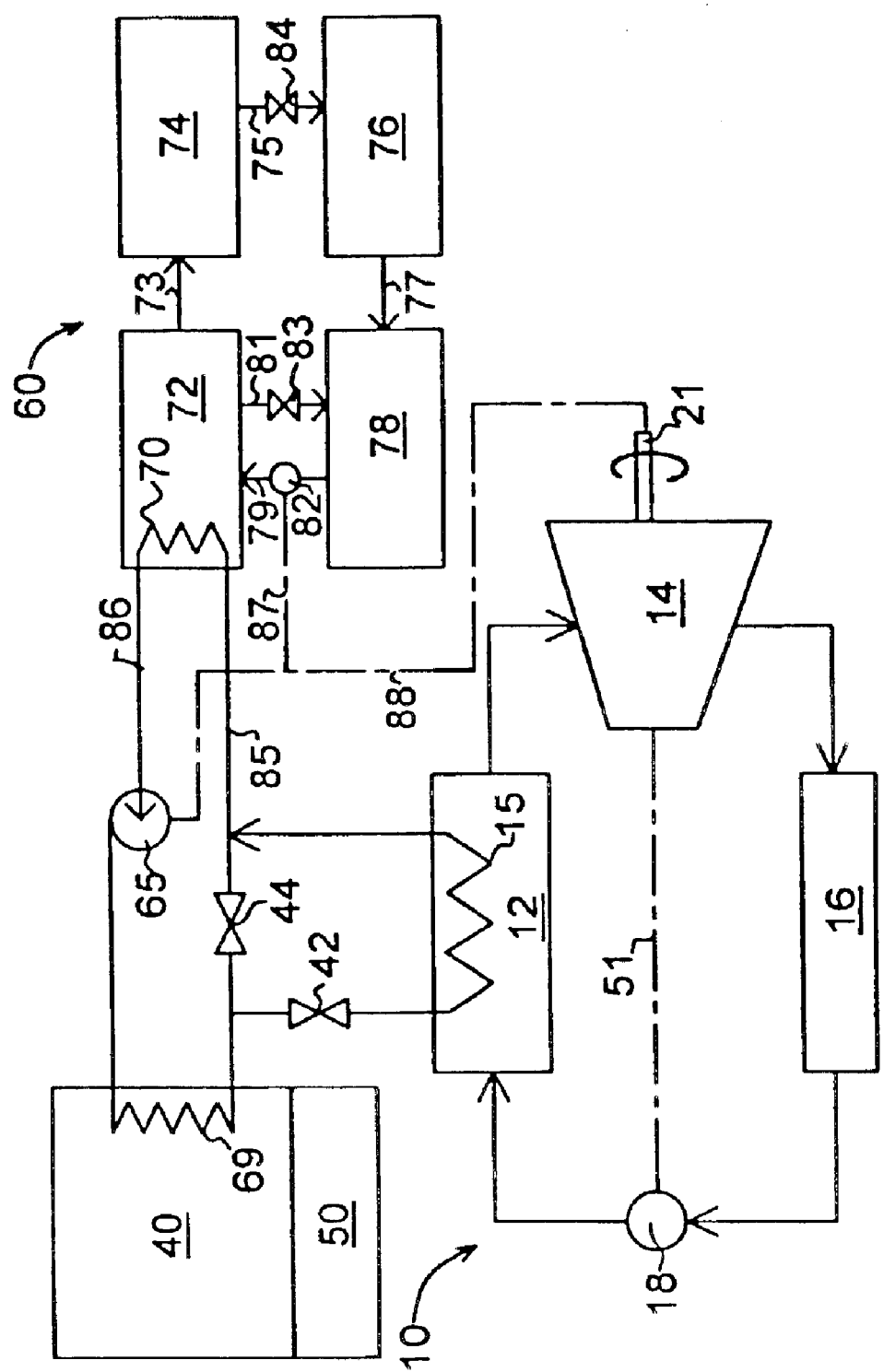
FIG. 10 is a schematic view of the present invention illustrating a heat-transfer fluid loop coupling of a heat engine boiler and a generator of an absorption device and use of heat engine expander work output to power the heat engine, absorption heat transfer device, and heat transfer fluid coupling loop pumps.

As shown in FIG. 10, the absorption heat transfer device 60 comprises an interconnected absorber 78, generator (desorber) 72, condenser 74, and evaporator 76 that use a refrigerant and an absorbent as a refrigerant pair (solution pair) and a heat source 70 to transfer heat between a heat load and a heat sink.

The absorber 78 contacts low pressure refrigerant vapor from evaporator 76 (via line 77) with a miscible absorbent from generator 76 (via line 81). Absorption takes place as a result of the mixing tendency of the miscible materials as well as an affinity between the refrigerant vapor and the absorbent and results in the generation of thermal energy which is released to the heat sink. The mixture formed by the absorption process, which is referred to here as a strong solution, is typically pressurized by means of a solution pump 82 and conveyed via line 79 to generator 72.

Figure 13:
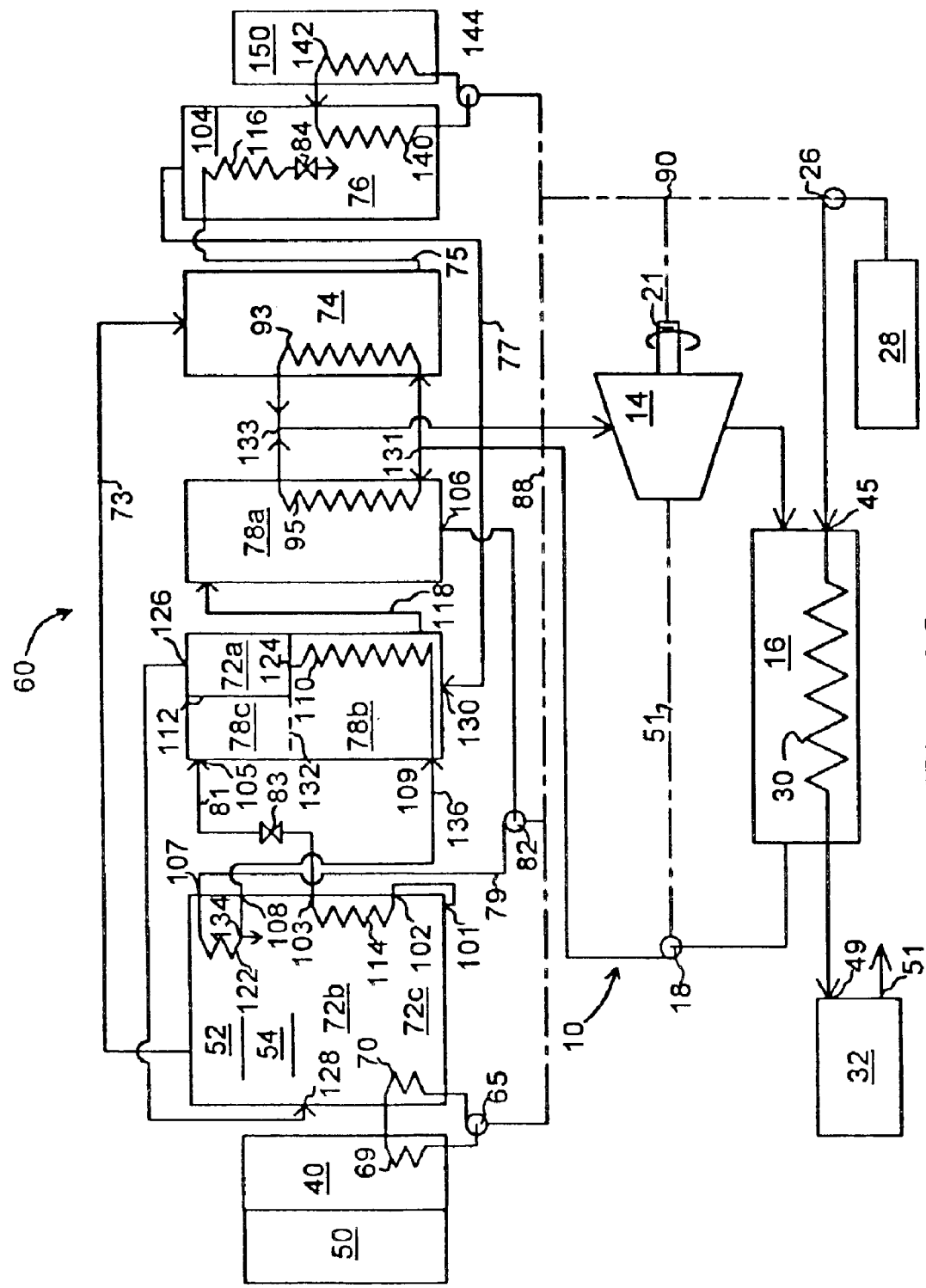
FIG. 13 is a schematic view of the present invention illustrating a generator absorber heat exchange device with the generator coupled to a heat source by means of a heat-transfer fluid loop and use of the condenser and absorber of the generator absorber heat exchange device as the boiler of a heat engine with use of the heat engine to pump ground water for cooling of the heat engine condenser and making available hot potable water.

The generator 72 causes the refrigerant vapor and absorbent to separate as a result of the application of heat via exchanger 70. When the absorbent is a nonvolatile material, heating of the strong solution is sufficient to accomplish complete separation of the refrigerant vapor. The remaining absorbent, referred to as a weak solution, is returned to the absorber 78 via line 81 and expansion device 83 to again begin the absorption process. When the absorbent is a volatile material such as water in an ammonia/water refrigerant pair, it is desirable to remove a good portion of the volatile absorbent (water) from the refrigerant vapor (ammonia) using an analyzer 54 which gives a relatively pure absorbent and/or rectifier 52 which gives a relatively pure vapor. An analyzer 54 and rectifier 52 configuration is shown in FIG. 13.

After vapor purification, if necessary, the vapor passes to the condenser 74. The condenser 74 condenses the refrigerant vapor to a liquid with the liberation of heat. The hot liquid refrigerant then passes to the evaporator 76. The evaporator 76 revaporizes the hot refrigerant liquid at low pressure and temperature with input of heat from the heat load, i.e., from the refrigerator, room, building, or other medium the system was designed to cool. When operating as a heat pump, the evaporator takes heat from the outdoor environment while heat from the condenser or absorber or both is used to heat the load. From the evaporator 76, the refrigerant vapor enters the absorber 78 to again cycle through the process.

In each of these components, at least two phases are present with mass transfer between the two phases and each typically involves a heat transfer component. The generator (desorber) 72 uses heat to separate a strong solution into a vapor and a liquid absorbent (weak solution), the absorber 78 combines the weak solution and vapor with release of heat, the condenser 74 transforms refrigerant vapor to liquid with the release of heat and the evaporator 76 transforms liquid refrigerant to vapor with the application of heat.

As shown in FIG. 10, the generator 72 of heat transfer device 60 is heated by the heat source 40 by means of heat exchanger 69 in heat source 40 and heat exchanger 70 in generator 72. A heat transfer fluid circulates from exchanger 69 to exchanger 70 via line 85 and from exchanger 70 to exchanger 69 via line 86. Circulation of heat transfer fluid is carried out by means of pump 65. Hot heat transfer fluid from heat source 40 may be circulated only to generator 72 by closing valve 42 and opening valve 44. Alternatively, heat from heat source 40 may also be used to heat both the boiler 12 of heat engine 10 and generator 72 by routing the fluid through exchanger 15 of boiler 12 and then through exchanger 70 of generator 72 (series flow accomplished by opening valve 42 and closing valve 44) or by routing hot heat transfer fluid simultaneously to both exchanger 70 and exchanger 15 (parallel flow accomplished by placing valves 42 and 44 both in an open position). As shown by dashed lines 51, 87, and 88, expander 14 may be used to operate one or more system pumps 18, 65, and 82. It is to be realized that if expander 14 is used to operate pump 65, operation of generator 72 by itself (as opposed to combined operation with boiler 12) is precluded. However, by having expander 14 generate electricity using a generator 53 (FIG. 2), storing the electrical energy in a battery, and equipping the system with electrical pumps, the system can remain self-sufficient even when all heat from the heat source is required for absorption heat transfer device 60.

Figure 11:
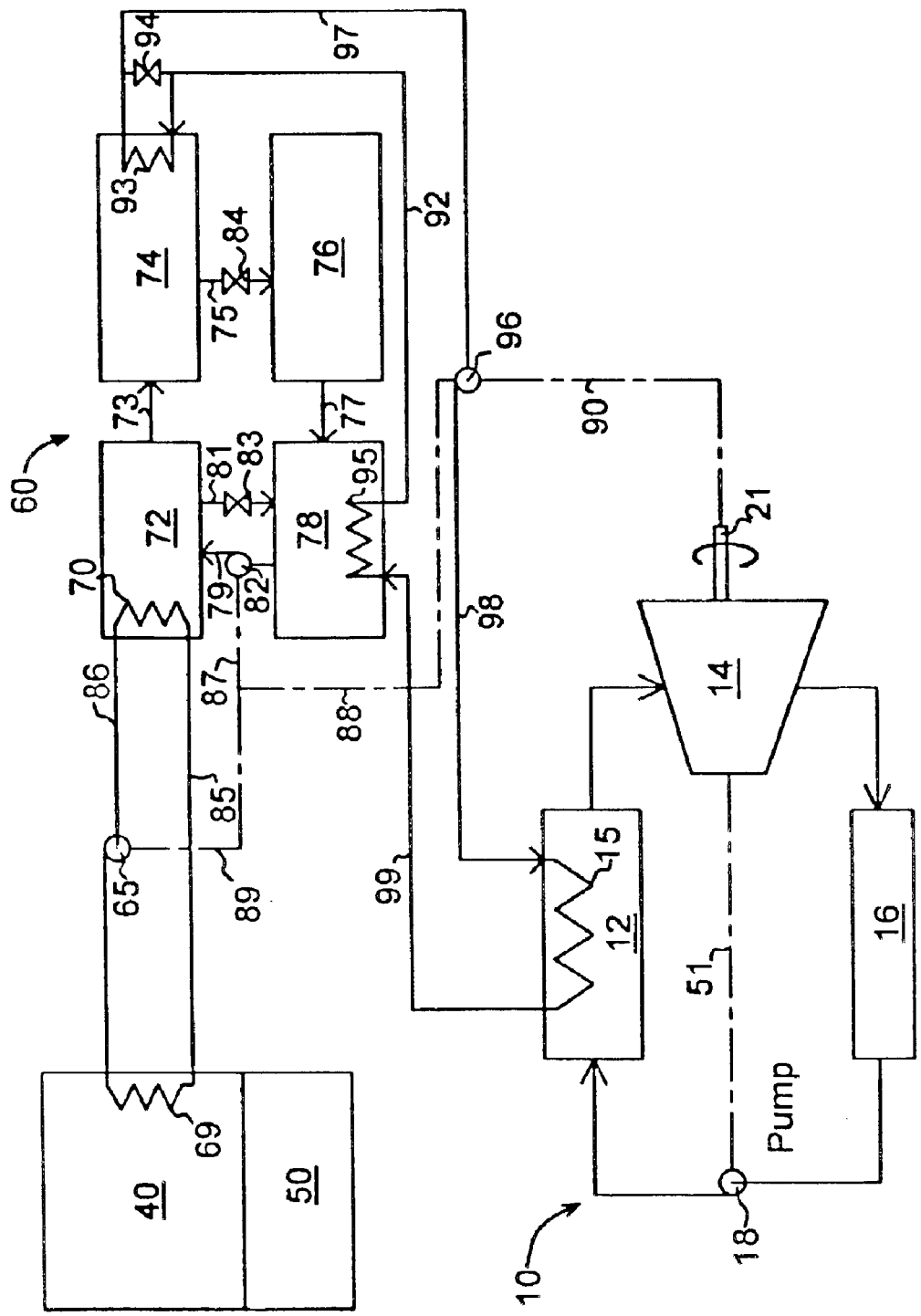
FIG. 11 is a schematic view of the present invention illustrating heat transfer fluid coupling of the generator of a heat transfer device with a heat source and heat transfer fluid coupling of the condenser and absorber of the absorption heat transfer device to heat the boiler of the heat engine.

When absorption heat transfer device 60 is used as a chiller, overall energy savings can be increased significantly by capturing the heat rejected by absorber 78 and condenser 74. As shown in FIG. 11, all of the heat from heat source 40 is directed to generator 72. Condenser 74 and evaporator 76 are interconnected with boiler 12 to use the waste heat rejected by the condenser 74 and the absorber 78. Starting at boiler 12, cool heat exchange fluid from the boiler heat exchanger 15 flows to heat exchanger 95 in absorber 78 where it captures rejected absorber heat. The heat exchange fluid then flows to condenser 93 via line 92 to capture rejected condenser heat after which it flows through line 97 to pump 96 where the hot heat exchange fluid is pumped to the boiler heat exchanger 15 where it is used to evaporate the working fluid of heat engine 10 after which the cool heat exchange fluid leaves the boiler heat exchanger 15 to repeat the cycle. Valve 94 is used to regulate the flow of heat exchange fluid between absorber 78 and condenser 74. By closing valve 94, heat exchange fluid flow from the absorber to the condenser in series fashion with all of the heat exchange fluid passing through both the condenser 74 and the absorber 78. By opening valve 94, some of the working fluid is allowed to bypass condenser 74.

As has been previously discussed, expander 14 of the heat engine can be used to drive one of more of the system pumps, 18, 96, 82, and 65 as shown by dashed lines 51, 90, 88, 87, and 89. The additional heat efficiencies can be achieved in the heat engine 10 by incorporating one or more of the features shown in FIGS. 2–7 into the heat engine of the embodiment shown in FIG. 11. In the embodiments of FIGS. 10 and 11, the absorption heat transfer device 60 is often operated as an lithium bromide/water or ammonia/water chiller with heat supplied by a solar collector array heat source 60.

Figure 12:
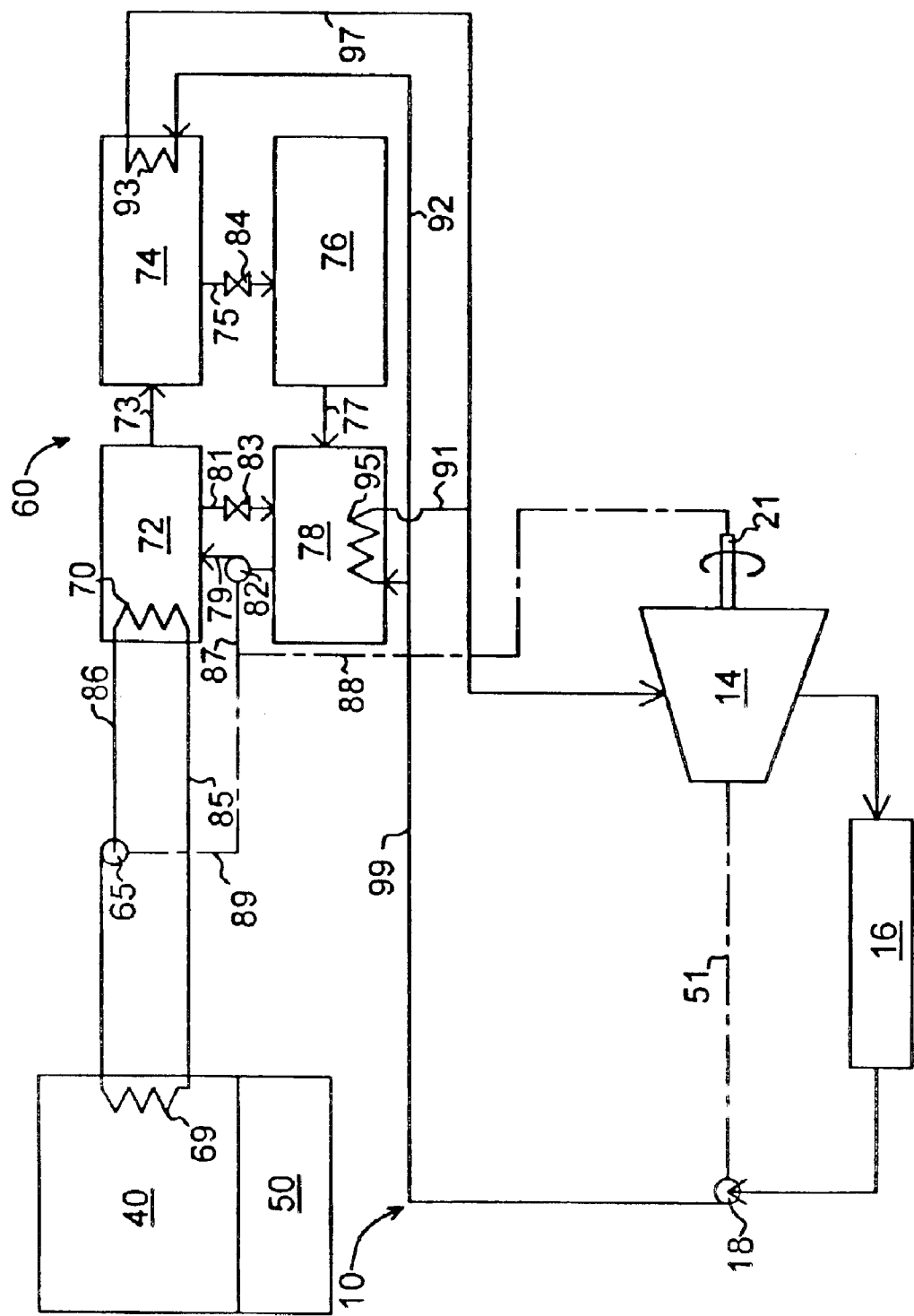
FIG. 12 is a schematic view of the present invention illustrating the heat transfer fluid coupling of the generator of a heat transfer device with a heat source and use of heat exchangers in the condenser and absorber of the absorption heat transfer device as the boiler of the heat engine.

To further improve the efficiencies of the embodiment of FIG. 11 and reduce the number of components including energy drawing pump 96, the heat exchange loop between the boiler 12 and the absorber 78 and/or condenser 74 can be eliminated. As shown in FIG. 12, the absorber and/or condenser heat exchangers, 95 and 93, respectively, become the boiler of heat engine 10 with the working fluid of heat engine 10 becoming the heat transfer fluid for removing heat from absorber 78 and/or condenser 74. Cool working fluid from condenser 16 is pumped by pump 18 directly to the absorber 78 and condenser 74 via lines 99 and 92 where it is vaporized and returned to expander 14 via lines 97 and 91. By transferring heat directly from the condenser 74 and absorber 78 to the working fluid, heat transfer losses due to the transfer of heat from the absorber 78 and condenser 74 to a heat transfer fluid and the transfer of heat from the heat transfer fluid to the working fluid of the heat engine are avoided. Energy losses from frictional and other work losses in pumping the heat transfer fluid between the various components are also avoided. Finally the number of components in the overall configuration are reduced and cost saving effected by having the absorber 78 and condenser 74 serve effectively as the boiler of heat engine 10. As with various embodiments already discussed, the output of expander 14 can be used to operate one of more system pumps 18, 65, and 82 as illustrated by dashed lines 51, 87, 88, and 89. In addition, efficiencies achieved by using superheated working fluid to preheat the working fluid (FIG. 2), use of cooled working fluid from condenser 16 to capture lost work heat from pump 18 (FIG. 3) and the expander 14

(FIG. 4) and use of an under ground water reservoir to cool the condenser and provide hot potable water (FIG. 7) are also advantageously used with the configuration of FIG. 12.

FIG. 13 illustrates schematically a particular absorption heat transfer device 60 configuration, referred to as a generator-absorber heat-exchange machine, coupled with a heat engine 10. The heat engine 10 uses the absorber and/or condenser sections of heat transfer device 60 as its boiler. The absorption device 60 achieves greater operational efficiencies through additional heat exchange among its various components. The generator-absorber heat exchange device 60 obtains increased cycle efficiencies by overlapping the temperature ranges of a portion of the absorber 78 (78c) with a portion of the generator 72 (72a) to transfer absorber heat from absorber section 78c to generator section 72a by using an intermediate fluid heat transfer loop or direct heat transfer such as by separator 112. In addition, sensible heat of hot weak solution from generator section 72c is used to heat strong solution in generator section 72b by means of exchanger 114. Heat is also transferred between the condensed and evaporated refrigerant entering and leaving evaporator 76 using heat exchanger 116 in heat exchange section 104 of evaporate 76.

Although appearing somewhat complex, the basic interconnection of absorber 78, generator 72, condenser 74, and evaporator 76 is similar to the above description of the absorption heat transfer devices 60 of FIGS. 11 and 12. Additional rectifier 52 and analyzer 54 components are added to remove absorbent vapor from the desorbed refrigerant stream. Generator 72 is divided into three sections, a heat source 40 heated section 72c (using interconnected exchangers 69 and 70 and pump 65), a solution heated section 72b (using hot weak solution removed from generator outlet 101 in exchanger 114), and absorber heated section 72a. Similarly the absorber 78 has been divided into a generator cooled section 78c, a solution cooled section 78b (using strong solution in exchanger 110), and a working-fluid cooled section 78a (using heat-engine working fluid in exchanger 95). A heat exchange section 104 has been added to remove heat from the refrigerant liquid prior to evaporation in evaporator 76 via exchanger 116 and then return this heat to the refrigerant vapor after the vaporization process.

In operation, hot weak solution (devoid of refrigerant vapor) leaves the heat source 40 heated generator section 72c via outlet 101 from which it passes to generator section 72b via inlet 102 to exchange additional heat to generator section 72b using exchanger 114. The weak solution leaves exchanger 114 via outlet 103. The weak solution passes through pressure lowering device 83 and is passed to absorber section 78c via line 81 and absorber inlet 105 where it absorbs refrigerant vapor coming from evaporator 76.

The weak solution enters absorber section 78c via inlet 105 where it picks up (absorbs) gas (refrigerant vapor) coming from evaporator section 78b via passages 132 with the liberation of heat which is transferred to generator section 72a via heat transfer surface 112. The weak solution, having absorbed the refrigerant in absorber section 78c, passes to absorber section 78b either through passages 132 or by other passages (not shown).

In absorber section 78b, the weak solution, containing refrigerant absorbed in absorber 78c, continues to absorb refrigerant coming from evaporator 76 via line 77 and inlet 130 in both liquid and vapor form. Absorption heat from the continuing absorption process is removed by strong solution in exchanger 110.

The absorbent solution, now having absorbed considerable refrigerant along with any unabsorbed refrigerant vapor passes to absorber 78a along with both liquid and any remaining refrigerant vapor to absorber section 78a where the absorption process is completed. Heat from the absorption process is removed by exchanging heat to the working fluid in exchanger 95 which now serves as the boiler for heat engine 10. The absorbent with absorbed refrigerant, i.e., the strong solution, leaves absorber 78a via outlet 106 as a cool fluid and is pumped to high pressure by means of pump 82. The cool strong solution leaves the pump 82 via line 79 and enters rectifier 52 where the cold strong solution in exchanger 122 serves to remove (condense) absorbent vapor in the refrigerant coming from the desorption process in generator section 72b. At splitter 134, the strong solution from exchanger 122 is divided into two portions, one portion being sent to analyzer section 54 where pure absorbent is sent to generator section 72b and refrigerant to rectifier section 52 and the other portion sent to outlet 108. The strong solution portion from outlet 108 is sent to exchanger 110 in absorber section 78b via line 136. The strong solution in exchanger 110 removes liberated heat from the absorption process occurring in absorber section 78b. The strong solution in exchanger 110 enters generator section 72a via inlet 124. In generator section 72a, the strong solution receives sufficient additional heat from the absorption process occurring in absorber section 78c via direct heat exchange across separator 112 to begin the desorption process, that is, the separation of refrigerant from absorbent. The two phase fluid containing refrigerant vapor and relatively strong solution leaves generator section 72a via outlet 126 from which it flows to generator section 72b through inlet 128. Here the two phase fluid is separated. The vapor moves into the analyzer section 54 for removal of sorbent; the strong solution (less refrigerant removed in generator section 72c and sent to analyzer 54) moves to generator section 72b where the hot weak solution in exchanger 114 transfers heat to the strong solution to remove additional refrigerant. Remaining refrigerant is removed from the sorbent in generator section 72c where heat source 40, via interconnected exchangers 69 and 70 and pump 65, heats the strong solution to its highest temperature to drive off the final portion of refrigerant. After the refrigerant is expelled, the hot absorbent liquid, free of refrigerant (hot weak solution), leaves through outlet 101 to again repeat the absorption desorption process carried out in the absorber 78 and generator 72.

Purified vapor from rectifier 52 passes to condenser 74 via line 73. Here the hot refrigerant is cooled by transfer of heat to the heat engine working fluid in exchanger 93. In effect, the condenser heat exchanger 93 serves as a boiler for the heat engine 10. The cooled condenser fluid then passes to the evaporator 76 by means of line 75. Prior to evaporation, the evaporator liquid exchanges heat to the cold refrigerant vapor via exchanger 116 after which it passes through expansion device 84 and into evaporator 76 where it receives heat (cools) the load 150 by means of interconnected exchangers 140 and 142 and pump 144. The cold vapor (and some residual liquid) receives heat from exchanger 116 in exchanger section 104 after which it passes via line 77 to absorber inlet 130 for absorption by the weak solution in absorber section 78b as previously described.

As noted, heat engine 10 uses the absorber heat exchanger 95 and the condenser heat exchanger 93 for the boiler function. That is, the working fluid of the heat engine, typically an organic, low boiling fluid, is evaporated in exchangers 93 and/or 95 rather than using a separate boiler for heating. Thus working fluid flows from pump 18 to tee 131 where it is divided and sent to absorber exchanger 95 and condenser exchanger 93. After being heated in exchangers 93 and 95, the heat engine working fluid from each of these exchangers meet at tee 133 where the flows are joined and passed to expander 14.

As noted previously, a pre-heat exchanger 20 may also be used in this configuration for removing super heat from the working fluid leaving the expander prior to entering "boiler" exchangers 93 and 95 (See FIGS. 2, 6, and 7). Lost work heat from pumps such as 18, 26, 65, 82, and 144 may also be recaptured as illustrated in FIGS. 3 and 4 and the expander 14 may be used to drive pumps 18, 26, 65, 82, and 144 as illustrated by interconnected lines 51, 88, and 90. As also illustrated in FIGS. 6 and 7, pump 26 can be used to pump water from an underground water reservoir to cool working fluid in condenser 16 (via heat exchanger 30) rather than using air cooling. The heated water leaving the exchanger 30 may then be stored in water tank 32 to provide a source of hot potable water.

The above system is particularly advantageous to third world countries with basic water and food needs. By using a heat source such as a solar panel array 40 capable of achieving temperatures in the range of 350 to 450° F. (177–232° C.) and an efficient expander such as a scroll or gerotor (see U.S. application Ser. No. 09/163,491 filed Nov. 17, 1998 all of which in herein incorporated by reference as if completely written herein) using a low-boiling organic working fluid, the system is capable of providing fresh potable hot water and refrigeration (load 150) for meats and dairy products. A coefficient of performance (COP) of near 1.0 can be achieved using an ammonia water absorption system. A backup heat source 50 can be powered by wood, cow dung, biomass, gas, oil or any other alternative energy source when solar energy is not available. By coupling the heat engine to the absorber and condenser of the absorption heat transfer cycle 60, the output from the available energy source is essentially doubled.

Figure 14:
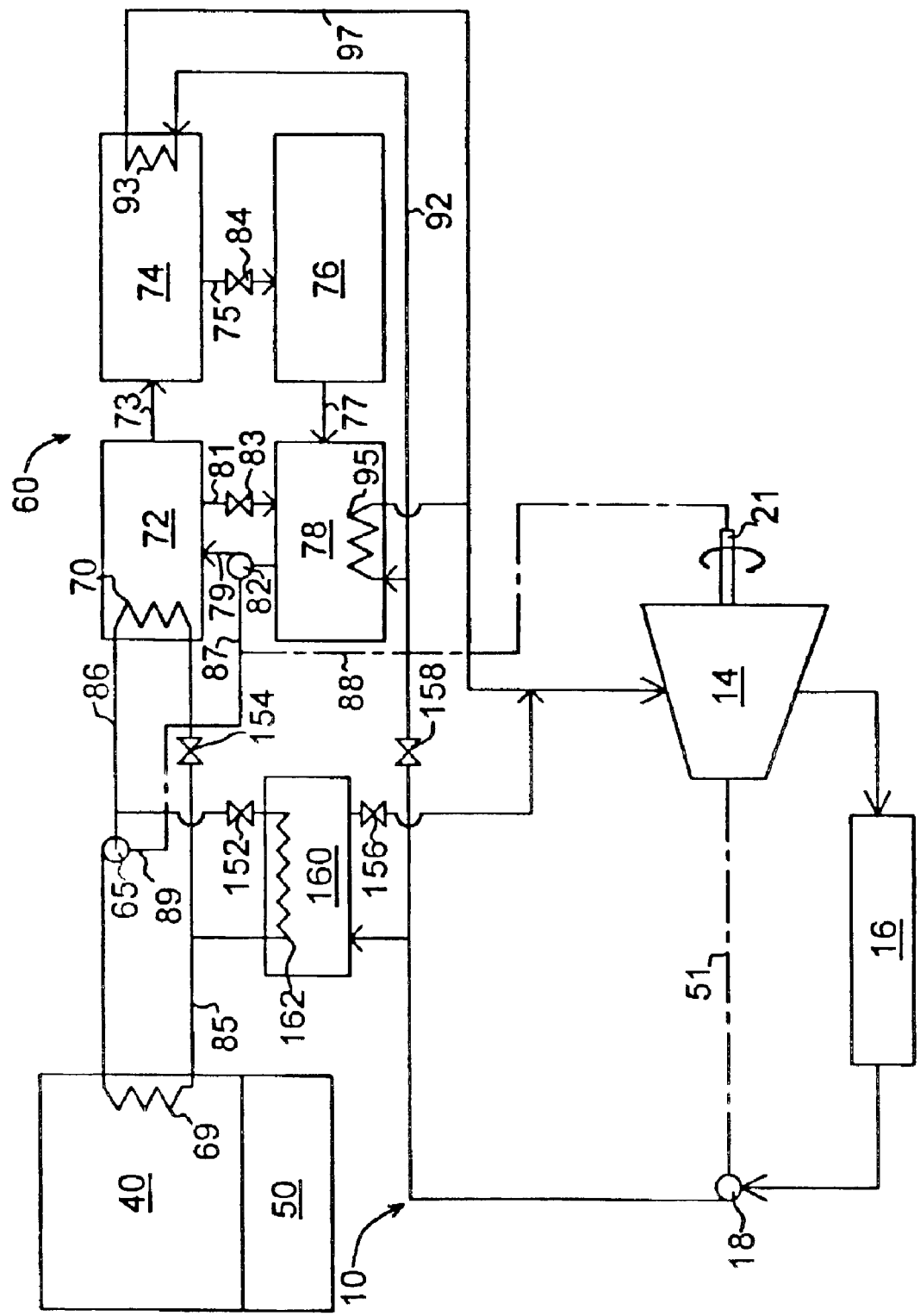
FIG. 14 is a schematic view of the present invention illustrating the use of the condenser and absorber of an absorption heat transfer device as the boiler of a heat engine with a backup boiler and backup heat source.

As shown in FIG. 14, when the absorption heat transfer cycle 60 is not needed for refrigeration (cooling), valves 152, 154, 156, and 158 are used in conjunction with backup boiler 160 to heat directly the working fluid in heat engine 10. When valves 154 and 158 are closed, that is, cooling is not required, valves 152 and 156 are open to allow direct heating of boiler 160. In this arrangement, the working fluid of engine 10 bypasses the absorber 78 and condenser 74 heat exchangers 93 and 95 and heat from heat source 40 is used to heat the working fluid using backup boiler 160 via exchanger 162. In addition, backup heat source 50 can also be used to heat the standby boiler 160.

Figure 15:
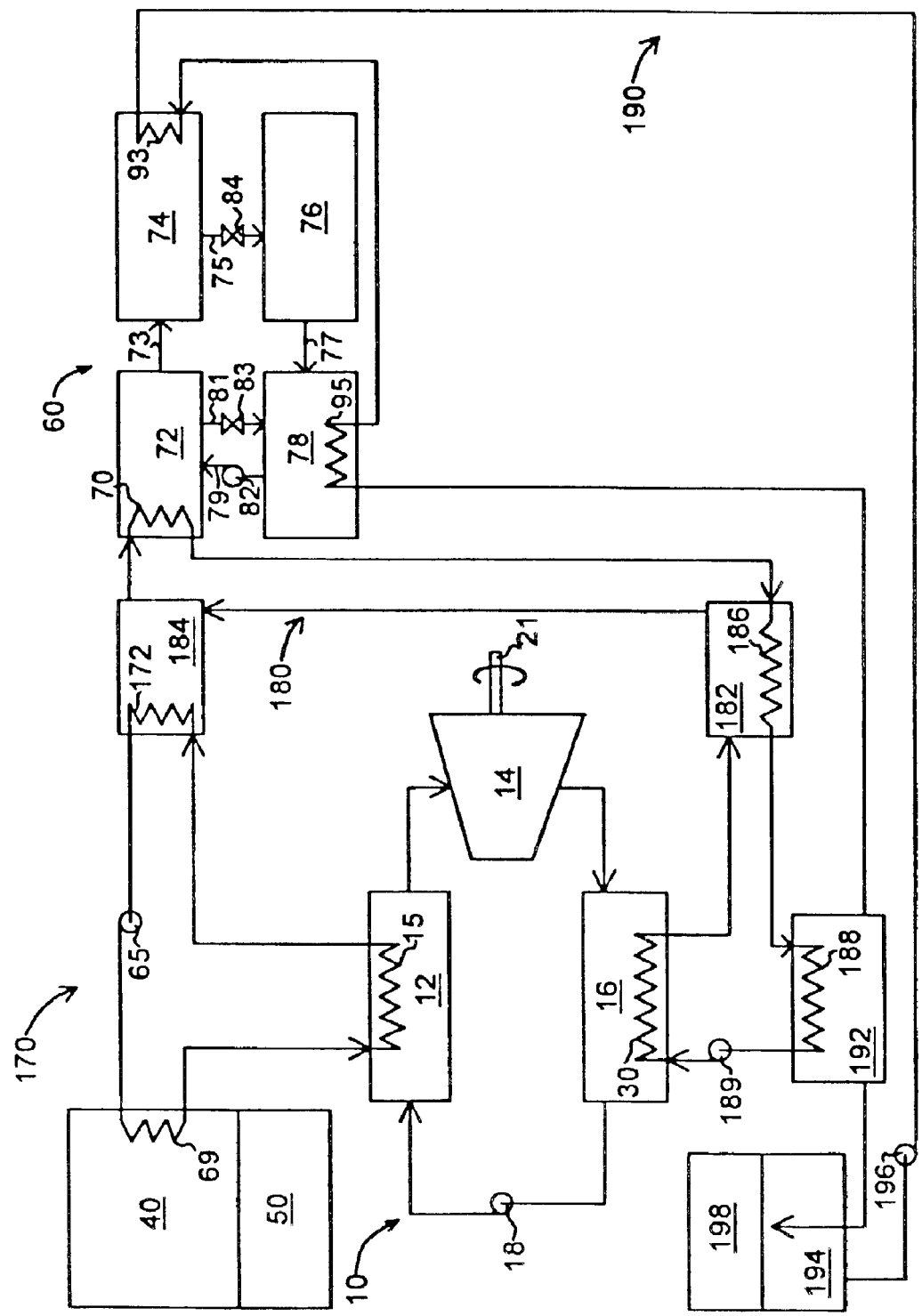
FIG. 15 is a schematic view of the present invention illustrating the use of a three loop heat-transfer fluid arrangement in which a first loop transfers heat source heat to the boiler of a heat engine and a first to second loop heat exchanger, a second loop transfers heat to a generator of an absorption heat transfer device, a second loop recuperator, a second to third loop heat exchanger, and receives heat from the heat engine condenser, the second loop recuperator and the first to second loop heat exchanger; and a third heat transfer loop receives heat from the absorber, absorption condenser, second to third heat exchanger and heat engine condenser and delivers them to a heat sink.

FIG. 15 illustrates a heat engine and absorption heat transfer system using three heat-exchange loops (a high-temperature heat exchange loop 170, and intermediate-temperature heat exchange loop 180, and a low-temperature heat exchange loop 190) for transferring heat among the components of a heat engine 10 and an absorption heat transfer device 60.

The high-temperature heat-exchange loop comprises an interconnected a) heat-source heat exchanger 69 for receiving heat from a heat source 40, b) a heat-engine boiler heat exchanger 15 for transferring heat to boiler 12, c) a high-temperature loop heat exchanger 172 for transferring heat to an intermediate-temperature heat transfer fluid in first intermediate-temperature heat exchanger 184, and d) a high-temperature loop pump 65 for circulating a high-temperature loop heat-transfer medium through the high-temperature loop 170. A backup heat source 50 can be used with the primary heat source 40 when the primary source is not available, e.g., solar panels at night or during period of inclement weather.

The intermediate-temperature heat exchange loop 180 comprises interconnected a) heat-engine condenser heat exchanger 30 for receiving heat from the heat-engine condenser 16, b) a recuperator 182 used in conjunction with recuperator heat exchanger 186 for transferring heat between portions of the intermediate heat transfer loop 180, c) a first intermediate-temperature loop heat exchanger 184 for receiving heat from the high-temperature loop heat exchanger 172, d) a generator heat exchanger 70 for transferring heat to generator 72, e) a recuperator heat exchanger 186 used in conjunction with recuperator 182 to transfer heat between portions of the intermediate heat exchange loop 180, f) a second intermediate-temperature loop heat exchanger 188 for transferring heat to low-temperature loop heat exchanger 192, and g) an intermediate-temperature pump 189 for circulating an intermediate-temperature loop, heat-transfer fluid in said intermediate-temperature heat exchange loop 180.

The low temperature heat-exchange loop has interconnected components comprising: a) absorption heat-transfer device condenser heat exchanger 93 for receiving heat from the condenser 74, b) an absorber heat exchanger 95 for receiving heat from absorber 78, c) a low-temperature loop heat exchanger 192 for receiving heat from intermediate-temperature heat-exchanger 188, d) heat-sink heat exchanger 194 for exchanging heat to a heat sink 198, and e) a low-temperature pump 196 for circulating a low-temperature heat transfer fluid in said low temperature loop 190.

As described previously, the heat engine 10 comprises an interconnected a) boiler, b) expander, c) heat-engine condenser, and d) heat-engine pump for circulating a working fluid through the heat engine. For low-temperature heat sources such as solar panels, the working fluid is a low boiling organic fluid. The superheated working fluid coming from expander 14 can be effectively used to preheat the working fluid prior to entry into the boiler and to capture lost work heat from expander 14 and one or more of the system pumps 18, 65, 82, 189, and 196 (See FIGS. 2–7 and the above explanation thereof). The expander 14 is a positive displacement device such as a scroll expander or a gerotor. The work output 21 of expander 14 can be used to operate one or more of the systems pumps (discussed previously and omitted from the drawings for clarity) or alternatively used to power a generator (FIG. 2) which in turn provides power for electrical system pumps.

The absorption heat-transfer device comprises an interconnected a) generator, b) absorber, c) absorption device condenser, and d) evaporator as previously discussed. Various forms of the basic absorption heat transfer device can be used including the generator-absorber heat transfer design (FIG. 13) and other double and triple effect designs.

The heat transfer device can be used either as a chiller by using the evaporator 76 to cool a desired space. Or the heat transfer device can be used as a heat pump for both heating and cooling purposes. For heating, the heat expelled by the condenser and absorber is used to heat the desired space (heat sink 198) with the evaporator drawing heat from the outdoor environment. For cooling, the heat sink becomes the outdoor environment with heat being expelled from the absorber and condenser to the outdoors while the evaporator is used to cool the living space. Alternatively and as shown in FIGS. 6, 7 and 13 the low-temperature loop 190 can be used with water from an underground reservoir as the heat sink. This has the further advantages of providing a lower heat sink temperature for greater operational efficiencies as well as providing a source of hot potable water. Using the heat engine and absorption heat transfer system shown in FIG. 15 with a solar panel heat source 40, the absorption heat transfer device as a chiller 60 and a liquid cooling tower 194 to transfer heat to the outdoors, the following temperatures are achieved: 1) 400° F. (204° C.) at the boiler exchanger 15 input, 2) about 167° F. (75° C.) at the heat-engine condenser 16, 3) 200° F. (93° C.) at the input to the generator exchanger 70, 4) 190° F. (88° C.) at the output from the generator exchanger 70, 5) 170° F. (77° C.) at the output from the recuperator heat exchanger 186, 6) 165° F. (74° C.) at the input to the recuperator 182, and 7) 180° F. (82° C.) at the output from recuperator 182.

Figure 16:
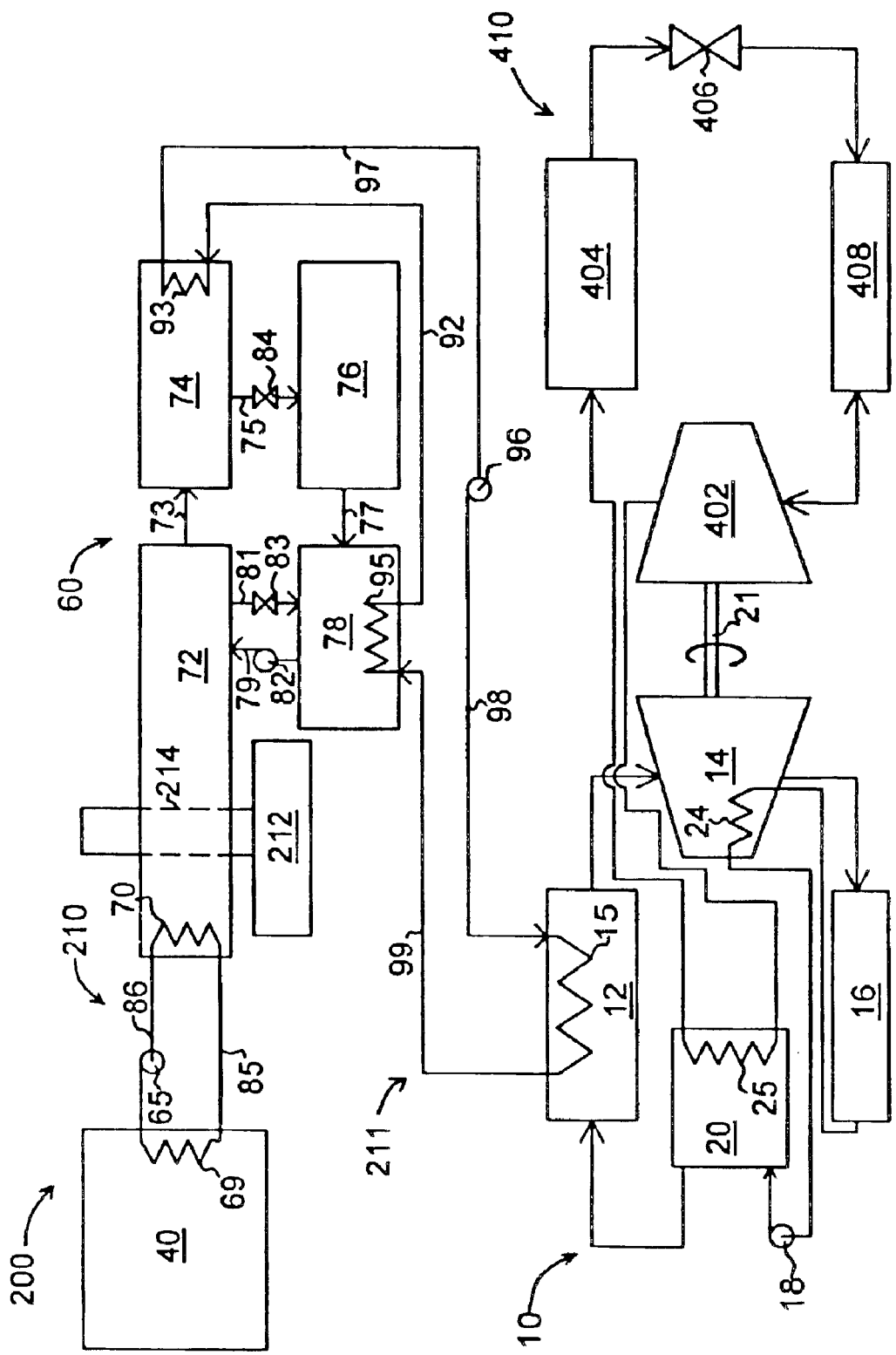
FIG. 16 is a schematic representation of the use of a double heated generator in which one heat source is used to the generator by means of a heat-transfer fluid loop and a second heat source heats the generator directly. A second heat-transfer fluid loop uses condenser and absorber heat to heat a heat engine boiler.
Figure 17:
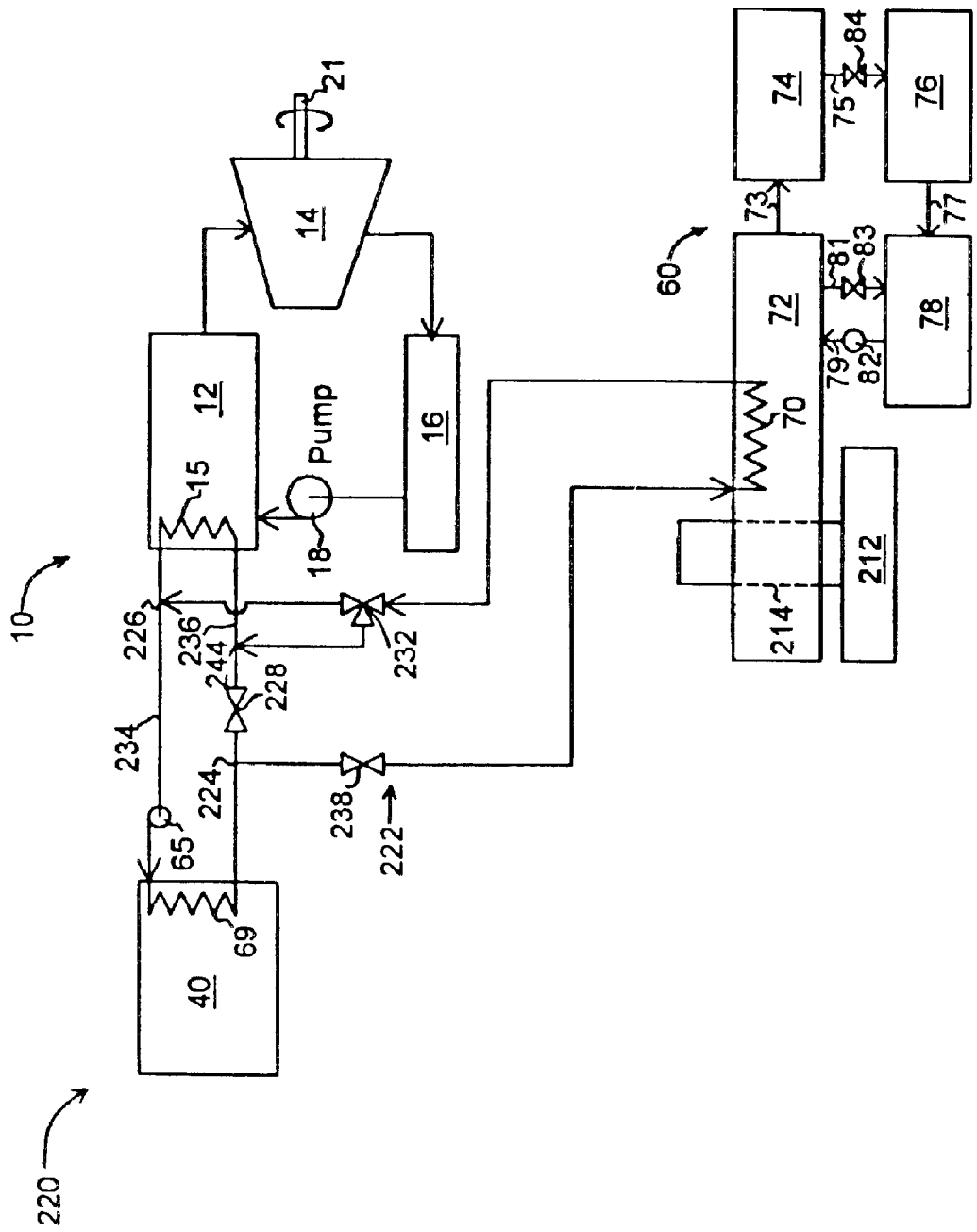
FIG. 17 is a schematic representation of another embodiment of a double heated generator in which a first heat source is used to heat a heat engine boiler and an absorption generator by means of a heat-transfer fluid loop. A second heat source heats the generator directly.
Figure 18:
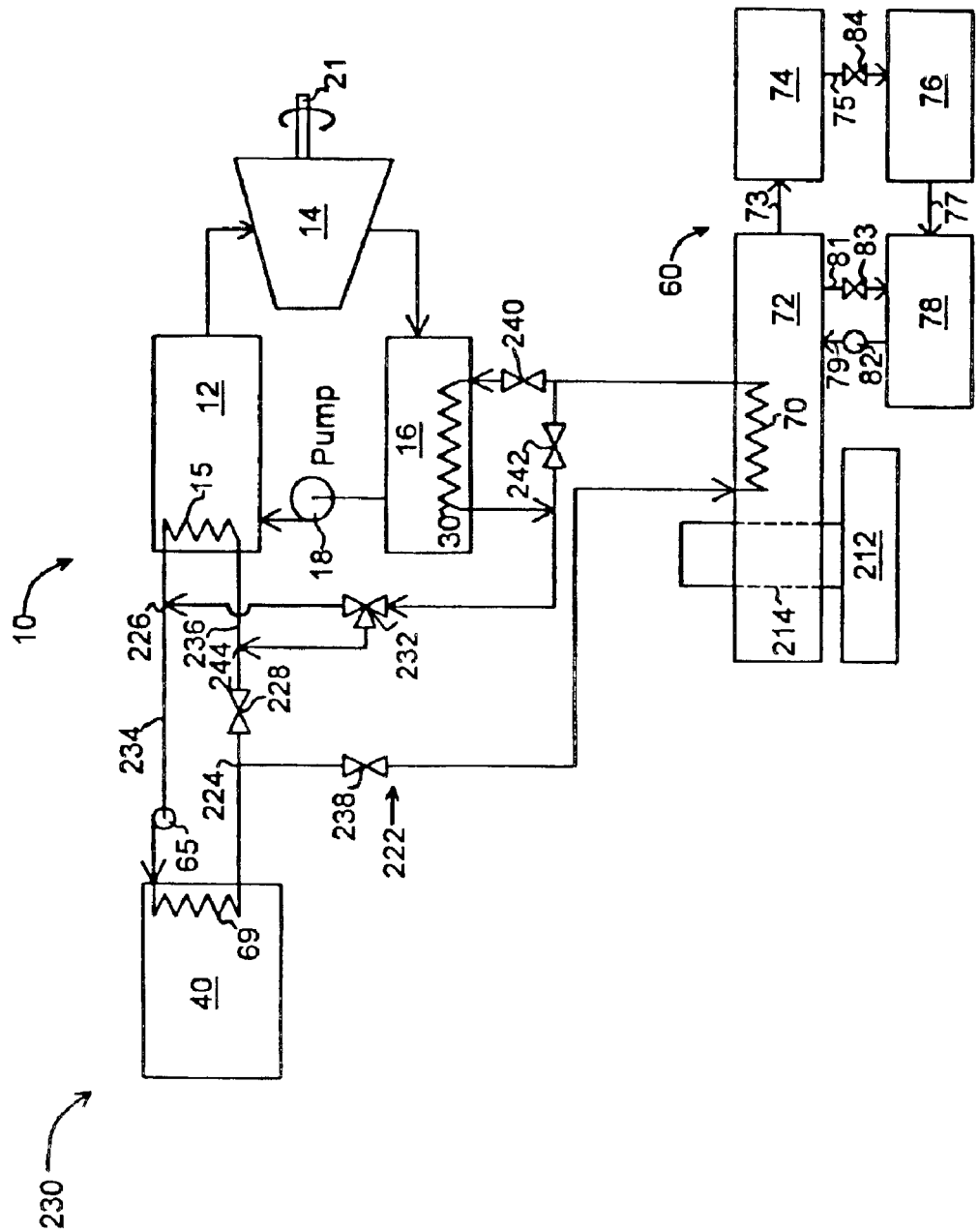
FIG. 18 is a schematic representation of yet another embodiment of a double heated generator similar to that of FIG. 17 with the additional feature that the heat transfer fluid from the generator is used to cool the heat engine condenser.
Figure 19:
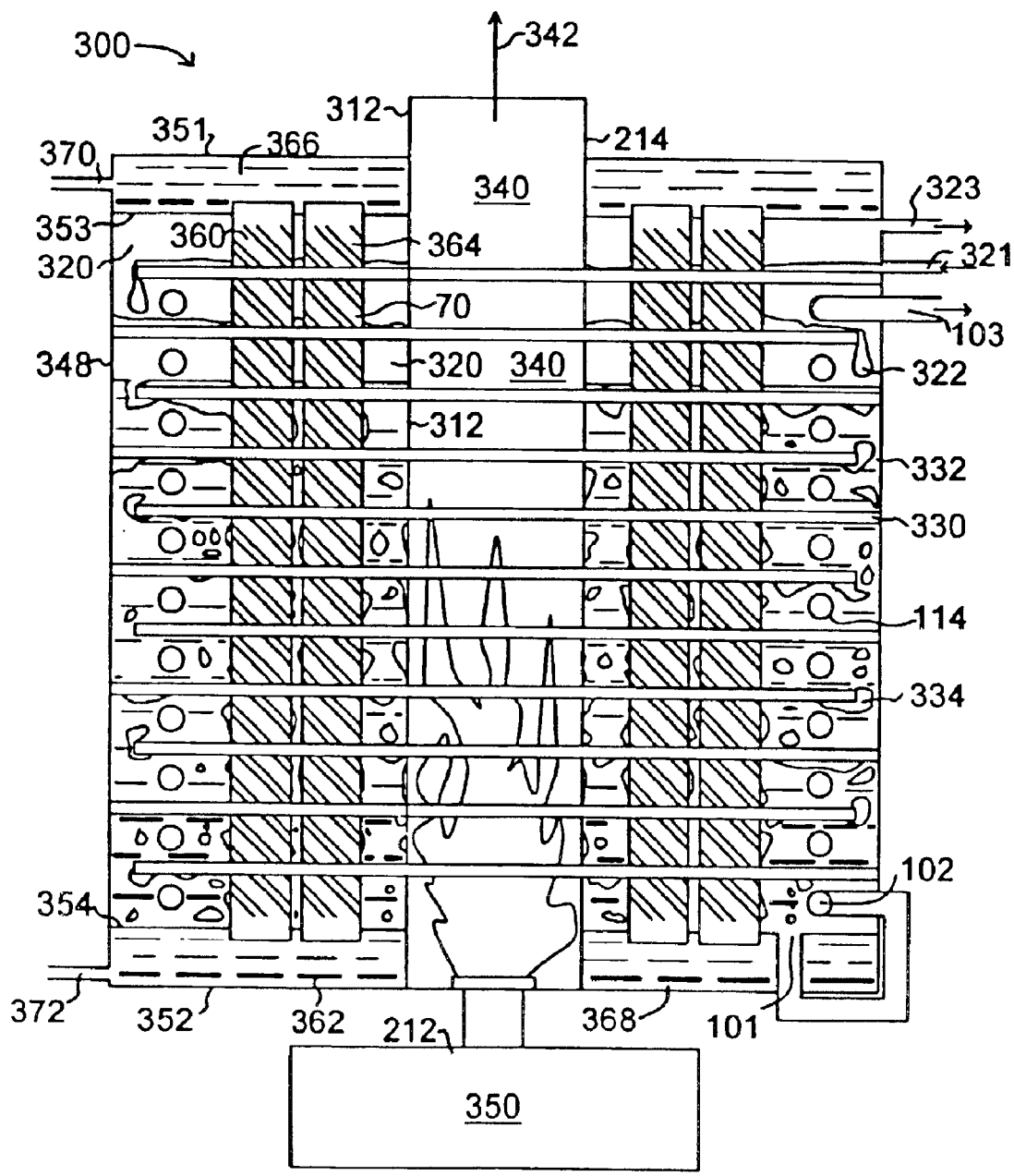
FIG. 19 is a cut-away view of a double heated generator illustrating its three fluid spaces, the use of a burner to heat the second fluid space and a heat transfer fluid to heat the third fluid space. Distribution plates with apertures are used to control the flow of liquids and vapors within the first fluid space.

FIGS. 16–20 illustrates heat engine and absorption heat transfer systems 200, 220 and 230 that utilize a dual-heat generator 72 that can be heated with the first heat source 40 or a second heat source 212 or both. As noted previously, the first heat source 40 can be any of a variety of energy sources including low-temperature energy sources such as solar, waste exhaust, and geothermal sources. The second heat source 212 is typically a gas burner (FIG. 19) using a variety of gas sources including propane, natural gas, bio-gas, etc. Heat source 212 heats a heat exchanger 214 to transfer heat to generator 72. As seen in FIG. 19, hot combustion products (shown by arrows 342 in FIG. 19) from burner 212 heat the heat-exchanger 214, typically a round cylinder or vertical tube, contacting the generator fluid. In FIGS. 16–18, the use of a second heat source 212 allows continued operation of both the absorption heat transfer device 60 and the heat engine 10 when the first heat source 40 may not be available. For example, if the first heat source 40 is a solar array, it is desirable to have a second heat source 212 available during the night or periods of poor weather when solar energy is not available or when the demands on the absorption heat transfer device exceed the available energy available from heat source 40.

In FIG. 16, the dual-heat device comprises two heat sources 40 and 212 that heat a generator 72 of an absorption device 60. The condenser 74 and absorber 78 of the absorption device 60 heat the boiler 12 of heat engine 10. The absorption heat-transfer device 60 comprises an interconnected absorption device components of a) generator 72, b) absorber 78, c) absorption device condenser 74, d) evaporator 76, and pump 82. Pressure devices 83 and 84 are used to maintain a pressure differential between the generator 72 and absorber 78 and the condenser 74 and evaporator 76, respectively.

A high-temperature heat-exchange loop 210 contains an interconnected loop components including a) a heat-source heat exchanger 69, b) a generator first heat exchanger 70, and c) a high-temperature pump 65 for circulating a heat-transfer medium in the components of the high-temperature loop 210. Pump 65 pumps cool heat-transfer fluid in line 86 from the outlet of generator first heat exchanger 70 to the inlet of heat source heat-exchanger 69 where it picks up heat from heat source 40 from which it flows via conduit 85 back to generator first heat exchanger 70 where heat is transferred to generator 72 after which the heat-transfer medium is pumped from exchanger 70 to repeat the cycle.

Heat engine 10 has interconnected heat-engine components comprising a) a boiler, b) an expander, c) a heat-engine condenser, and d) a heat-engine pump for circulating a working fluid through the heat engine components. A low-temperature heat-exchange loop 211 comprises interconnected components of a) an absorption heat-transfer device condenser heat exchanger 93, b) an absorber heat exchanger 95, c) a boiler heat exchanger 15, and d) a low-temperature pump 96 for circulating a heat-transfer medium in low-temperature loop 211. Relatively cool heat transfer fluid from the boiler exchanger 15 flows in line 99 to the absorber exchanger 95 where its acquires heat from absorber 78. The heat transfer fluid leaves absorber 95 and flows in line 92 to the condenser exchanger 93 where it acquires additional heat from the condensation process occurring in condenser 74. The hot heat transfer fluid is pumped from condenser exchanger 93 to pump 96 in line 97 and from the pump 96 to the inlet of boiler exchanger 15 in line 98. Boiler exchanger 15 transfers heat to the heat-engine working fluid, typically a low boiling organic fluid, to evaporate the heat-engine working fluid, after which the heat-transfer fluid of loop 211 leaves boiler exchanger 15 and flows back to absorber heat exchanger 95 to again repeat the process.

FIG. 17 illustrates a heat engine and absorption heat transfer system 220 using a dual-heat generator 72 in which heat source 40 heats both boiler 12 of the heat engine and generator 72 of the absorption heat transfer device 60. In addition to the heat provided by heat source 40, generator 72 is also heated with heat source 212, typically a gas-burner heating exchanger surface 214. Either heat source 40 or heat source 212 or both can be used to heat both boiler 12 and generator 72. System 220 comprises a heat engine 10, an absorption heat transfer device 60, and a heat transfer loop 222.

The absorption heat-transfer device 60 comprises interconnected components of a) a generator 72, b) an absorber 78, c) an absorption device condenser 74, and d) an evaporator. The heat engine comprises interconnected components of a) boiler 12, b) an expander 14, c) a heat-engine condenser 16, and d) a heat-engine pump 18 for circulating a working fluid through said heat engine. A heat-exchange loop 222 comprises interconnected loop components of a) a heat-source heat exchanger 69, b) a generator first heat exchanger 70, c) a boiler heat exchanger 15, and a pump 65 for circulating a heat-transfer medium through the components of heat transfer loop 222.

The first heat source 40 is configured to transfer heat to heat-source heat exchanger 69. The second heat source 212 is configured to transfer heat to a generator second heat exchanger 214. The generator second heat exchanger 214 transfers heat to generator 72. The heat-engine boiler heat exchanger 15 transfers heat to boiler 12. The generator first heat exchanger 70 can transfer heat to or from generator 72 depending on the availability of heat source 40.

When heat source 40 is operational, pump 65 pumps relatively cool heat transfer fluid to heat exchanger 69 where it picks up heat from heat source 40. The heat transfer fluid leaves heat source heat exchanger 69 and passes to tee 224 where it is divided and passes both 1) to boiler heat exchanger 15 where it exchanges heat to boiler 12 and then is pumped back to the heat source heat exchanger 69 by pump 65, and 2) to generator heat exchanger 70 where it heats generator 72. After leaving generator heat exchanger 70, the heat transfer fluid passes to three way valve 232 which is set to return the heat-transfer fluid to either line 234 or line 238. If heat source 212 is not operational, the heat transfer fluid is returned to line 234 since it is cooler than the heat-transfer fluid being delivered to boiler exchanger 15. If heat source 212 is operational, then the heat transfer fluid valve 232 is set to return the heat transfer fluid to either line 234 or line 236 depending on its temperature. If the heat-transfer fluid is hotter than the heat transfer fluid coming from heat exchanger 69 and going to boiler exchanger 15, valve 232 is set to deliver the heat exchange fluid to line 236 for supplemental heating of boiler 12. If the heat-transfer fluid is cooler than the heat transfer fluid coming from heat exchanger 69 and going to boiler exchanger 15, valve 232 is set to deliver the heat exchange fluid to line 234. If heat source 40 is not operational, all heat is derived from heat source 212. In this situation, valve 232 is set to deliver the heat-transfer fluid to line 236 for heating of boiler exchanger 15. Valves 228 and 238 are used to provided either series or parallel heat transfer fluid to generator and boiler heat exchangers 70 and 15, respectively. Valves 228 and 232 can be used to deliver heat from heat source 40 to either boiler exchanger 15 by itself or to generator exchanger 70 by itself. Setting valve 232 to deliver heat transfer fluid to line 226 and closing valve 228 provides heat from heat source 40 only to generator 72. Closing valve 238 and opening 228 provides heat from heat source 40 only to boiler 12.

FIG. 18 is identical with FIG. 17 except that it allows for the use of relatively cool heat transfer fluid from generator exchanger 72 to cool heat-engine condenser 16 via condenser heat-exchanger 30. When this condition prevails, such as when generator 72 is heated only by heat source 40, valves 240 and 242 are set to allow for heat transfer fluid to flow through condenser exchanger 3b, that is, valve 240 is open and valve 242 is closed. When the heat transfer fluid is too hot to cool condenser 16, valves 240 and 242 are set to bypass condenser exchanger 30, that is, valve 240 is closed and valve 242 is opened.

Figure 20:
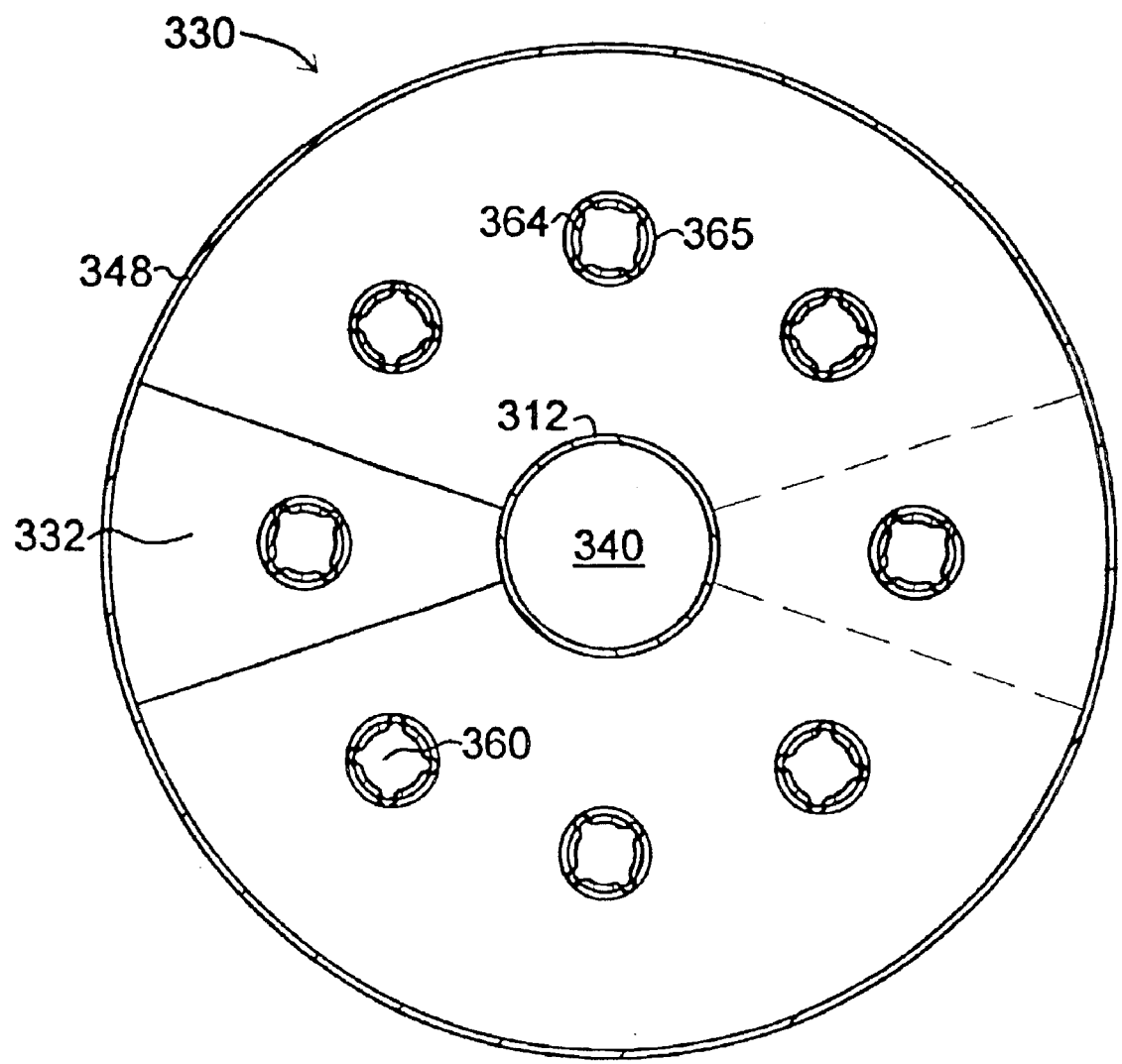
FIG. 20 is a top view of a distribution plate found in the embodiment of FIG. 19 illustrating the distribution plate apertures and arrangement and the position of spiral twisted fluted tubes passing through the distribution plates.
Figure 21:
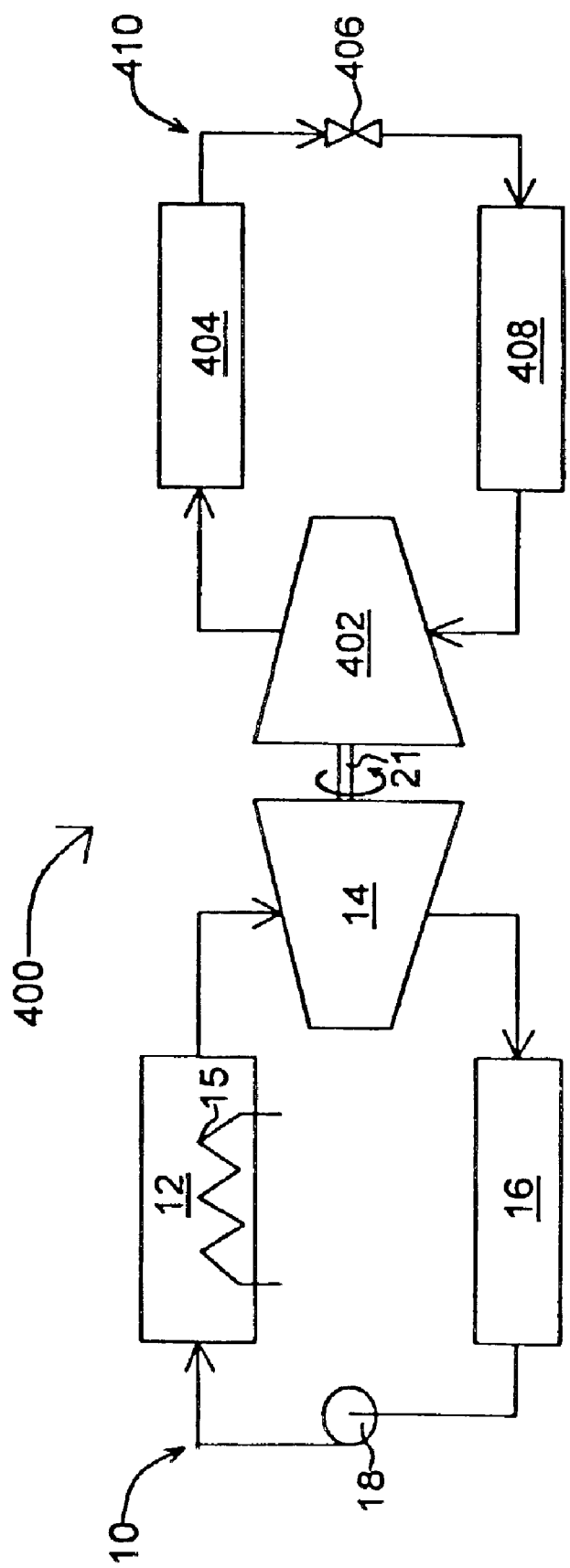
FIG. 21 is a schematic representation of a close-coupled heat engine and compression device.

With reference to FIGS. 19 and 20 and associated FIGS. 16–18, a dual-heat generator 300 is shown having 1) a substantially vertical heat-exchange surface 214 such as vertical tube 312 that separates a first fluid containing space 320 from a second fluid containing space 340 and 2) a substantially second vertical surface 364 such as spiral twisted fluted tube 364 separating the first fluid space 320 from a third fluid space 360. The first fluid space 320 contains: 1) a downward flowing liquid 322 typically in at least a partially flooded state, 2) an upward flowing gas such as vapor 334 at least partially contained in the downward flowing liquid 322, and 3) a fluid distribution surface 330. An aperture 332 in the fluid distribution surface 330 provides for and facilitates 1) the downward passage and distribution of the downward flowing liquid 322 and 2) the upward passage and distribution of the upward flowing gas (vapor) 334 in the first fluid space 320. The second fluid space 340 contains a first fluid, typically suitable for heat-exchange, in liquid, gaseous and/or solid particulate form such as combustion products 342. The third fluid space 360 contains a second heat-transfer fluid 362 transferring heat with respect to said first fluid space 320.

In FIG. 19, the fluid distribution surface 330 is substantially perpendicular with respect to 1) the first vertical surface 214 (shown as cylinder 312) separating the first fluid space 320 from the second fluid space 340 and 2) the second vertical surface, i.e., tubes 364, separating the first fluid space 320 from said the third fluid space 360. That is, the fluid distribution surface 330 is essentially a horizontal or flat plate. As shown in FIG. 19, the first fluid space 320 is an annular space formed by an enclosure comprising the vertical surface formed by the outer wall of an inner cylinder 312, outer cylinder 348, upper separator plate 353, and lower separator plate 354 while the second fluid space 340 is cylindrical in shape and formed by open cylinder 312.

As seen in FIG. 20, fluid distribution surface 330 is circular shaped plate with a segment removed to define aperture 332. A plurality of similarly shaped plates 330 are arranged in spaced-apart fashion within the first fluid space 320 so that apertures 332 alternate from one side of the annular first fluid space 320 to the other with each successively spaced adjacent plate 330. That is, aperture 332 is rotated 180 degrees with each successive lower plate as shown by the dashed lines in FIG. 20 corresponding to the aperture 332 of the plate 330 immediately below the illustrated plate. The aperture 332 in fluid distribution surface 330 is of sufficient size to pass both down flowing liquid and up flowing vapor.

In FIG. 19, the vertical surface 214 separating the first fluid space 320 from the third fluid space 360 is at least one vertical cylinder or tube 364 with several tubes typically being used (FIG. 20). The substantially vertical tubes 364 are joined at the top in an annular upper manifold 366 comprising a) an upper portion of outer cylinder 348, b) an upper portion of inner cylinder 312, c) a top 351, and d) an upper separation plate 353 and e) a first fluid passage 370. Similarly, tubes 364 are joined at the bottom in an annular lower manifold 368 comprising a) a lower portion of the outer cylinder 348, b) a lower portion of inner cylinder 312, c) a lower separation plate 354, d) a bottom 352 and e) a second fluid passage 372.

Preferably the tubes 364 are spiral twisted fluted tubes, that is, thin-wall tubes with ridges and valleys (flutes) spiraling around the exterior wall of the tube with corresponding ridges and valleys spiraling around the interior wall of the tube, that is, a ridge on the exterior to the tube is a valley or flute on the interior of the tube. See U.S. Pat. No. 3,730,229, D'Onofrio, all of which is incorporated herein as if completely written herein. The flow within tubes 364 (third fluid space 360) maybe upward in counter flow with respect to the down flowing fluid in the first fluid space 320 or in co-flow, i.e. downward in the same direction as the downward flowing fluid in the first fluid space 320. Thus passages 370 and 372 may serve as either inlets or outlets depending on the direction of fluid flow through the third fluid space. The extensive surface area of the twisted fluted tubes on both the interior and exterior surfaces facilitate good heat and mass transfer. The spiral flutes and ridges promote a long residence time with good mixing action for heat flow through the tubes and the separation of solution components on the exterior of the tubes. As shown in FIG. 20, distribution plates 330 have circular apertures 365 formed in them allowing for the insertion of said twisted fluted tubes 364 therein.

The configuration shown in FIGS. 19 and 20 forms a particularly effective generator 72 when used in the embodiments of the invention illustrated in FIGS. 16–18. The long liquid flow path as the liquid 322 flows downward through apertures 332 to the next lower fluid distribution plate 330, then horizontally along plate 330 to the next lower aperture 332 at the opposite side of the first fluid space 320 and then downward again through oppositely situated aperture 332 to the next lower plate 330 affords prolonged contact with the heat transfer surfaces of the device, that is, 1) vertical surface 312 separating the first fluid space 320 from the second fluid space 340 containing, for example, hot combustion products 342, 2) the fluid distribution plates 330 which are in heat transfer relation with the vertical surface 312, and 3) the vertical tubes 364, separating the first fluid space 320 from the third fluid space 360 containing heat transfer fluid 362. Similarly the long flow path and facilitated liquid vapor contact through the first fluid space 320 allows for improved mass transfer from the liquid to the vapor state. When used as a generator, the fluid distribution plates 330 also serve to maintain a good concentration gradient from the top to the bottom of the first fluid space 320.

The first fluid space 320 receives a strong solution comprising an absorbent and a refrigerant through a first fluid space upper inlet 321. Desorbed refrigerant vapor leaves through upper outlet 323. It is to be realized that inlet 321 and outlet 323 could be combined into a single upper passage through which the strong solution enters first fluid space 320 and the refrigerant vapor leaves. After passing through first fluid space 320 all refrigerant is desorbed from the strong solution leaving a weak solution, i.e., essentially pure absorbent. The weak solution is typically at its highest temperature and leaves through lower passage (outlet) 101. To take advantage of the sensible heat found in the absorbent, it is passed to heat exchanger 114 through inlet 102 (also FIG. 13) to provide additional heat to the strong solution in first fluid space 320 after which it leaves exchanger 114 through outlet 103.

The generator 300 shown in FIGS. 19 and 20 is especially effective when used as part of an absorption heat transfer device 60 which in turn is combined with a heat engine 10 as further illustrated in FIGS. 16–18. A basic absorption heat-transfer device has been described previously and has interconnected absorption device components comprising 1) a generator 72, 2) an absorber, 78, 3) a condenser 74, and an evaporator 76. A pump 82 is used to pressurize the strong solution coming from the absorber 78 prior to entry into the generator 72. A pressure lowering device 83 is used to lower the pressure of the absorbent as it is returned to the absorber 78 from generator 72. A similar pressure device 84 is used to reduce the pressure of the condensed refrigerant as it goes from condenser 74 to the evaporator 76.

As seen in FIG. 16, the most basic configuration in which the generator device 300 (FIG. 19) can be used is with a first heat-transfer loop 210 having interconnected loop components comprising a) a heat-source heat exchanger 69, b) a generator heat exchanger 70, and c) a pump for circulating a heat transfer fluid through the first loop components. As is apparent, the third fluid space 360 of heat exchange device 300 becomes heat exchanger 70 and transfers heat from heat source 40 (via exchanger 69) to the strong solution in the first fluid space 320, i.e., the generator 72, where desorption of refrigerant from the strong solution takes place. As shown in FIGS. 10 and 17, a boiler heat exchanger 15 can be added to the heat source 40 heat-transfer loop to power heat engine 10.

Heat engine 10 comprises interconnected heat engine components comprising a boiler 12, an expander 14 such as a scroll or gerotor expander, a condenser 16 and a pump 18 for circulating a working fluid, preferably a low boiling organic compound, through the heat-engine components. The low boiling organic fluid not only offers the advantage of relatively low working temperatures but allows for the superheated organic fluid to be passed to a boiler pre-heater 20 as shown in FIG. 2 or otherwise used to capture work loss heat from the expander and one or more of the system pumps as shown in FIGS. 3–7.

Such a configuration takes advantage of the fact that both the heat engine 10 and heat transfer device 60 can be operated even when only one of the two heat sources, 40 or 212, is available. Thus if heat source 40 is a solar array and heat source 212 is a gas-burner, both the heat transfer device 60 and the heat engine 10 can continue to function at night or during periods of inclement weather when the heat source solar array 40 is not available for heat input.

As seen in FIG. 18, the heat engine condenser heat exchanger 30 can also be added to the heat source loop. Here the heat-exchange fluid in loop 222 passes from heat source heat exchanger 69 to either boiler heat exchanger 15 or generator heat exchanger 70 (third fluid space 360) or both to provide heat to each. Provided that the heat exchange fluid is sufficiently cool after transferring heat to the generator, the cool exchange fluid may be passed to the heat engine condenser heat exchanger 30 to cool condenser 16.

As shown in FIG. 16, advantage is taken of the availability of waste heat from absorber 78 and condenser 74 when the heat transfer device 60 is operating as a chiller for refrigeration purposes or in cooling mode for heat pump applications, by using a second heat-transfer loop 211. The second heat-transfer loop 211 consists of interconnected second loop components comprising a) a boiler heat exchanger 15, b) at least one of 1) an absorption, heat-transfer device condenser heat exchanger 93 and 2) an absorber heat exchanger 95, and c) a pump 96 for circulating a working fluid through said interconnected second loop components. Here rather than losing half of the heat source 40 and/or heat source 212 energy due to absorber and condenser heat expulsion to the environment, this heat is used to power boiler 12 which in turn drives the expander which provides useful work energy to operate pumps including water pumps for pumping water from underground reservoirs or to operate an electrical generator for electricity production.

Figure 28:
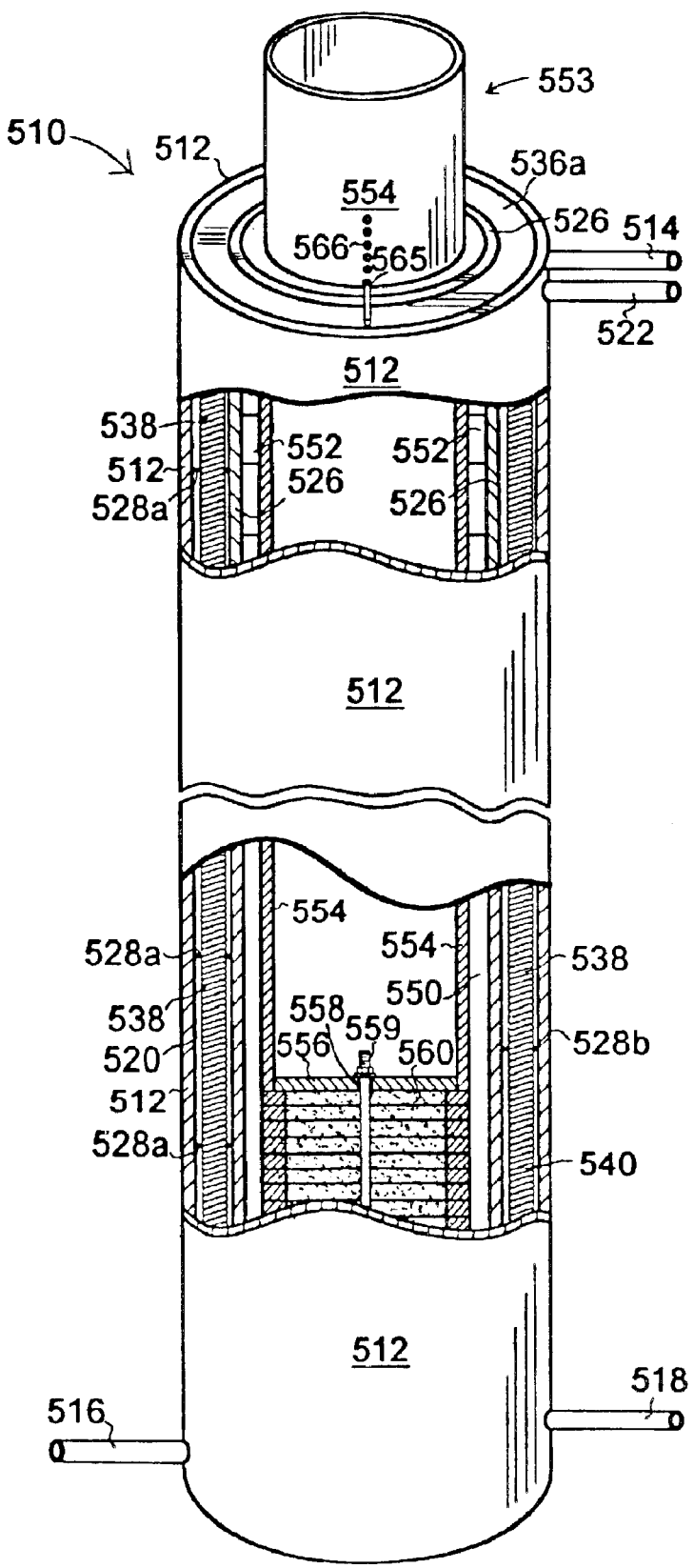
FIG. 28 is a partially broken away perspective view of another embodiment of the absorption heat transfer system generator of the present invention.
Figure 29:
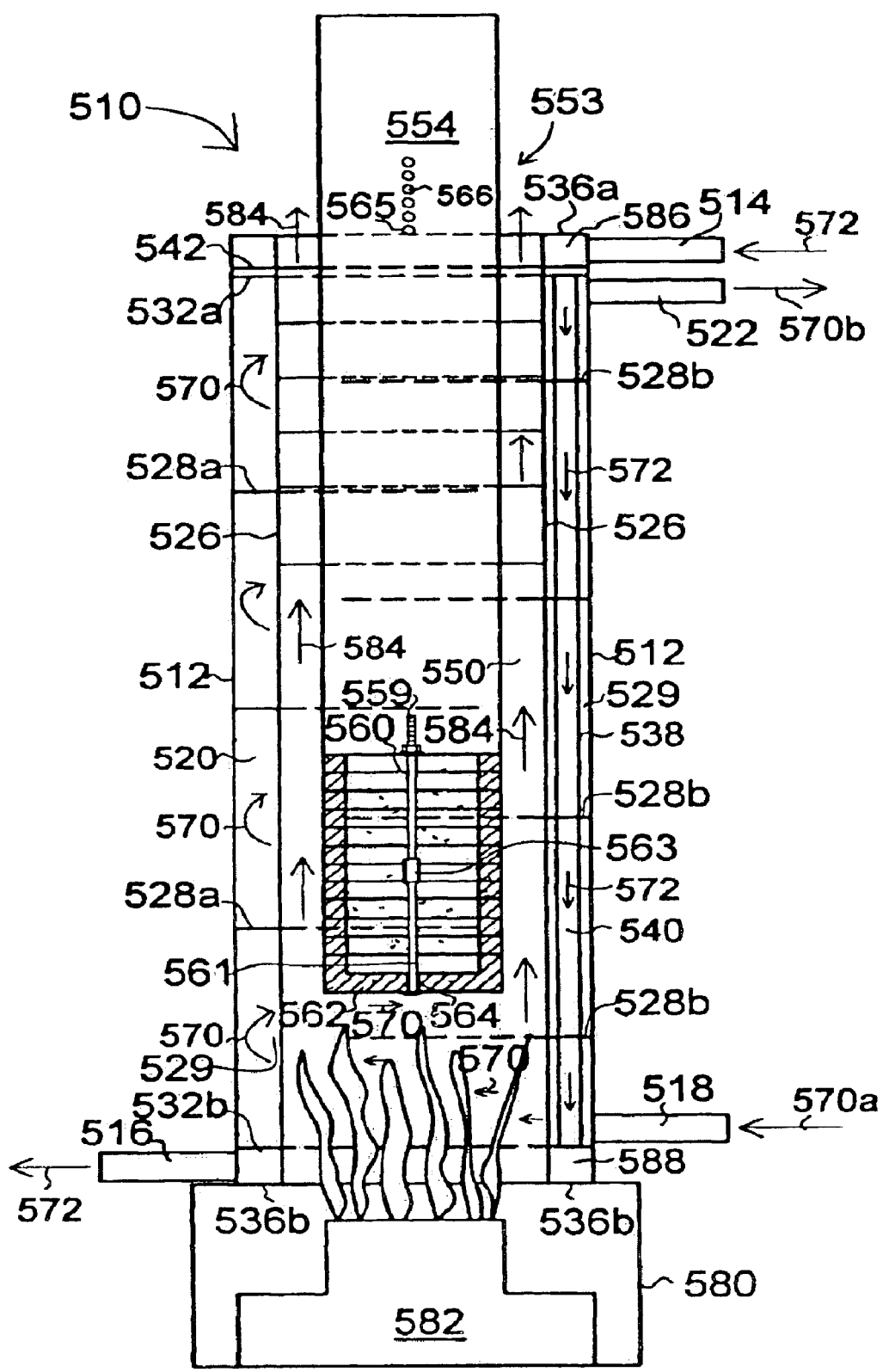
FIG. 29 is a cross sectional view of the embodiment of the absorption heat transfer system generator shown in FIG. 28.
Figure 30:
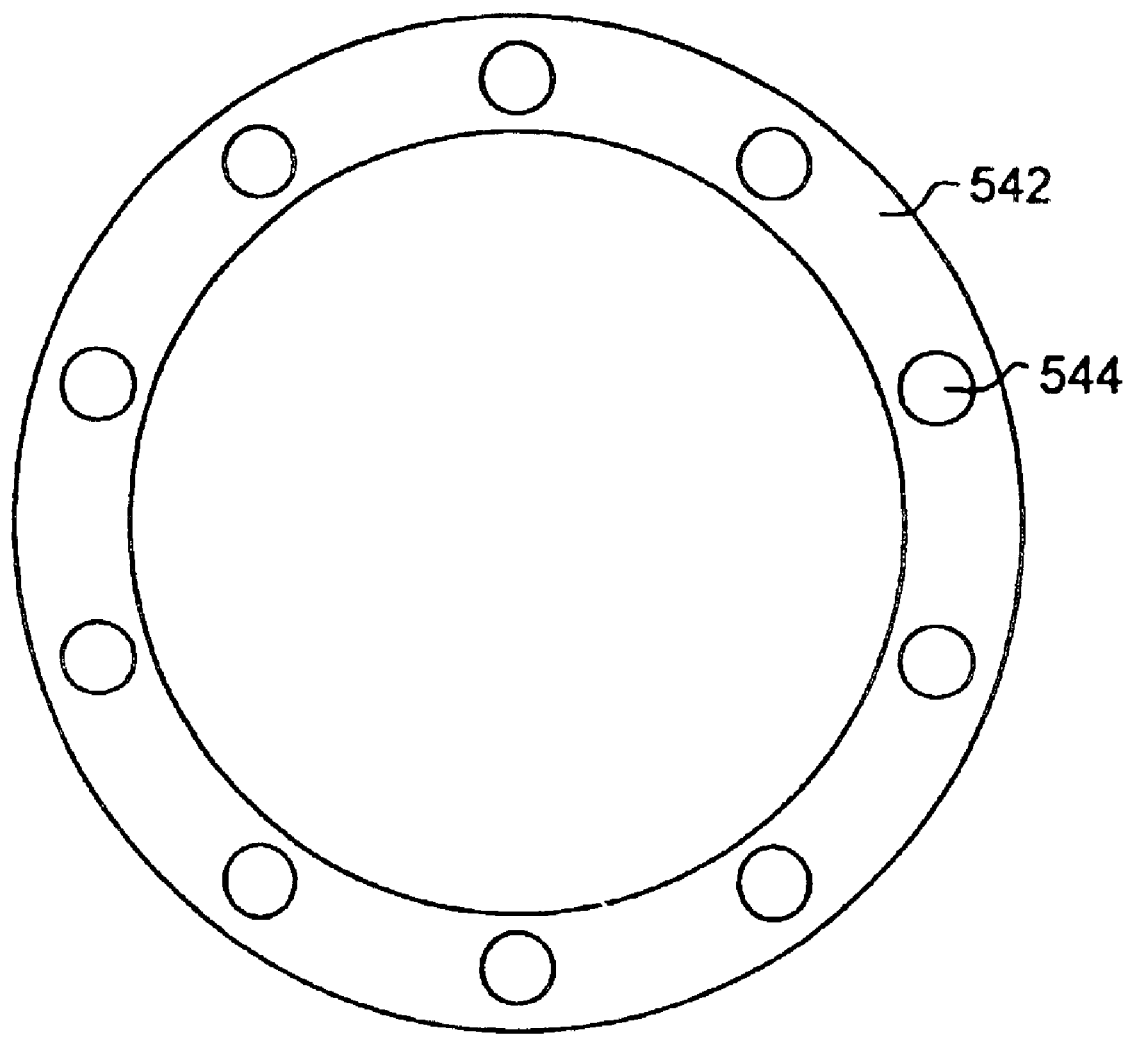
FIG. 30 is a top view of a fluid distribution plate used in the embodiment of the absorption heat transfer system generator as shown in FIGS. 28 and 29 for distribution of a heating fluid such as a heated fluid from a solar collecting array to the tubes constituting the second fluid space of the current invention.

FIGS. 28–36 and especially FIGS. 28 and 29, illustrate another embodiment of a dual heated generator which is designated generally by the numeral 510. Generator 510 is used typically in an absorption heat transfer system (designated by the numeral 600 in FIG. 37 where the generator is designated by the numeral 604) and comprises: 1) a first fluid space 520 containing a working solution 570, 2) a second fluid space 540 in heat exchange relation with the first fluid space 520 and containing a first heat exchange fluid 572, and 3) a third fluid space 550 in heat exchange relation with the first fluid space 520 and containing a second heat exchange 10 fluid 584. Either the first heat exchange fluid 572 or the second heat exchange fluid 584 can be used to heat the working solution 570 or both fluids 572 and 584 can be used to heat simultaneously the working solution 570. As noted previously, it is also possible that one of the heat exchange fluids can heat the working solution 570 which in turn heats the other heat exchange fluid which is then used to heat a boiler of a heat-engine cycle.

Figure 31:
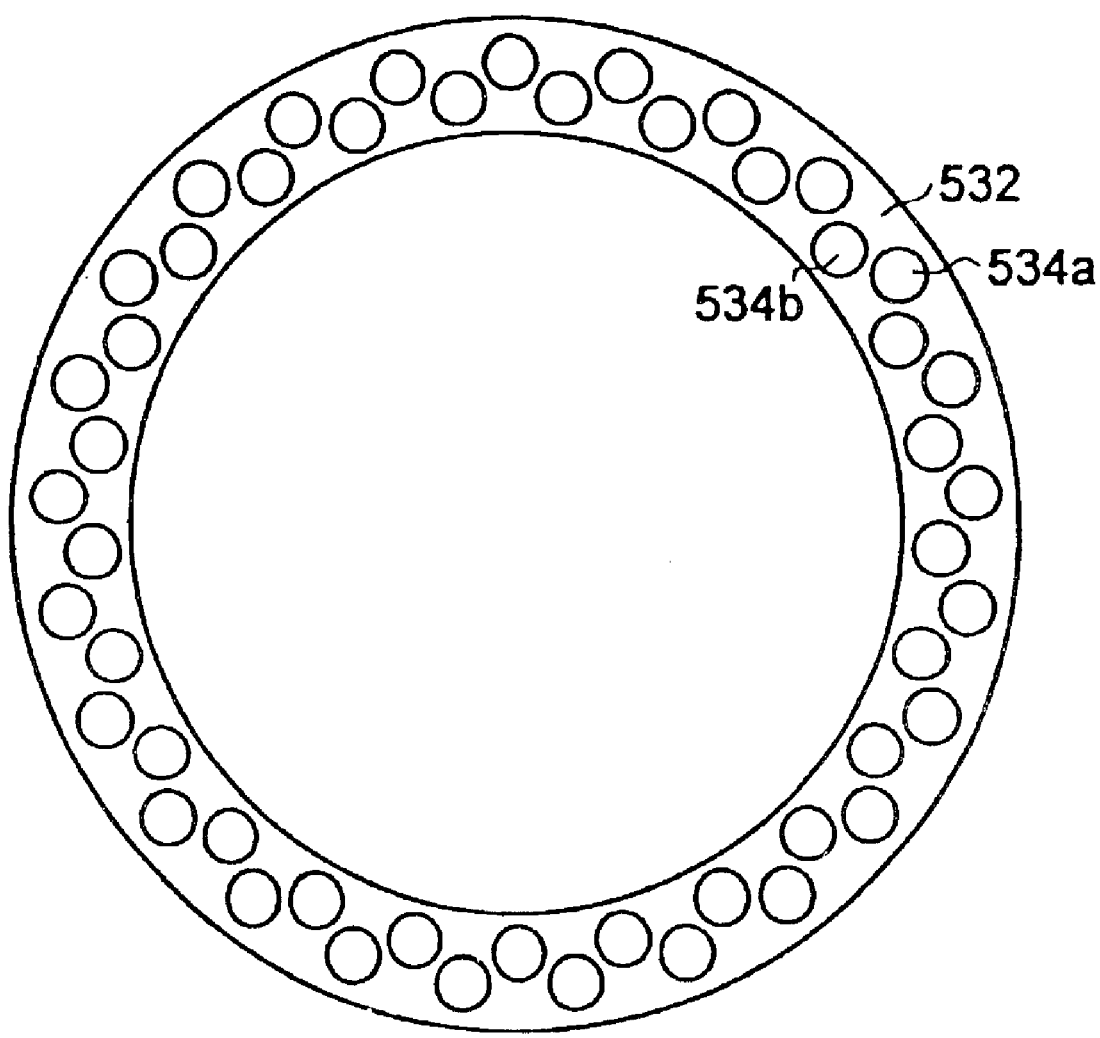
FIG. 31 is a top view of a header plate used in the embodiment of the absorption heat transfer system generator shown in FIGS. 28 and 29 for sealing the tubes of the second fluid space from the first fluid space.

As shown in FIGS. 28 and 29, the first fluid space 520 for the working solution 570 is an annular space formed from an outer cylinder 512 and an inner cylinder 526. The annular space 520 is sealed at the top with an annular upper header plate 532a and at the bottom with a lower annular header plate 532b. Header plates 532a and 532b are identical in configuration and generally designated by the numeral 532. As shown in FIG. 31, the header plate 532 contains apertures 534a and 534b that provide access to the second fluid space 540. As shown in FIG. 29, it is to be noted that the solid portion of the header plates seals working fluid space 520 from second fluid space 540. The first fluid space 520 containing the working fluid is also provided with inlet and outlet fluid tubes 518 and 522. Tube 518 or 522 may serve as either an inlet or outlet depending on the working fluid flow configuration within the first fluid space 520. Tube 518, located in the lower portion of first fluid space 520, serves as an inlet for incoming cold working fluid 570a and tube 522, located in the upper portion of first fluid space 520 serves as an outlet for exiting hot working solution 570b.

Figure 32:
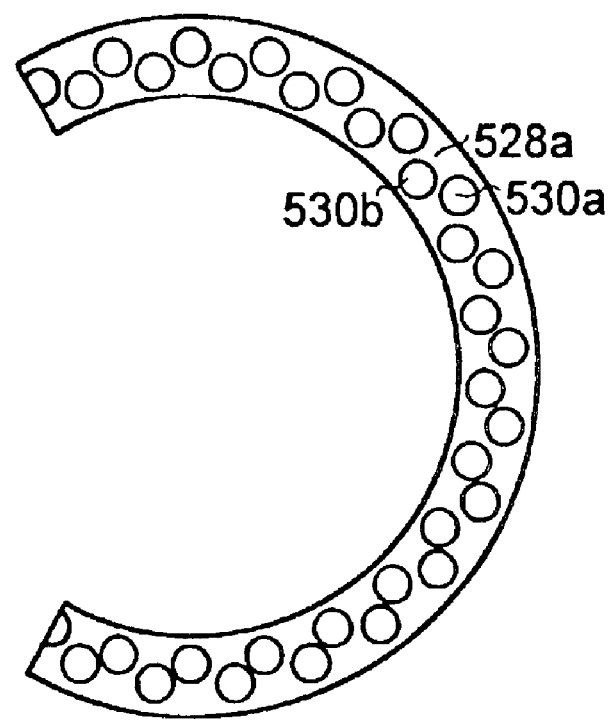
FIG. 32 is a top view of a sector baffle plate used in the embodiment of the absorption heat transfer system generator shown in FIGS. 28 and 29 for directing the flow of the working fluid in a generally horizontal direction with an upward bias, the upward bias produced by the open sector of the plate that allows the working fluid to move upward to the next baffle plate.
Figure 33:
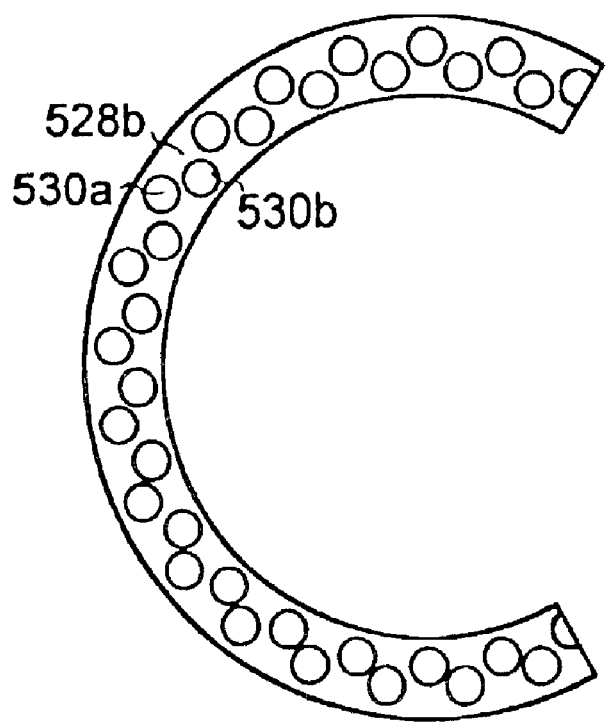
FIG. 33 is a top view of a sector baffle plate used in the embodiment of the absorption heat transfer system generator shown in FIGS. 28 and 29 for directing the flow of the working fluid in a generally horizontal direction with an upward bias, the upward bias produced by the open sector of the plate that allows the working fluid to move upward to the next baffle plate. The plates in FIGS. 32 and 33 successively alternate with respect to the direction of the open sector with each subsequent baffle plate as shown in FIGS. 28 and 29.

In order to facilitate and improve heat exchange with the second and third fluid spaces, 540 and 550, respectively, a plurality of spaced-apart baffle plates 528a, 528b can be used within the first fluid space 520. As shown in FIGS. 32 and 33, the baffle plates 528a, 528b contain sets of apertures 530a and 530b that accommodate the second fluid space 540 which in this embodiment is a set of twisted fluted tubes 538 (FIGS. 28 and 29). The baffle plates 528a, 528b are similar to the header plate 532 shown in FIG. 31 except for the removal of a sector to provide the open annular baffle plate configuration shown in FIGS. 33 and 34. As shown in FIG. 29, baffles 528a and 528b are arranged so that the open portion 529 alternates with each successive baffle plate.

Typically the interior edge of the open annular sector baffle plates 528a, 528b is attached to an exterior surface of the inner cylinder 526 and the exterior edge of the baffle plates 528a, 528b is attached to an interior surface of the outer cylinder 512. The baffle plates 528a, 528b are typically attached perpendicular to the inner cylinder 526 and the outer cylinder 512 and are oriented in an essentially horizontal direction.

Referring to FIG. 29, the working solution 570a enters through inlet 518 and flows between lower header plate 532b and the first baffle 528b between and among second fluid space tubes 538 in a generally horizontal direction (right to left) with an upward bias on each side of annulus 520 as shown by the small working solution arrows 570. On arriving at the far (left) end of first fluid space 520, the working solution flows upward though the open section 529 of baffle 528b and then flows in a generally horizontal direction with an upward bias between baffles 528b and 528a. That is, the flow of working solution 570 between baffles 528b and 528a is generally parallel with but in an opposite horizontal direction to the flow of working fluid between lower header plate 532b and first baffle 528b. On arriving at the opposite side of annulus 520, the working solution flows upward in the open sector of baffle 528a (at the far right of annulus 520 as shown in FIG. 29) and then flows in an opposite direction (toward the right side of annulus 520) with an upward bias between baffles 528a and 528b. This reversal of the upward biased flow of working solution continues at each succeeding level of baffles 528a and 528b until the working solution exits the annular space 520 through outlet 522.

Figure 34:
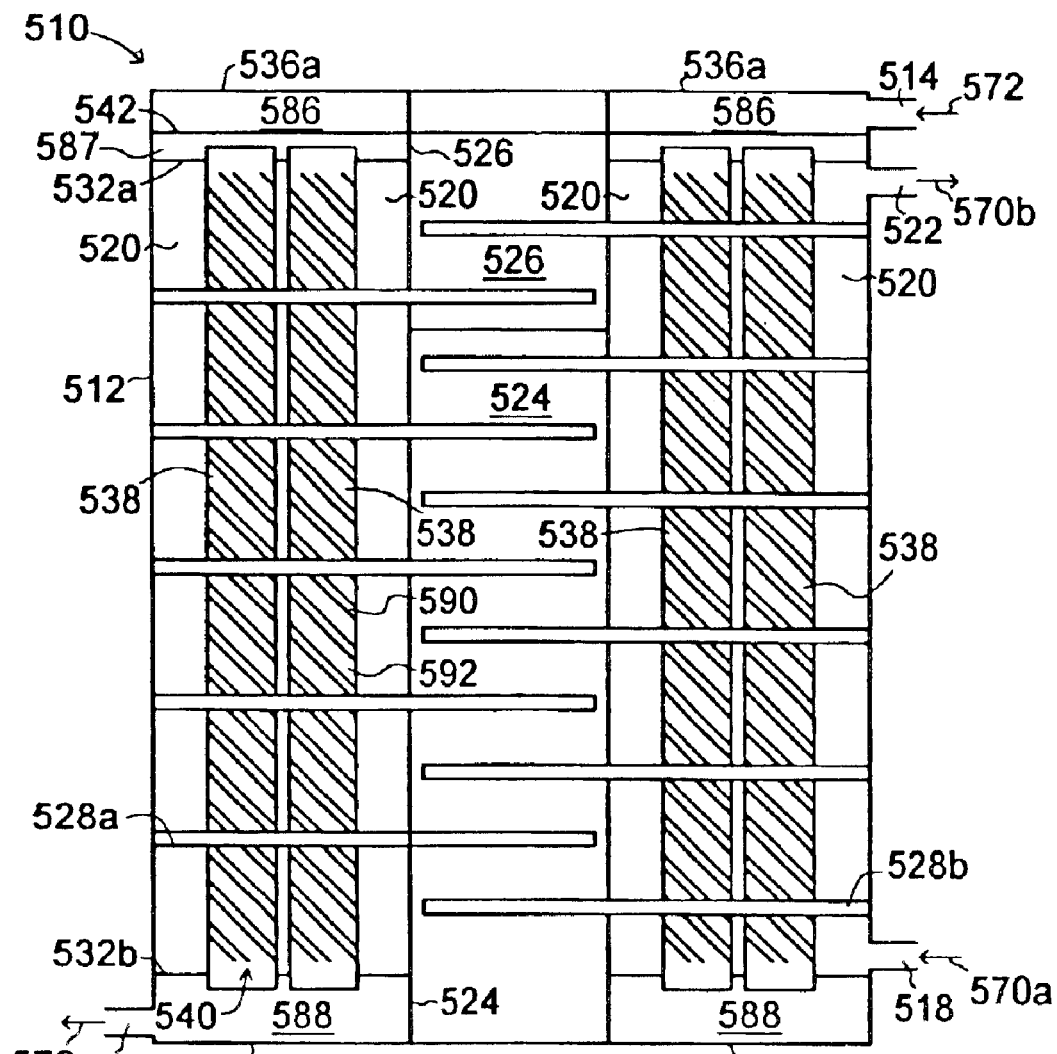
FIG. 34 is a cross-sectional view of the embodiment of FIGS. 28 and 29 with the dimensions altered to better illustrate the use of twisted fluted tubes in the first fluid space containing the working solution.
Figure 35:
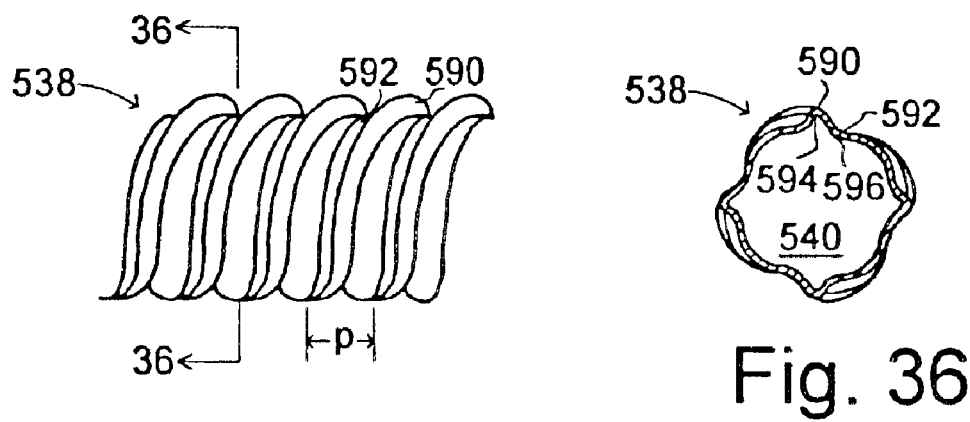
FIG. 35 is a partial front view of a twisted fluted tube used in the present invention.
Figure 36:
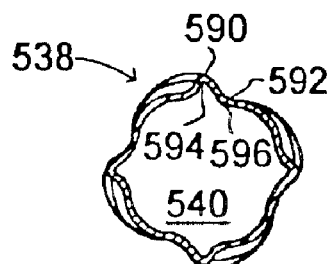
FIG. 36 is a cross-section view of a twisted fluted tube taken along line 36—36 of FIG. 35.

As shown in FIGS. 28, 29 and 34–36, the second fluid space 540 is an interior tubular space formed by the interior of one or more tubular members 538. FIG. 34 is not to scale and has been redrawn to illustrate the various components of tubular space 540 (FIGS. 29 and 36) with the details of other fluid spaces drawn in schematic fashion or omitted completely. Tubular space 540 is formed from tubes 538 which are thin-walled, twisted fluted tubes having spiraling crests 590 and flutes 592 formed on the outer (exterior) tubular surface and corresponding and respective flutes 594 and crests 596 formed on the respective inner (interior) tubular surface. That is, exterior crest 590 corresponds to inner flute 594 and outer flute 592 corresponds to inner crest 596. As noted previously, the formation of thin-walled twisted fluted tubes is well known in the art as exemplified by U.S. Pat. No. 3,730,229 (D'Onofrio), all of which is incorporated herein by reference as if completely written herein. As shown in FIG. 36, the instant twisted tube 538 has four starts, that is, four separate spiraling crests or ridges 590. As shown in FIG. 35, the distance between each crest is referred to as the pitch (p) and is of the order of 5.64 mm. It is to be realized that other numbers of starts and pitches p may be used. Illustratively the thickness of the thin wall tube forming the twisted fluted tube is of the order of 0.4 mm.

Additionally, the second fluid space 540 further comprises an upper annular fluid distribution manifold 586 formed by outer cylinder 512, inner cylinder 526, upper annular end cap 536a, and upper header plate 532a having apertures 534a and 534b formed therein (FIG. 31) for receiving the round end portions (lacking flutes and crests) of the tubular members. The tubes 538 are typically sealed to the header plate 532a by brazing or similar fastening and sealing techniques so that the interiors of tubular members 538 open to the upper annular distribution manifold 586. The upper annular fluid distribution manifold 586 has a first heat exchange fluid passage 514 for receiving or expelling a heat exchange fluid. To insure an even distribution of heat exchange fluid 572 when passage 514 is an inlet, an annular fluid distribution plate 542 (FIG. 30) having fluid distribution apertures 544 formed therein is used to distribute the heat exchange fluid among the interiors of tubular members 538.

At the bottom of the typically vertical heat exchange tubes 538 is a lower annular fluid collection manifold 588 formed from outer cylinder 512, inner cylinder 524, lower annular end cap 536b, and lower header plate 532b having apertures 534a and 534b formed therein for receiving tubular members 538. As with the upper annular manifold 586, the round ends of the tubular members 538 are sealed to the header plate 532b by brazing or other suitable technique so that the interiors of said tubular members 538 open to the lower fluid collection manifold 588. The lower manifold also has a first heat exchange fluid passage 516. For counter-current flow with the working fluid 570, the heat exchange fluid passage 514 of the upper annular fluid distribution manifold 586 is an inlet passage for first heat exchange fluid 572 and the first heat exchange fluid passage 516 of said lower annular fluid collection manifold 588 is an outlet passage for the first heat exchange fluid 572 and passage 518 is an inlet and passage 522 is an outlet for the working fluid 570. The preferred heat exchange fluid 572 is a hot fluid from solar collector arrays.

As shown in FIG. 29, the third fluid space 550 is an interior cylindrical space formed by the interior of inner cylinder 526. A cylindrical stainless steel-ceramic insert 553 is placed in the inner cylinder 526 to create an annular gap between the inner cylinder 526 and the insert 553. The cylindrical insert 553 comprises a cylindrical ceramic base 562, a plurality of cylindrical rings 560 successively placed on top of said cylindrical base 562 and a stainless-steel cylinder 554 placed on top of the plurality of cylindrical rings 560. As seen in FIGS. 28 and 29, a ceramic bolt 561 is inserted into an aperture 564 in ceramic base 562 and is coupled to a steel nut and bolt assembly 559 by means of coupling 563. The steel bolt passes through an aperture 558 in the end plate 556 of inner cylinder 554. By tightening nut and bolt assembly 559, the ceramic base 562 and the ceramic rings 560 are securely fastened to each other and to cylinder 554. The cylinder 554 is suspended above burner 582 by means of pin 565 which passes through apertures 566 on opposite sides of and near the top of cylinder 526. The pin rests across the top of inner cylinder 524, end cap 536a, and outer cylinder 512. The depth to which insert assembly 553 is inserted into inner cylinder 526 can be adjusted by choosing one of several pairs of holes 566 through which to insert pin 565.

As shown in FIGS. 28 and 29, strips of fins 552 positioned toward the top of said third fluid space 550 and extend radially from the interior of inner cylinder 526 into the third fluid space 550. A burner, typically a natural gas burner 582 is located at the base of third fluid space 550. Hot combustion products 584 flow upward in the annular fluid space 550 between the inner cylinder 526 and insert 553 heating the working solution flowing in an upward biased direction in fluid space 520, that is, in co-current flow with working solution 570.

Dual heated generator 510 can use either a natural gas flame or a hot fluid 572 such as can be obtained from a solar collector as the heating source. That is, the generator 510 can be powered by solar energy or natural gas separately or both simultaneously. When solar energy is sufficient, the generator 510 can operate with using only hot solar fluid 572. Otherwise, it can be supplemented with heat from combustion products 584 of gas burner 582. When no solar energy is available, generator 510 can be fired entirely with natural gas burner 582.

The generator 510 employs a counter current flow arrangement between the solar fluid and a working solution 570 such as lithium bromide and water, e.g., LiBr—$H_2O$. Combustion products 584 are in co-current flow with the working solution 570. Generator 510 consists of two concentric cylinder shells 512, 526 with fifty (50) fluted tubes vertically installed between shells 512, 526. The size of the shells should depend on the target capacity of generator 510. For example, for a 25 RT (refrigeration ton) generator, the inner shell 526 has a 9 inch (22.9 cm) diameter and the outer shell 512 has an 11 inch (28.0 cm) diameter. It is essentially a shell-in-tube heat exchanger for the solar fluid 572 side. The interior of fluted tubes 538 contains thermal transport fluid 572 suitable for solar energy collection. Fluted tubes 538 are known for excellent heat transfer enhancement and easy fabrication. The LiBr—$H_2O$ solution flows between the cylinder shells 512 and 526 and around the fluted tubes 538 being directed by a series of baffle plates 528a, 528b six inches (15.2 cm) apart from each other.

A stainless steel-ceramic insert 553 is placed in the inner shell 526, creating a circumferential gap (fluid space) 550 between the inner shell 526 and insert 553. Burner 582, with flame verification capability, is installed at the bottom of the inner shell 526. The high-temperature combustion product flue-gas flows upward through fluid space 550 and transfers heat from the inner shell 526 to the LiBr—$H_2O$ working solution 570 on the annulus side of the fluted tubes 538. Inner shell 526 has a set of fins 552 brazed onto the exterior side of upper cylinder (shell) 526 to facilitate heat transfer from the hot combustion products 584.

As shown in FIG. 34, high concentration LiBr—$H_2O$ working solution (57.5 wt %) enters the first fluid space 520 from bottom inlet 518 as a subcooled fluid 570a. Once heat is applied to the generator 510 with hot solar fluid 572 or flue gas 584, the working solution 570 reaches an initial saturation point and then starts a boiling process that generates refrigerant vapor. This two-phase fluid is later separated into vapor and liquid components in a separator such as separator 716 shown in FIG. 38 where the vapor leaves the separator via outlet 718 and the weak hot working solution 752 leaves via outlet 720.

Figure 37:
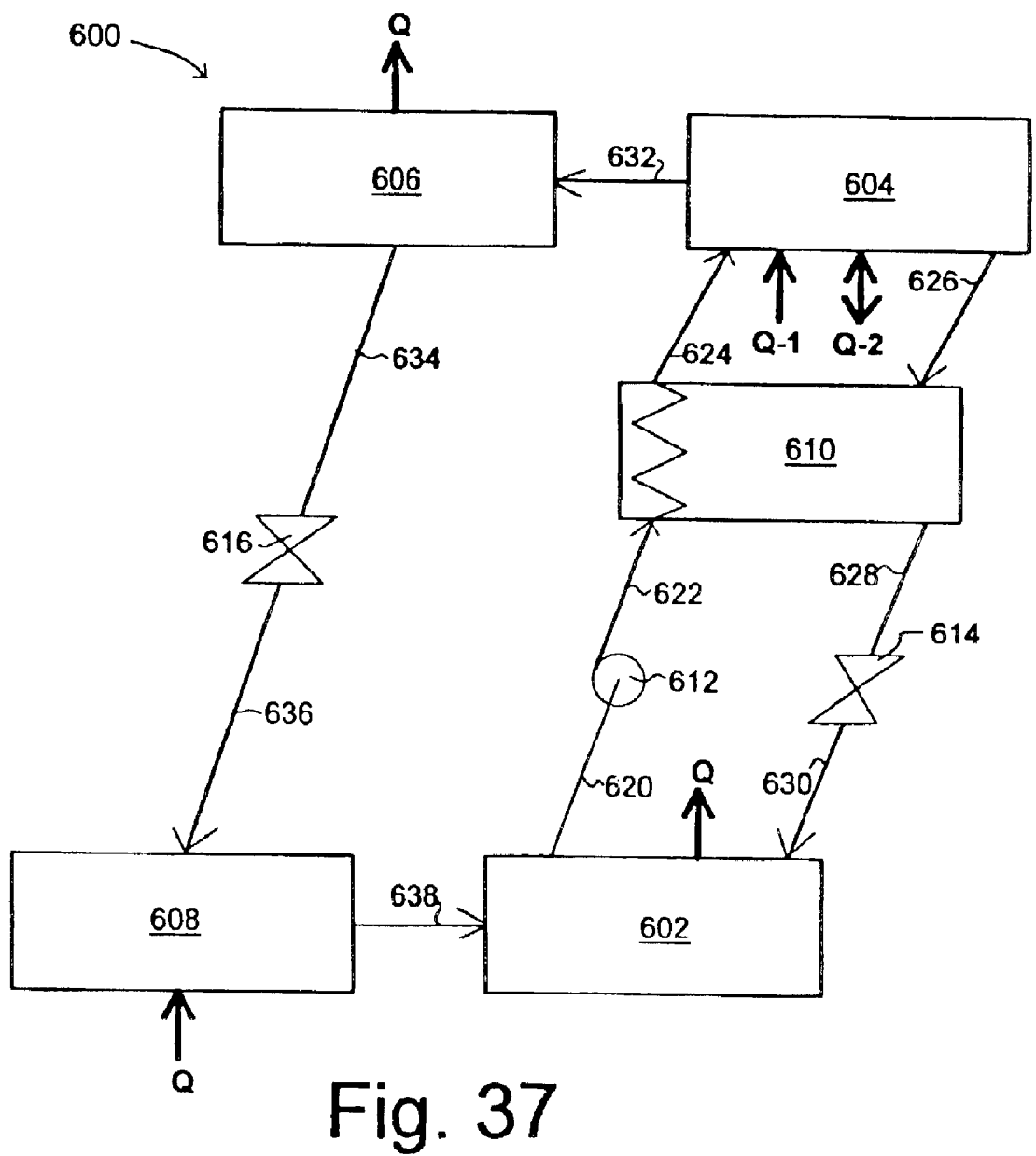
FIG. 37 is a schematic view of an absorption heat transfer system illustrating the used of a double heated generator heated by means of two heat transfer devices, Q-1 and Q-2. As shown by the double headed arrow, Q-2 is able to deliver heat from the generator and deliver heat to the generator.

FIG. 37 illustrates a basic absorption cycle 600 in which the various generator embodiments of the current invention may be employed. As those skilled in the art will recognize, additional refinements may be made to the cycle to improve heat transfer efficiencies, as for example through the use of a double or triple effect heat transfer device. Although the cycle will be discussed in terms of a lithium bromide-water working solution, other refrigerant-absorbent solutions such as ammonia-water may also be employed with the present invention.

Refrigerant vapor from the evaporator 608 passes through line 638 to absorber 602 where it is absorbed in a weak working solution essentially devoid of refrigerant vapor returning from generator 604 through line 630. The absorption process takes place with the liberation of heat Q to form a strong solution that leaves the absorber 602 via line 620 where pump 612 pumps it into line 622. The relatively cool strong solution passes into heat exchanger 610 where heat from the hot weak working solution coming from generator 604 is transferred to the strong solution to begin the absorption process. The partially heated strong solution passes from heat exchanger 610 to the generator 604 via line 624. In generator 604, the strong solution from line 624 is heated by means of heat source Q-1 or heat source Q-2 or both. As noted previously Q-1 may be a hot solar fluid from a solar collection array while Q-2 could be the combustion products from a natural gas burner. As will be recognized by those skilled in the art, other sources of heat may also be used for Q-1 and Q-2 although preferably, the generator of the present invention is designed for used with an energy source Q-1 that is only intermittently available, e.g., solar energy, and a second alternate energy source Q-2 that is always available to supplement the initial intermit energy source when it is available in insufficient quantities or not at all. Heating proceeds to drive off the refrigerant vapor from the working solution which leaves the generator via line 632. The hot weak solution, devoid of refrigerant vapor, leaves the desorber 604 via line 626 where it passes to heat exchanger 610 in which it heats the cold strong working solution coming from the absorber 602. The cooled weak solution then passes to an expansion valve 614 via line 628 after which the low pressure solution passes to the absorber 602 via line 630 where it is combined with refrigerant vapor coming from evaporator 608 via 638 to again repeat the absorption/desorption cycle.

Returning to generator 604, the desorbed vapor passes to the condenser 606 via line 632 where it condenses to a liquid with the liberation of heat Q. The cool liquid then leaves the condenser via line 634 where it passed to an expansion valve 616 after which it passes to the evaporator 608 via line 636. In the evaporator, heat Q from the space to be cooled evaporates the condensed vapor to the vapor state after which the vapor proceeds to the absorber 602 via line 638.

Figure 38:
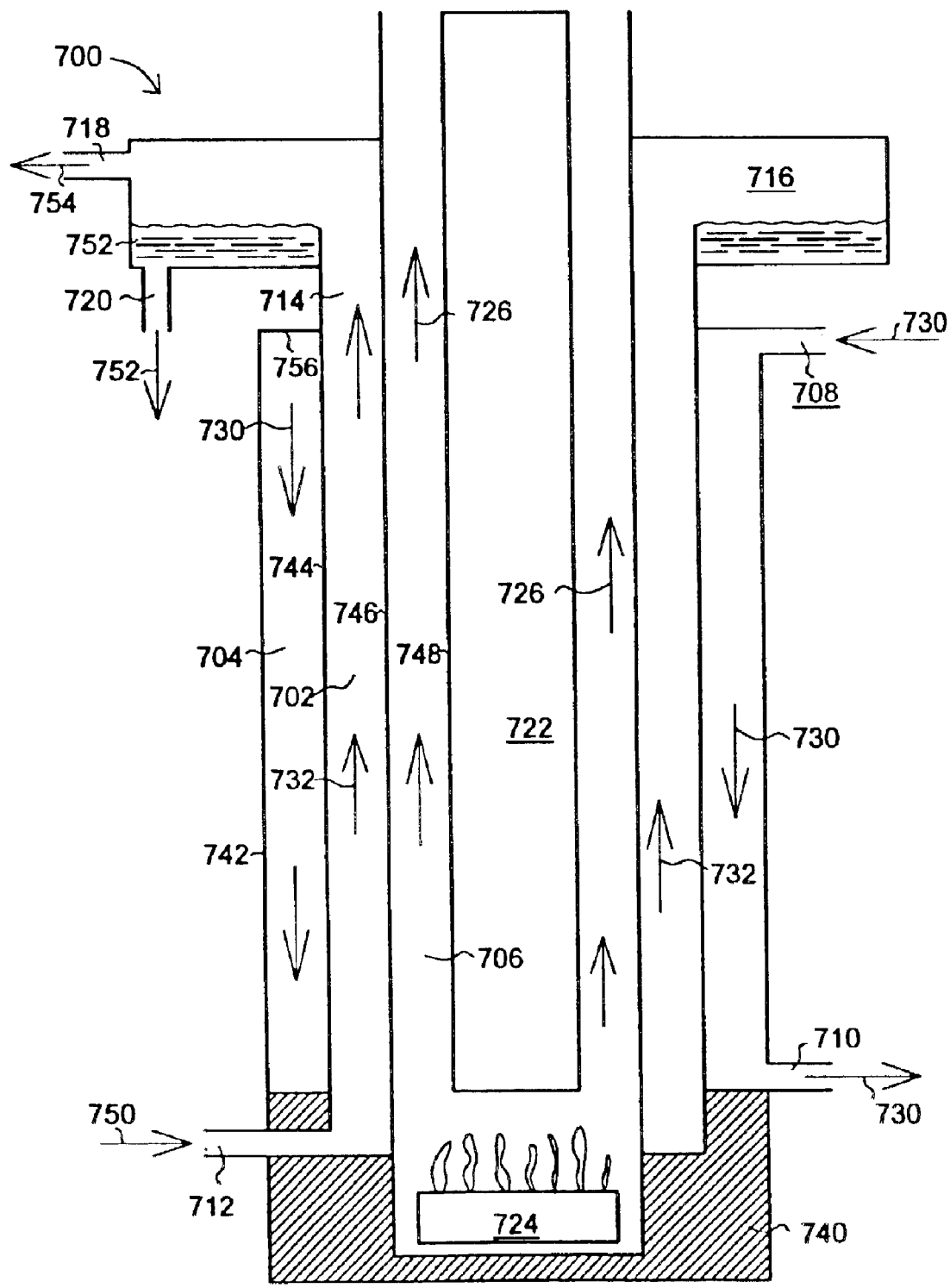
FIG. 38 is a cross sectional view of another embodiment of a dual heat-exchange generator for use in an absorption heat transfer system comprising three concentric annular fluid spaces.
Figure 39:
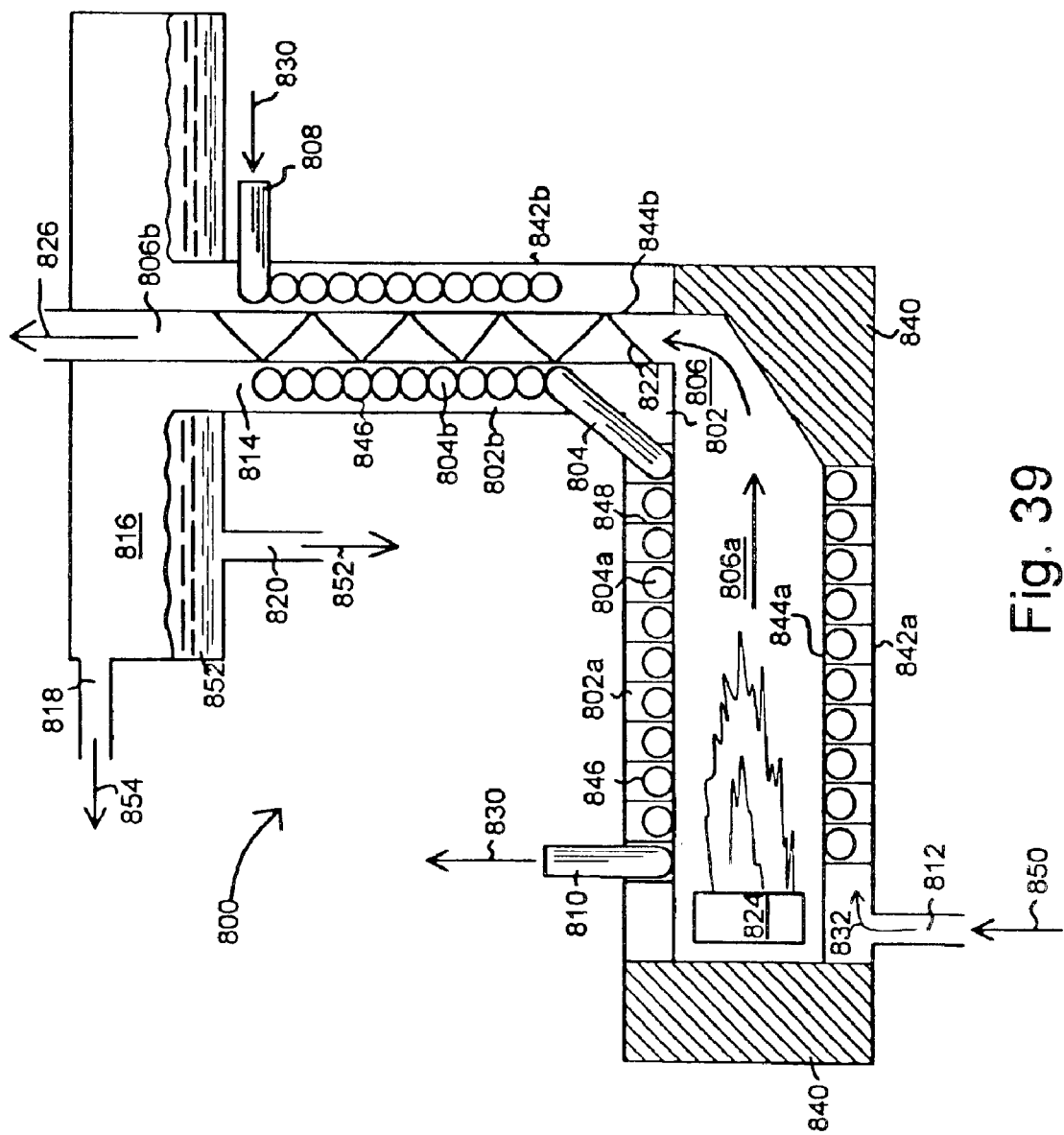
FIG. 39 is a cross-sectional view of another embodiment of the present invention in which the three fluid spaces of a dual heat-exchange generator are each divided into a horizontal and vertical component. The first fluid space is an annular fluid space formed about a cylindrical third fluid space while the second fluid space is a tubular fluid space formed by a tube that is spiral wrapped about the cylindrical third fluid space.
Figure 40:
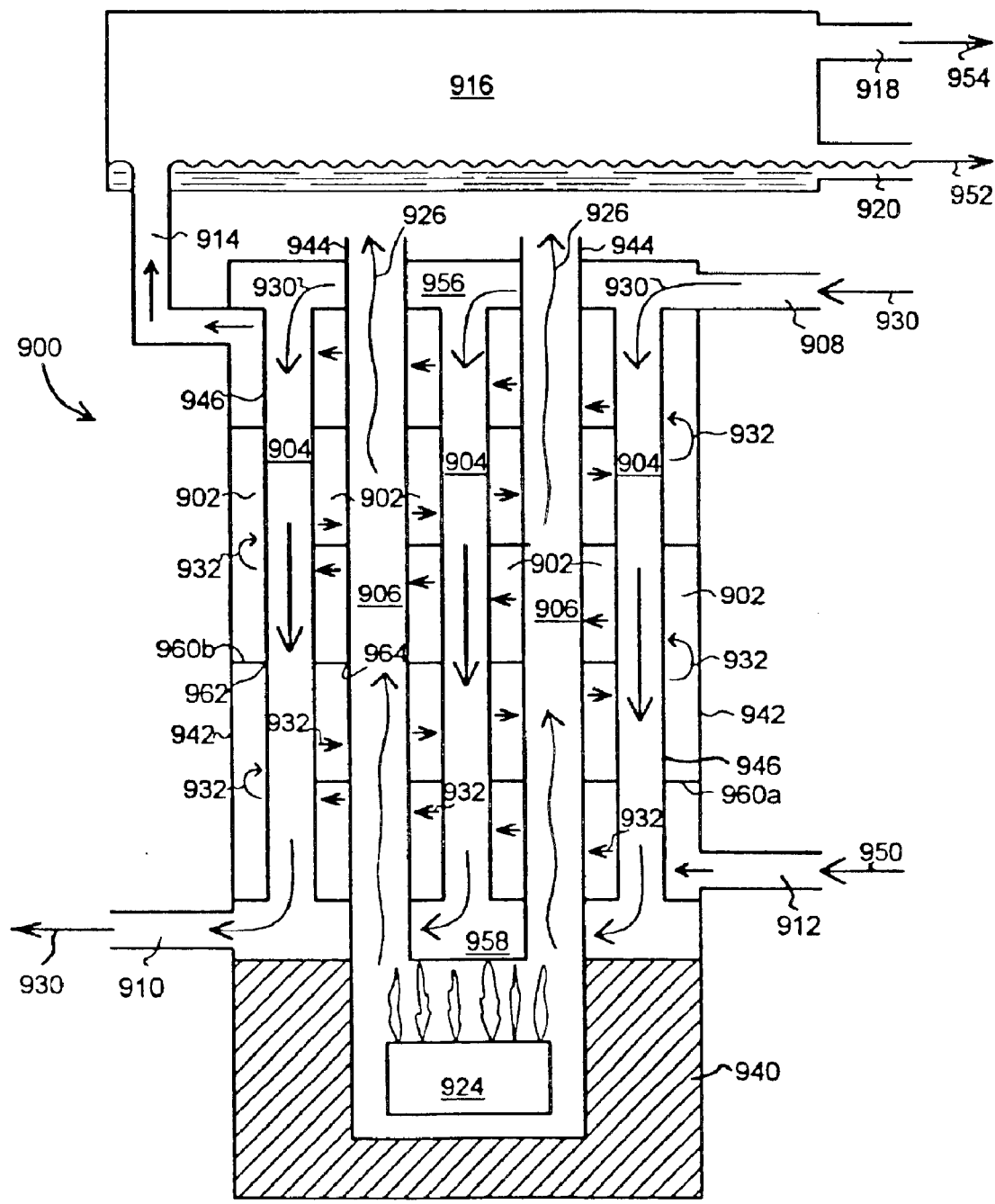
FIG. 40 is a cross-sectional view of yet another embodiment of the present invention in which two fluid spaces are formed from vertical tubes placed within a first fluid space containing a working solution. One set of vertical tubes forms the third fluid space used for heating the working fluid by means of combustion products while the other set of vertical tubes forms the second fluid space used for heating the working fluid in the first fluid space by means of a hot fluid such as obtained from a solar collecting device.

FIGS. 38–40 illustrate various alternate embodiments of the current invention. In FIG. 38, generator 700 comprises a first fluid space 702 which is an annular space formed from by the exterior of cylinder 746, the interior of cylinder 744, and a portion of base 740. Annular space 702 has an inlet 712 and an outlet 714 for incoming and outgoing working fluid 750, respectively. Generator 700 also has a second fluid space 704 in heat exchange relation with first fluid space 702. The second fluid space 704 is an annular space formed from by the exterior of cylinder 744, the interior of cylinder 742, an annular top 756, and a portion of base 740. The second fluid space 704 has an inlet 708 and an outlet 710 for a first heating fluid such as a solar heating fluid heated by an array of solar collectors. A third fluid space 706 is also in heat exchange relation with the first fluid space 702 and is in the form of an annular space formed from the interior of cylinder 746, an exterior of cylinder 748 and a portion of base 740. A fossil fuel burner 724 is located in the base portion of the third fluid space 706.

A separator 716 for separating the refrigerant vapor from the working solution has an inlet connection 714 from the first fluid space 702, a vapor outlet 718, and an outlet 720 for weak solution 752. The design of FIG. 38 uses a plate fin type construction. Three concentric shells or cylinders 742, 744, and 746 are used with only the fluid space 702 containing the working solution being a pressure vessel. The three concentric shells or cylinders 742, 744, and 746 form three different annuluses, 702, 704, 706. The LiBr-water annulus 702, i.e., the first fluid space 702, is between the flue gas (combustion product) annulus 706, i.e., the third fluid space 706, and the circulating fluid annulus 704, i.e., the second fluid space 704. When combustion product (flue gas) heating 726 is used, the LiBr—H$_2$O working solution 732 is heated from the inside and when a circulating fluid 730, e.g., solar fluid 730, is used, the LiBr—H$_2$O is heated from the outside. A modified plate fin is used between each shell. The entire assembly is oven brazed to provide contact between each fin and the appropriate shells. Because the entire assembly is brazed, the shells can be fabricated of thinner material than normally would be used. In the flue gas annulus 706, standard straight and offset strip fins are used. Offset strip fins can be used in the circulating fluid annulus. Fins in the LiBr annulus promote two phase flow with a minimum pressure drop.

FIG. 39 illustrates another embodiment of the invention having horizontal and vertical sections. Here generator 800 comprises a first fluid space 802 which is an annular space having a horizontal section 802a and a vertical section 802b with the horizontal section 802a formed from the exterior of the horizontal portion of first cylinder 844a, the interior of the horizontal portion of second cylinder 842a, and portions of base 840. The horizontal section 802a is open to a vertical section 802b formed from the exterior of vertical section 844b of first cylinder 844 and the interior of the vertical portion 842b of the second cylinder 842. The horizontal section 802a has a fluid inlet 812 and the vertical section 802b has an outlet 814.

The second fluid space 804 is an annular space that also has a horizontal section 804a and a vertical section 804b with both the horizontal and vertical sections 804a, 804b formed as the interior of a tube 846 spiral-wrapped about the exterior of horizontal cylinder section 844a and vertical cylinder section 844b. The vertical portion of the spiral-wrapped tube 846 has an inlet 808 and the horizontal portion has an outlet 808 for the heat exchange fluid 830, e.g., a solar heated fluid.

The third fluid space 806 is a cylindrical space comprising a horizontal section 806a and a vertical section 806b. A burner 824 is found at the far end of horizontal section 806a away from the vertical section 806b.

Generator 800 has a separator 816 attached at the top of the vertical portion for separating the refrigerant vapor 854 from the absorbent (weak solution) 852 of the working solution 850. The generator has an inlet connection 814 that is identical with the outlet 814 from the vertical section 802b of the first fluid space 802. The separator 816 has a vapor outlet 818 and a weak solution outlet 820.

The vertical space 806b of generator 800 contains an exhaust distributor 822 attached to the interior wall of vertical section cylinder 844b for improved heat transfer from the combustion products 826 to the working solution contained first fluid space 802b. In effect, embodiment 800 of FIG. 39 has gas fired into horizontal cylinder section 844a with a vertical shell (first fluid space) 802b and tube 846 tube extension. The LiBr-water working solution flows in the annulus 802a around the central fired cylinder 844a. The central horizontal cylinder 844a has helical fins 848 about its exterior surface with the circulating heating fluid 830 flowing in tube 846 wound between the helical fins 848. Circulating fluid 830 also flows in the interior of helical tube 846 within the annulus (first fluid space) 802b around the vertically fired cylinder 844b. As illustrated, the hot heating fluid 830 enters the vertical portion of the vertical fluid space 804b via inlet 808, flows downward in spiraling fluid space 804b defined by the helically-wrapped tube 846 and then in the fluid space 804a of spiral tubing section wound about cylinder section 844a. Fins 848 are extended to the opposite fluid space wall 842a to form a spiral annular space 802a in which the working fluid 832 flows and in which the spirals of tube 846 are wound. The flue gas 826 flows up the center of the vertical shell (first fluid space 802b and tube 846 extension, i.e., in the third fluid space 806b, while the LiBr working solution 850 flows around the tubes 846 within annulus 802, i.e., in the first fluid space. The tubes 846 for the circulating fluid 830 can be plain or enhanced (finned) either externally or internally, or they could be doubly enhanced, i.e., twisted fluted tubes, as shown in FIGS. 35 and 36.

Embodiment 900 shown in FIG. 40 consists of a cylindrical space in which the working solution 932 flows and which has two sets of vertical tubes, one set 946 for a heating fluid such as a solar fluid and a second set 944 for a second heating fluid such as hot combustion products 926. A separator 916 allows for separation of the two-phase working solution 932 into the refrigerant vapor component and the weak working solution (absorbent) 920.

The generator 900 has a cylindrical first fluid space 902 formed in the interior of cylinder 942, a second fluid space 904 in heat exchange relation with first fluid space 902 with the second fluid space 904 being an interior tubular space formed by a plurality of tubular vertical members 946 opening to an upper manifold 956 with an inlet 908 and a lower manifold 958 with an outlet 910, and a third fluid space 906 in heat exchange relation with first fluid space 902 and being the interior tubular space formed from by a plurality of tubular vertical members 944 with a fossil fuel burner 924 located in a base portion of third fluid space 906. The separator 916 has an inlet connection 914 from the first fluid space 902 for receiving a two-phase working fluid, a vapor outlet 918 for refrigerant vapor 954, and a solution outlet 920 for the weak solution absorbent 952. First fluid space 902 further comprises a set of alternating sector baffle plates 960a, 960b with apertures 962, 964 formed in baffle plates 960a, 960b, to accommodate tubular vertical members 946, 944, respectively.

As shown, embodiment 900 is essentially a shell and tube heat exchanger with flue gas 926 occupying one set of tubes 944 within the shell, i.e., first fluid space 902 and a thermal transport fluid 930 occupying the other set of tubes 944. The two-phase LiBr-water fluid 932 flows through the shell, i.e., first fluid space 902, between and among the distribution plates 960a, 960b and the two sets of tubes 944 and 948. Typically fluted tubes (see FIGS. 35 and 36) are used instead of plain tubes as fluted tubes have the advantage of enhancing heat transfer on both sides of the fluid flow at the same time. In addition, they cause the onset of turbulence at Reynolds numbers well below the classical 2300 in both tubular flow as well as confined cross-flow (shell side), that is, on the exterior of the tubes in first working space 902. Enhancements of heat transfer in the transition regime (2300 to 10,000) are sometimes as much as 10 to 12 times what is encountered in laminar flow. Fluted tubes will work well with oil or other viscous heat transport fluids.

FIGS. 21–25 illustrate a heat engine 10 combined with a compression heat-transfer device 410. The heat engine 10 has interconnected heat engine components comprising a) a boiler 12, b) an expander 14, c) a heat-engine condenser 16, and d) a pump 18 for circulating a working fluid through said interconnected components of said heat engine. The compression heat-transfer device 410 has interconnected compression heat-transfer device components comprising a) a compression device evaporator 408, b) a compression device condenser 404, and c) a throttling valve 406, and c) a compressor 402 for compressing a compression working fluid circulating through the interconnected components of the compression heat-transfer device 410. The heat engine 10 and compression heat-transfer device are joined by a common shaft 21 driven by the heat-engine expander 14 and driving the compression heat-transfer device compressor 402. Typically the close-coupled expander and compressor are either expander and compressor scroll units or expander and compressor gerotor units as described in U.S. application Ser. No. 09/163,491 filed Nov. 17, 1998 (PCT publication WO 00/29720) all of which is herein incorporated by reference as if completely written herein, and are hermetically sealed in a single unit. The boiler can be heated with any heat source such as fossil fuels but is especially useful for low temperature fuels such as solar arrays, bio-mass, and waste heat. To take advantage of low energy fuel use, a low boiling organic fluid or ammonia is used as the working fluid in either unit. Ammonia has been found to be especially useful when used in both the heat engine 10 and energy transfer device 410.

Figure 22:
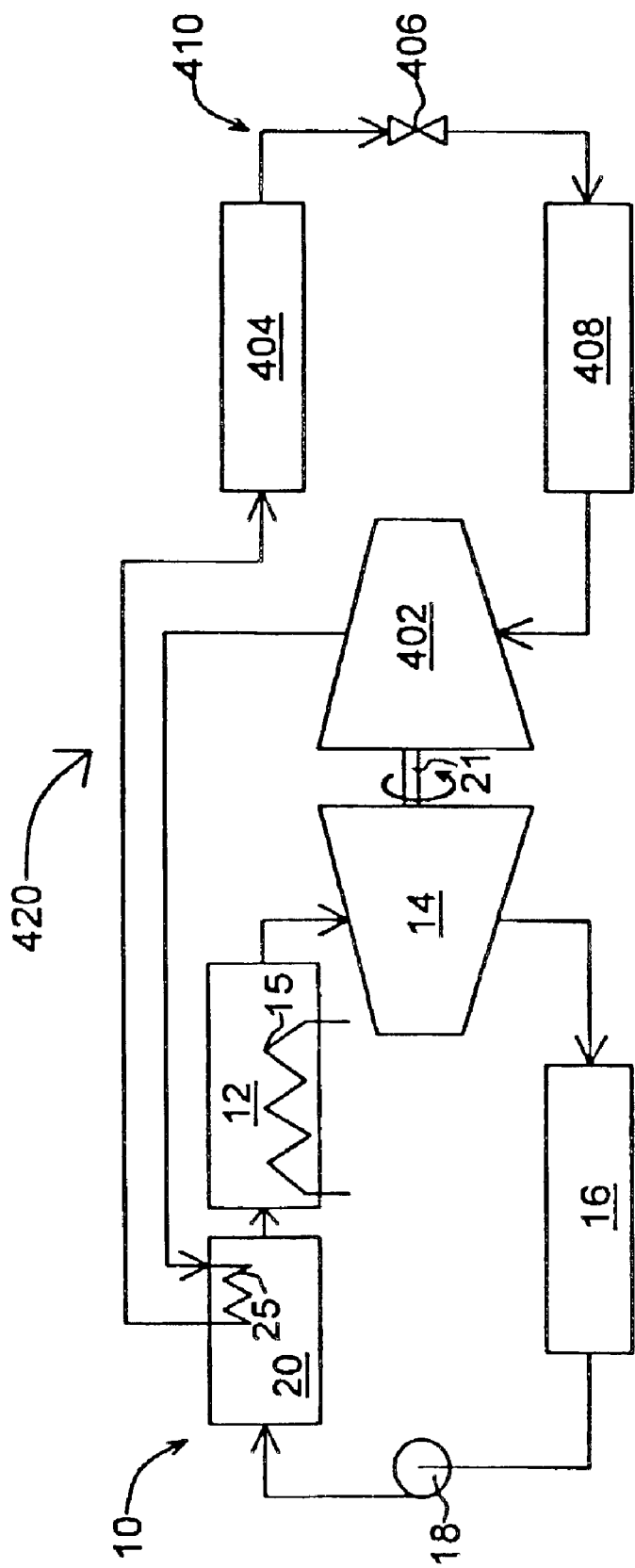
FIG. 22 is a schematic of another embodiment of a close coupled heat engine compression device in which superheated working fluid from the compressor is used to preheat the working fluid in the heat engine prior to entry into the boiler.
Figure 24:
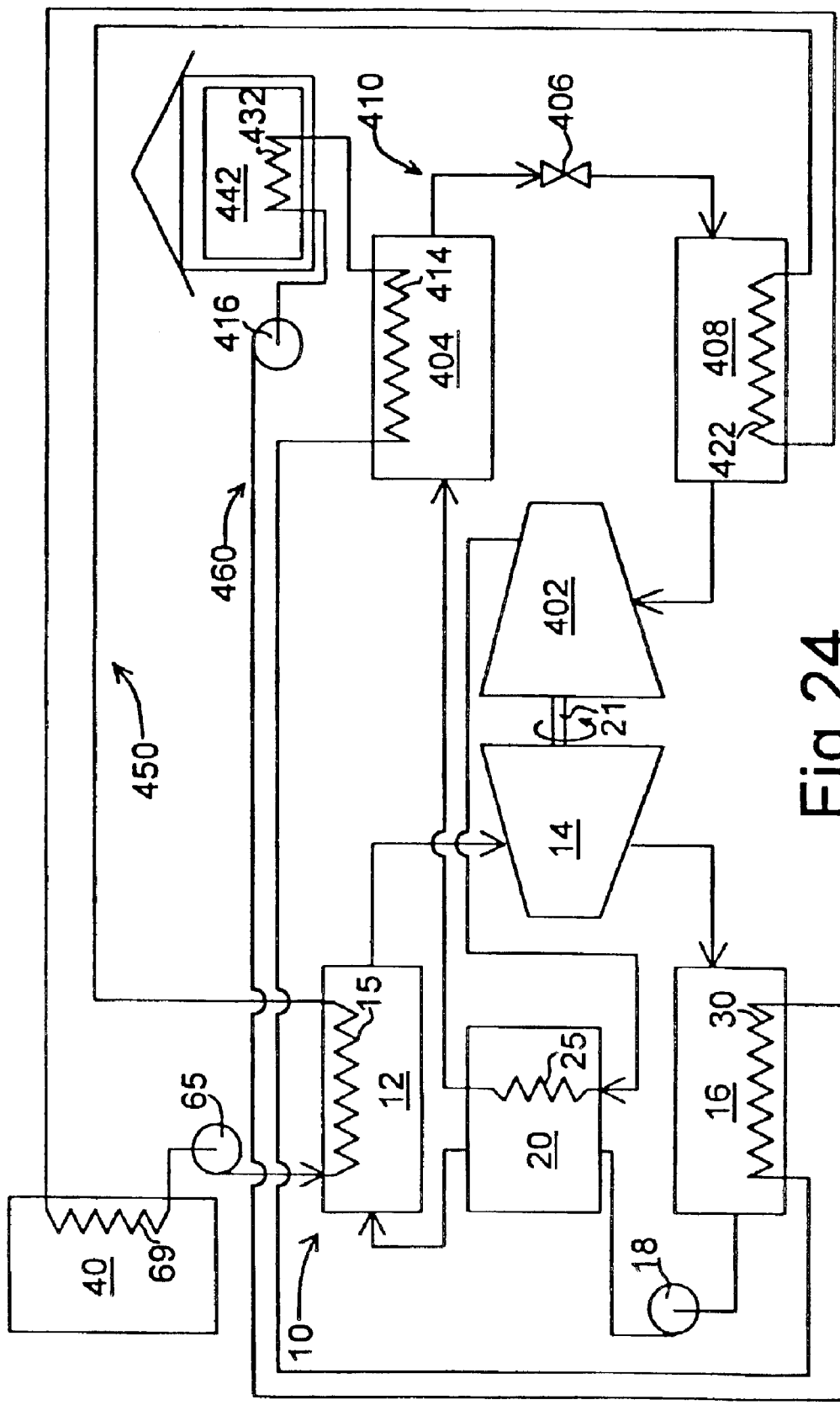
FIG. 24 is a schematic of the use of a close coupled heat engine compression device for home heating purposes.
Figure 25:
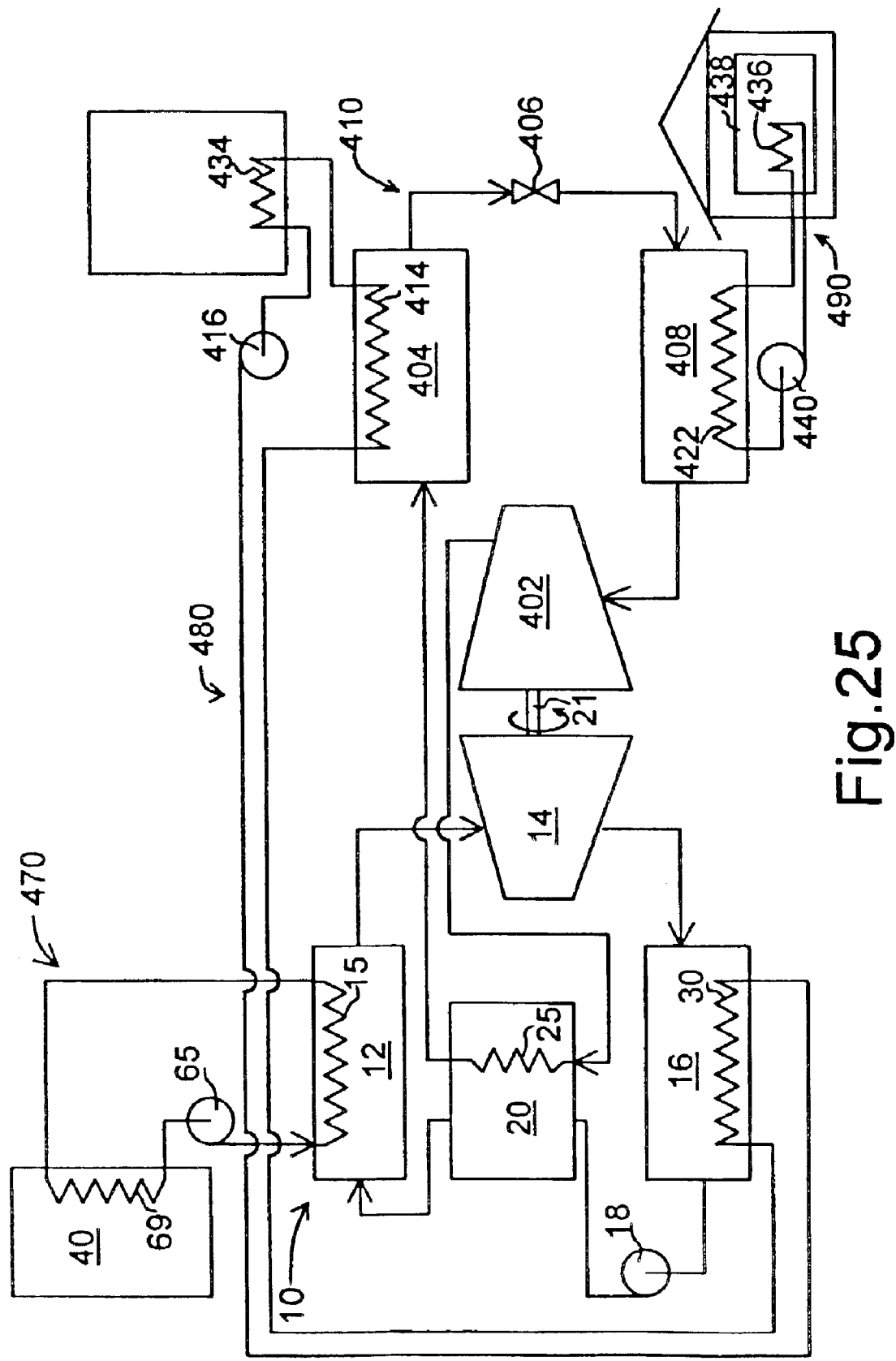
FIG. 25 is a schematic of the use of a close coupled heat engine compression device for home cooling purposes.

As shown in FIG. 22, 24, and 25, the compression heat-transfer device can be operated with recuperation by using the superheated working fluid coming from compressor 402 to preheat the working fluid prior to boiler 12 entry by use of a preheater 20 that transfers the superheat content of the working fluid coming from the compressor 402 to the working fluid of the heat engine by means of heat exchanger 25.

Figure 23:
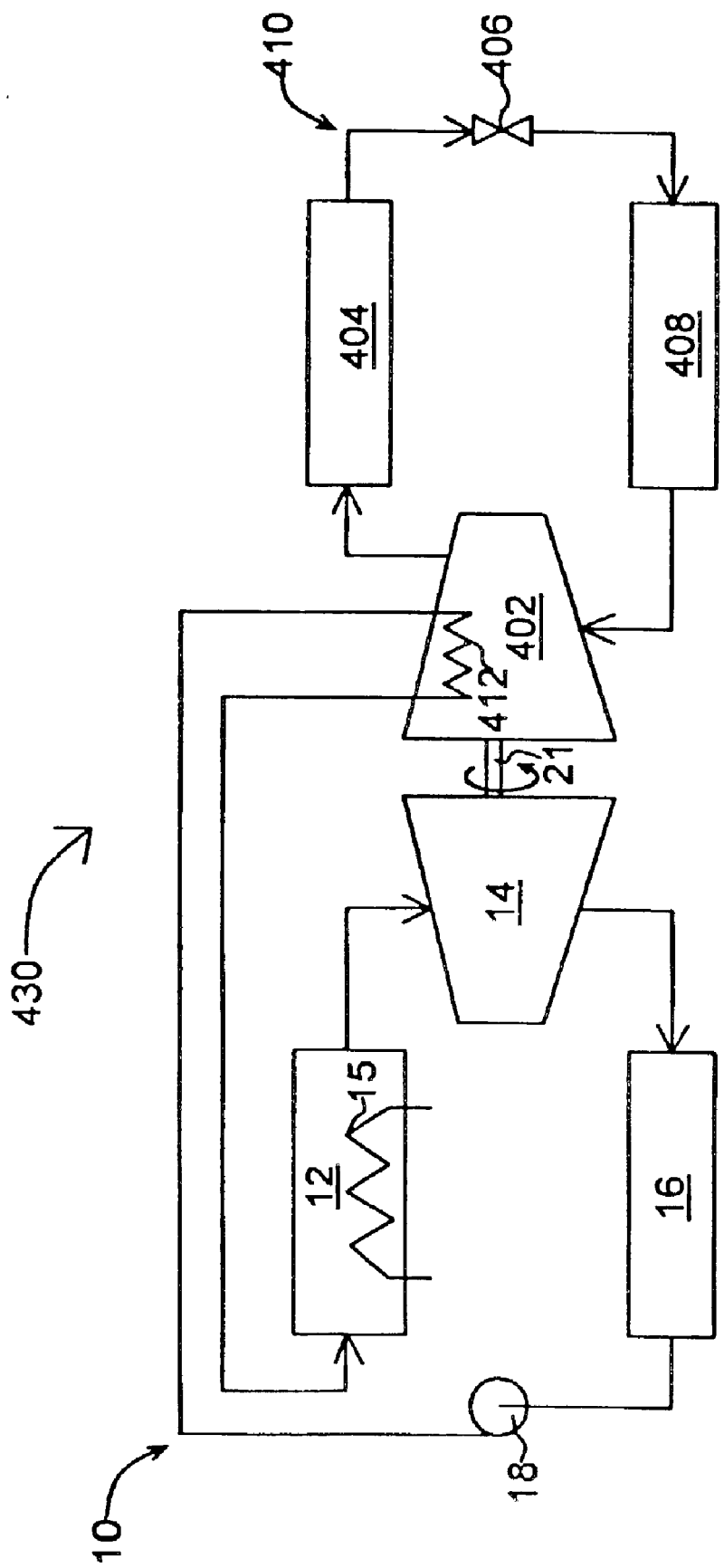
FIG. 23 is a schematic of another embodiment of a close coupled heat engine compression device in which working fluid from the condenser of the heat engine is used to cool the compressor of the compression device.

In FIG. 23, relatively cool working fluid from condenser 16 is used to capture heating from the compressor 402, i.e., cool compressor 402 prior to entry into boiler 12. In effect compressor heat exchanger (cooling jacket) serves as a preheater, preheating the heat engine working fluid prior to entry into the boiler thereby improving cycle efficiency.

FIGS. 24 and 25 illustrate the use of a close-coupled expander-compressor device for space heating and cooling. In both embodiments, heat from the superheated working fluid from the compressor is exchanged with the heat-engine working fluid prior to entry into the boiler. This is accomplished by means of recuperator (pre-heater) 20 in which heat from superheated compressor working fluid is exchanged to relatively cool heat-engine working fluid from condenser 30 via heat exchanger 25.

For heating purposes and as shown in FIG. 24, two additional heat-transfer fluid loops are used in addition to the expander cycle, the compressor cycle, and the use of superheated working fluid from the compressor to preheat the working fluid in the heat engine cycle. A heat-source loop 450 has interconnected heat-source loop components comprising a) a heat-source heat exchanger 69 capturing heat from heat source 40, b) a pump 65 circulating a heat-transfer fluid through the heat-source loop components, c) a boiler heat exchanger 15 for providing heat to the boiler 12, and d) an evaporator heat exchanger 422 for proving heat to evaporator 408. A heating loop 460 with interconnected heating-loop components comprising a) a heating loop pump 416 circulating a heat-transfer fluid through the heating-loop components, b) a heat-engine condenser heat exchanger 30 for transferring heat from condenser 30 to the heat-transfer fluid, c) a compression heat-transfer device condenser heat exchanger 414 for transferring heat from condenser 404 to the heat-transfer fluid, and d) a space (load) heat exchanger 432 for transferring heat from the heat-transfer fluid to the space to be heated (load) 442.

For cooling purposes and as shown in FIG. 25, three heat-transfer fluid loops are used in addition to the expander cycle, the compressor cycle, and the use of superheated working fluid from the compressor to preheat the working fluid in the heat engine cycle. A heat-source loop 470 with interconnected heat-source loop components comprising a) a heat-source heat exchanger 69 that transfers heat from the heat source 40 to a heat-transfer fluid, b) a heat-source loop pump 65 for circulating a heat-transfer fluid through the heat-source loop components, and c) a boiler heat exchanger 15 for providing heat to boiler 12. A heat removal loop 480 has interconnected heat removal loop components comprising a) a heating loop pump 416 circulating a heat-transfer fluid through the heat removal loop components, b) a heat-engine condenser heat exchanger 30 for transferring heat from condenser 16 to the heat-transfer fluid, c) a compression heat-transfer device condenser heat exchanger 414 for transferring heat from the condenser 404 to the heat exchanger 414, and d) a heat exchanger 434 for dissipating the heat in the heat transfer fluid such as by means of a cooling tower. And finally a cooling loop 490 has interconnected cooling loop components comprising a) an evaporator heat exchanger 422 for transferring heat from the heat transfer fluid to the evaporator 408, b) a cooling heat-exchanger 436 for transferring heat from the space to be cooled 438 to the heat-transfer fluid, and c) a cooling loop pump 440 for circulating a heat-transfer fluid through said cooling-loop components.

Figure 26:
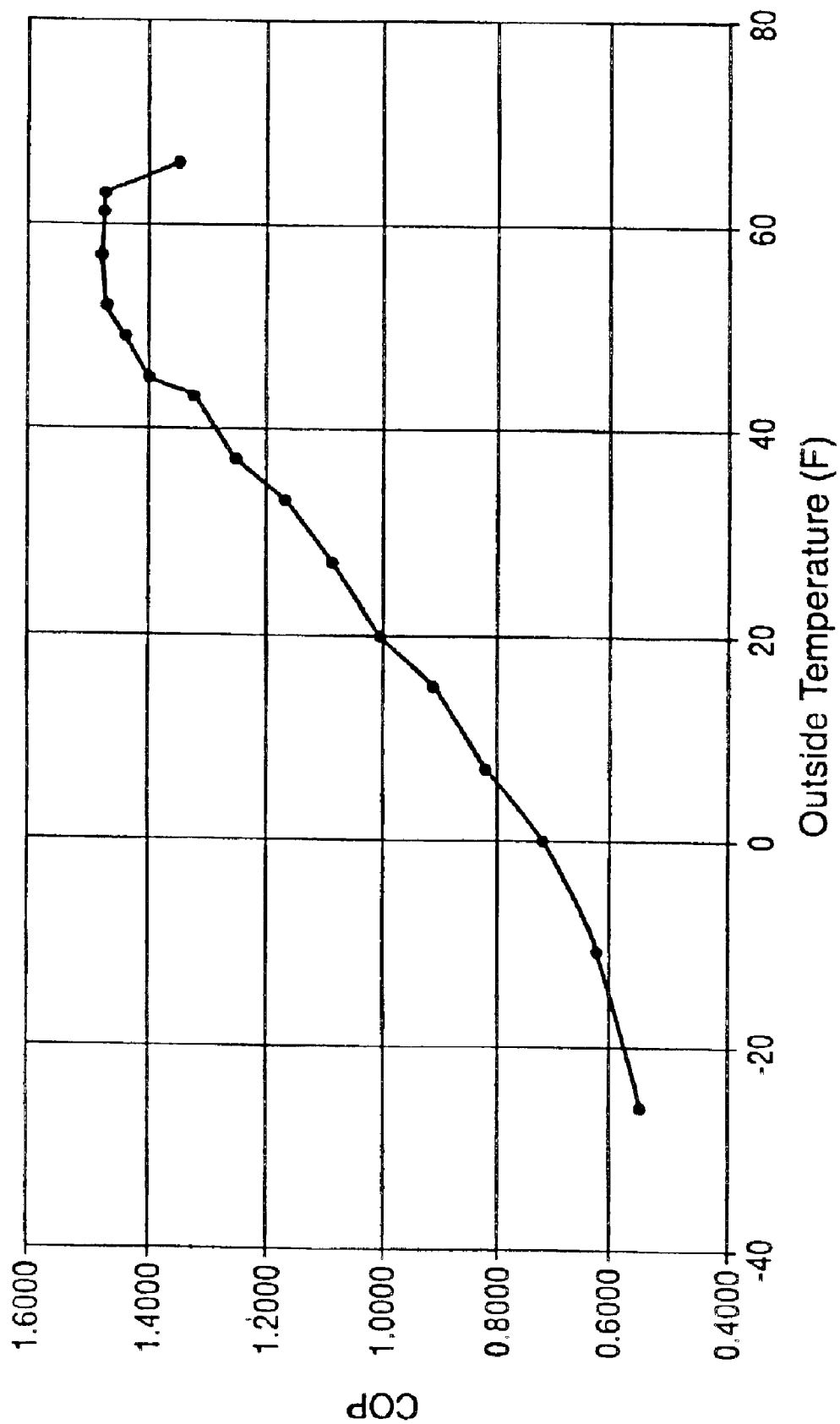
FIG. 26 is a graph of the heating condensers to home coefficient of performance (COP) versus the outside air temperature.
Figure 27:
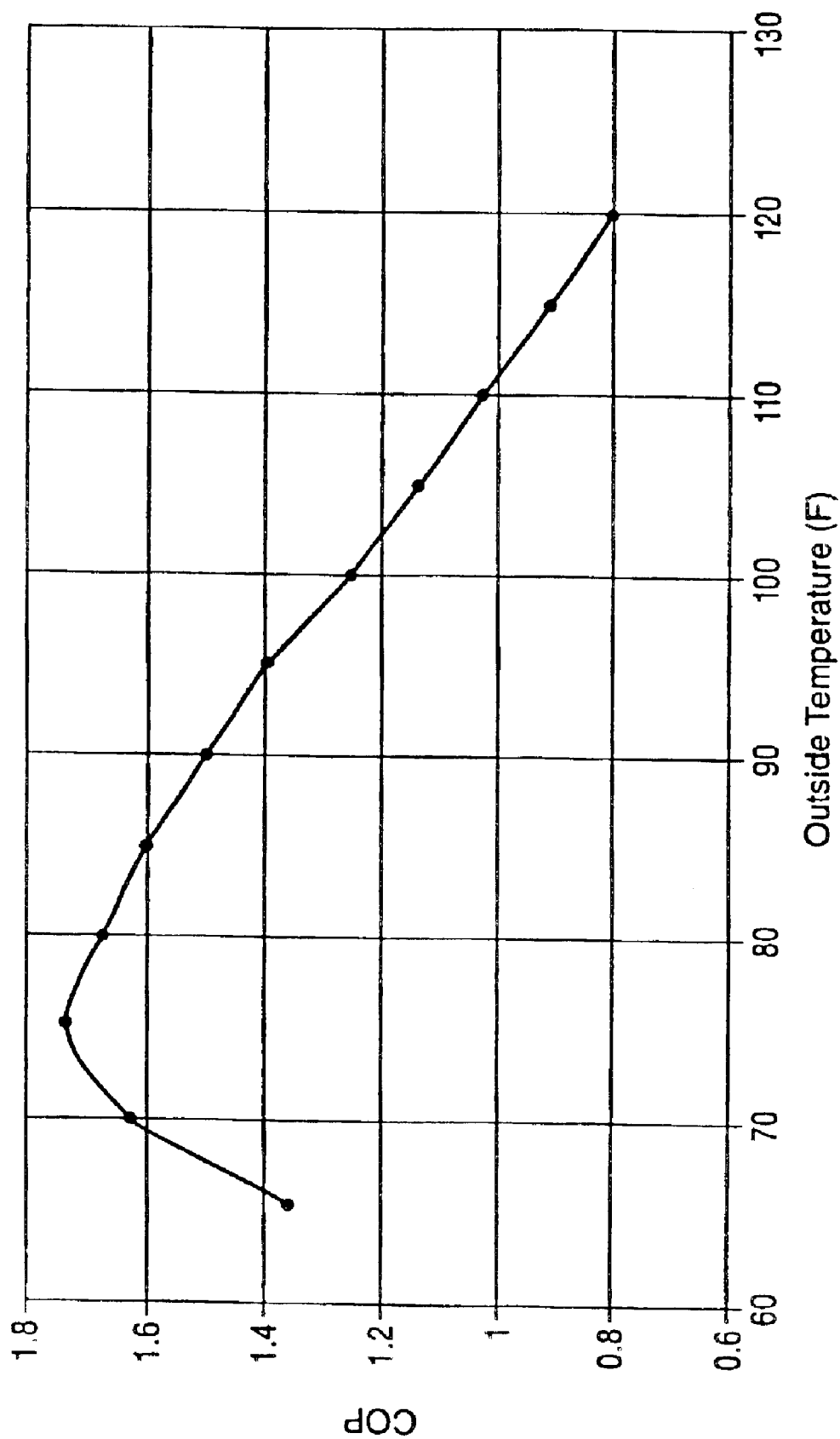
FIG. 27 is a graph of the cooling evaporator to home coefficient of performance (COP) versus the outside air temperature.

As shown in Table 1 below, an ammonia system for a close-coupled heat engine and compressor heat-transfer device with the compressor working fluid (ammonia) providing preheating of the heat engine working fluid provides substantial heating and cooling costs over conventional furnace and heat pump operation. FIGS. 26 and 27 are graphs of the Heating Condensers to House COP vs Outside Temperature and Cooling Evaporator to House COP vs Outside Temperature of the ammonia close-coupled expander-compression heat transfer device.

TABLE 1

COST SAVINGS
Close-Coupled Ammonia Heating and Cooling

| CITY | Albuquerque | Chicago | Dallas/Fort Worth | Nashville |
|---|---|---|---|---|
| Heating Temp (F.) | 18 | 0 | 24 | 21 |
| Cooling Temp (F.) | 93 | 88 | 98 | 92 |
| Ammonia Heating | $771 | $817 | $465 | $669 |
| Furnace Heating | $1,168 | $1,146 | $751 | $1,031 |
| Ammonia Cooling | $412 | $351 | $596 | $467 |
| Heat Pump | $680 | $567 | $997 | $765 |
| Cooling TOTAL SAVINGS | $664 | $546 | $687 | $659 |

It is possible that changes in configurations to other than those shown could be used but that which is shown is preferred and typical. Without departing from the spirit of this invention, various valve and flow arrangements to control flow among the components may be used. It is therefore understood that although the present invention has been specifically disclosed with the preferred embodiment and examples, modifications to the design concerning sizing, shape and valve and flow arrangements will be apparent to those skilled in the art and such modifications and variations are considered to be equivalent to and within the scope of the disclosed invention and the appended claims.

We claim:

1. A heat engine comprising:
   a) a boiler having an inlet and an outlet and connected to receive a working fluid in a liquid state and vaporizing said working fluid to a vapor on input of heat from a boiler, heat-source input heat exchanger;

b) a positive displacement rotating expander with an inlet and outlet and adapted for receiving and expanding said vapor from said boiler outlet at high pressure to produce a work output and providing said vapor at low pressure at said outlet;

c) a condenser having an inlet for receiving said vapor from said expander outlet and condensing said vapor to said working fluid liquid;

d) a pump with an inlet and outlet for taking said working fluid liquid from said condenser at low pressure and providing said working fluid to said boiler inlet at high pressure; and e) at least one of the following:
1) a heat-transfer device for recovering waste heat from said heat engine and using said heat to improve said heat engine efficiency and wherein said heat-transfer device comprises one or more heat exchangers whereby at least one of the following heat transfers occurs:
  a) heat from said working fluid leaving said expander outlet is exchanged to said working fluid to preheat said working fluid prior to entering said boiler; and
  b) work heat from said pump is exchanged to said working fluid to preheat said working fluid prior to entering said boiler;
2) a compression heat-transfer device comprising the following interconnected components:
  a) an evaporator;
  b) a compression device condenser;
  c) a throttling valve; and
  d) a compressor for compressing a compression device working fluid circulating through said interconnected components of said compression heat-transfer device; and
  e) said compression heat-transfer device providing heat to said working fluid of said heat engine; and
3) an absorption heat transfer device comprising the following interconnected absorption, heat-transfer device components:
  a) a generator,
  b) an absorber;
  c) a condenser;
  4) an evaporator; and
  e) a working solution comprising an absorbent and refrigerant; and
  f) said absorption heat transfer device transferring heat to or from said working fluid of said heat engine.

2. The heat engine according to claim 1 wherein said heat-transfer device is one or more heat exchangers whereby at least one of the following heat transfers occurs:
a) heat from said working fluid leaving said expander outlet is exchanged to said working fluid to preheat said working fluid prior to entering said boiler; and
b) work heat from said pump is exchanged to said working fluid to preheat said working fluid prior to entering said boiler.

3. The heat engine according to claim 1 with said compression heat-transfer device comprising the following interconnected components:
a) an evaporator;
b) a compression device condenser;
c) a throttling valve; and
d) a compressor for compressing a compression device working fluid circulating through said interconnected components of said compression heat-transfer device; and
e) a common shaft driven by said heat engine expander and driving said compression heat-transfer device compressor; and
f) wherein at least one of the following heat transfers occurs:
  1) a compressor heat exchanger transfers work heat from said compressor to said heat-engine working fluid coming from said heat-engine condenser; and
  2) a pre-heater heat exchanger containing super-heated working fluid from said compressor transfers heat to said heat-engine working fluid to pre-heat said heat-engine working fluid prior to entering said boiler.

4. The heat engine according to claim 3 further comprising:
a) a heat-source loop with interconnected heat-source loop components comprising:
  1) a heat-source input heat exchanger for receiving heat;
  2) a heat-source loop pump circulating a heat-transfer fluid through said heat-source loop components;
  3) said boiler, heat-source input heat exchanger for transferring heat to said boiler; and
  4) a compression heat-transfer device evaporator heat exchanger for transferring heat to said compression heat-transfer device evaporator; and
b) a heating loop with interconnected heating-loop components comprising:
  1) a heating-loop pump circulating a heat-transfer fluid through said heating-loop components;
  2) a heat-engine condenser heat exchanger for receiving heat from said heat-engine condenser;
  3) a compression heat-transfer device condenser heat exchanger for receiving heat from said compression heat-transfer device condenser; and
  4) a load heat exchanger for transferring heat to a load to be heated.

5. The heat engine according to claim 3 further comprising:
a) a heat-source loop with interconnected heat-source loop components comprising:
  1) a heat-source input heat exchanger for receiving heat;
  2) a heat-source loop pump circulating a heat-transfer fluid through said heat-source loop components; and
  3) said boiler, heat-source input heat exchanger for transferring heat to said boiler;
b) a heat-removal loop with interconnected heat-removal loop components comprising:
  1) a heat-removal loop pump circulating a heat-transfer fluid through said heating loop components;
  2) a heat-engine condenser heat exchanger for receiving heat from said heat-engine condenser;
  3) a compression heat-transfer device condenser heat exchanger for receiving heat from said compression heat-transfer device condenser; and
  4) a heat exchanger for dissipating heat to the environment; and
c) a cooling loop with interconnected cooling-loop components comprising;
  1) an evaporator heat exchanger for transferring heat to said evaporator;
  2) a cooling heat-exchanger for receiving heat from a load to be cooled; and 3) a cooling-loop pump for circulating a heat-transfer fluid through said cooling-loop components.

6. The heat engine according to claim 1 with:
a) said absorption heat transfer device comprising the following interconnected absorption, heat-transfer device components:
1) a generator;
2) an absorber;
3) a condenser;
4) an evaporator; and
5) a working solution comprising an absorbent and refrigerant; and
b) wherein heat is provided to said boiler, heat-source input heat exchanger from at least one of the following:
1) said absorber;
2) said absorption heat-transfer device condenser;
3) said generator; and
4) heat available for input to said generator.

7. The heat engine according to claim 6 wherein said boiler is one or more heat exchangers located in at least one of said absorber and said absorption heat-transfer device condenser.

8. The heat engine according to claim 6 wherein a portion of said generator and a portion of said absorber are in heat-exchange relation with each other.

9. The heat engine according to claim 6 with said generator comprising a generator, heat-source input heat exchanger connected with said boiler, heat-source input heat exchanger for selected delivery of heat to: 1) said boiler; 2) said generator; and 3) both said boiler and said generator.

10. The heat engine according to claim 6 further comprising:
a) a high-temperature heat-exchange loop with interconnected high-temperature loop components comprising:
1) a heat-source input heat exchanger for receiving heat;
2) a high-temperature pump circulating a heat-transfer medium in said high-temperature loop;
3) said boiler, heat-source input heat exchanger for transferring heat to said boiler;
4) a high-temperature loop heat exchanger;
b) an intermediate-temperature heat exchange loop with interconnected intermediate temperature loop components comprising:
1) a heat-engine condenser heat exchanger for receiving heat from said heat-engine condenser;
2) a recuperator;
3) a first intermediate-temperature loop heat exchanger for receiving heat from said high-temperature loop heat exchanger;
4) a generator, heat source input heat exchanger for transferring heat to said generator;
5) a recuperator heat exchanger for transferring heat to said recuperator;
6) a second intermediate-temperature loop heat exchanger; and
7) an intermediate-temperature pump for circulating an intermediate heat-transfer fluid in said intermediate-temperature heat exchange loop;
c) a low-temperature heat-exchange loop with interconnected low-temperature loop components comprising:
1) an absorption heat-transfer device condenser heat exchanger for receiving heat from said absorption heat-transfer device condenser;
2) an absorber heat exchanger for receiving heat from said absorber;
3) a low-temperature loop heat exchanger for receiving heat from said second intermediate-temperature loop heat exchanger;
4) a heat-sink heat exchanger for transferring heat to a heat sink; and
5) a low-temperature pump for circulating a low-temperature heat transfer fluid in said low temperature loop.

11. The heat engine according to claim 6 comprising:
a) a high-temperature heat-exchange loop with interconnected high-temperature loop components comprising:
1) a heat-source input heat exchanger for receiving heat;
2) a first generator, heat-source input heat exchanger transferring heat to said generator; and
3) a high-temperature pump circulating a heat-transfer medium in said high-temperature loop;
b) a second generator, heat-source input heat exchanger transferring heat to said generator; and
c) a low temperature heat-exchange loop comprising the following interconnected components:
1) an absorption heat-transfer device condenser heat exchanger receiving heat from said absorption heat-transfer device condenser;
2) an absorber heat exchanger receiving heat from said absorber;
3) said boiler, heat-source input heat exchanger transferring heat to said boiler;
4) a low-temperature pump for circulating a heat-transfer medium in said low-temperature loop.

12. The heat engine according to claim 6 comprising:
a) a high-temperature heat-exchange loop with interconnected high-temperature loop components comprising:
1) a heat-source input heat exchanger for receiving heat;
2) a first generator, heat-source input heat exchanger transferring heat to said generator;
3) said boiler, heat-source input heat exchanger transferring heat to said boiler; and
4) a high-temperature pump circulating a heat-transfer medium in said high-temperature loop; and
b) a second generator, heat-source input heat exchanger transferring heat to said generator.

13. The heat engine according to claim 12 wherein said interconnected high-temperature loop components further comprise a heat-engine condenser heat exchanger for receiving heat from said heat-engine condenser.

14. The heat engine according to claim 6 with said generator comprising:
a) a substantially first vertical surface separating a first fluid space from a second fluid space;
b) a substantially second vertical surface separating said first fluid space from a third fluid space;
c) said first fluid space containing:
1) said working solution in downward flow; and
2) said refrigerant in vapor form at least partially in upward flow within said downward flowing working solution;
3) substantially horizontal, spaced-apart, fluid distribution plates, each plate having an aperture formed therein;
4) said aperture providing:
(a) downward passage and distribution of said downward flowing working solution; and
(b) upward passage and distribution of said upward flowing refrigerant vapor;

d) said second fluid space containing a first heat-transfer fluid heating said first fluid space; and
e) said third fluid space containing a second heat-transfer fluid transferring heat with respect to said first fluid space.

15. The heat engine according to claim 14 wherein said vertical surface separating said first fluid space from said second fluid space is an open inner cylinder with the center of said cylinder forming said second fluid space and said first fluid space is an annular space formed by an enclosure comprising:
  a) an center portion of said inner cylinder outer surface;
  b) a center portion of an outer cylinder inner surface;
  c) an upper separation plate; and
  d) a lower separation plate.

16. The heat engine according to claim 15 wherein said aperture of each successive spaced-apart fluid distribution plate is located on opposite sides of said annular first fluid space.

17. The heat engine according to claim 14 with said vertical surface separating said first fluid space from said third fluid space comprising a plurality of vertical tubes.

18. The heat engine according to claim 17 wherein said third fluid space formed by interiors of said plurality of vertical tubes opens to:
  a) an annular upper manifold comprising:
    1) an upper portion of an outer cylinder;
    2) an upper portion of an inner cylinder;
    3) a top; and
    4) an upper separation plate; and
    5) a first fluid passage; and
  b) an annular lower manifold comprising:
    1) a lower portion of said outer cylinder;
    2) a lower portion of said inner cylinder;
    3) a lower separation plate;
    4) a bottom; and
    5) a second fluid passage.

19. The heat engine according to claim 1 further comprising a water pump driven by said expander work output and used to pump ground water.

20. The heat engine according to claim 1 further comprising a condenser heat exchanger for exchanging heat from said condenser to ground water.

21. The heat engine according to claim 4 further comprising a heat source for providing heat to said heat-source input heat exchanger.

22. The heat engine according to claim 21 further comprising a backup heat source for said heat source.

23. The heat engine according to claim 22 wherein said heat source or said backup heat source is selected as one of the following: a) solar heat, b) geothermal heat, c) industrial waste heat, d) biomass combustion heat, e) fossil fuel combustion device heat, and f) fossil fuel combustion exhaust heat.

24. The heat engine according to claim 11 further comprising a second heat source for providing heat to said second generator heat-source input heat exchanger wherein said second heat source is a gas burner.

25. The heat engine according to claim 24 wherein said second generator heat source input heat exchanger is a annular tube with an interior side contacting hot combustion products from said gas burner and an exterior side contacting said generator.

26. The heat engine according to claim 11 wherein both said first generator heat-source input heat exchanger and said second generator heat-source input heat exchanger simultaneously transfer heat to said generator.

27. The heat engine according to claim 11 wherein said heat-source input heat exchanger is inoperative and said generator is heated by said second generator heat-source input heat exchanger, said generator transferring heat to said heat transfer medium in said first generator heat-source input heat exchanger which in turn transfers heat to said boiler heat-source input heat exchanger thereby heating said boiler.

28. The heat engine according to claim 1 wherein said working fluid is an organic refrigerant with operating pressures and temperatures lower than operating pressures and temperatures of a water working fluid.

29. The heat engine according to claim 1 wherein said expander is a scroll expander or a gerotor expander.

30. The heat engine according to claim 3 wherein said working fluid circulating in said heat engine components is the same as the working fluid circulating in said compression heat-transfer device components.

31. The heat engine according to claim 30 wherein said working fluid in said heat-engine components and in said compression heat-transfer device components is ammonia.

32. The heat engine according to claim 1 wherein at least one working fluid pump, working solution pump or heat-exchange medium circulating pump is driven by said expander work output.

33. A dual heat-exchange generator for an absorption heat-transfer device comprising:
  a) a first fluid space containing a working solution comprising an absorbent and refrigerant;
  b) a second fluid space in heat exchange relation with said first fluid space and containing a first heat exchange fluid; and
  c) a third fluid space in heat exchange relation with said first fluid space and containing a second heat exchange fluid; and
  d) wherein at least one of said first heat exchange fluid and said second heat exchange fluid or both said first heat exchange fluid and said second heat exchange fluid are used to heat said working solution in said first fluid space.

34. The dual heat-exchange generator according to claim 33 wherein said first fluid space is an annular space formed from an outer cylinder and an inner cylinder with a working solution inlet and a working solution outlet.

35. The dual heat-exchange generator according to claim 34 further comprising a plurality of spaced-part annular baffle plates contained in said first fluid space.

36. The dual heat-exchange generator according to claim 35 with said annular baffle plates formed as open annular sector baffle plates.

37. The dual heat-exchange generator according to claim 36 with successive alternating spaced-apart, open annular sector baffle plates facing in opposite directions.

38. The dual heat-exchange generator according to claim 36 with an interior edge of said open annular sector baffle plates attached to an exterior surface of said inner cylinder and an exterior edge of said open annular sector baffle plates attached to an interior surface of said outer cylinder.

39. The dual heat-exchange generator according to claim 38 wherein said open annular sector baffle plates are oriented in an essentially horizontal direction.

40. The dual heat-exchange generator according to claim 36 with said baffle plates having apertures formed therein for receiving tubular members forming said second fluid space.

41. The dual heat-exchange generator according to claim 40 wherein said apertures are formed as two sets of apertures with a first set of said apertures located near an outer edge of said open, annular sector baffle plates and a second set of said apertures located near an inner edge of said open, annular sector baffle plates.

42. The dual heat-exchange generator according to claim 41 wherein said working solution inlet is located in a lower portion of said first fluid space and said working solution outlet is located in an upper portion of said first fluid space.

43. The dual heat-exchange generator according to claim 42 wherein said working solution enters said working solution inlet, flows between and among said tubular members in an upwardly biased horizontal first direction within an annular space below the first open, annular sector baffle plate, then flows generally upward in the open portion of said first open, annular sector baffle plate; then flows between and among said tubular members in an upwardly biased horizontal second direction between said first, open, annular sector baffle plate and a second open, annular sector baffle plate, in a direction substantially opposite said horizontal first direction, and then flows generally upward in the open portion of said second open, annular sector baffle plate, and then between and among said tubular members in an upwardly biased horizontal direction parallel to said horizontal first direction between said second open, annular sector baffle plate and a third open, annular sector baffle plate, repeating said reversal of said direction between adjacent sets of open, annular sector baffle plates until said working solution emerges from said first fluid space through said working solution outlet.

44. The dual heat-exchange generator according to claim 33 wherein said second fluid space is an interior tubular space formed by the interiors of tubular members.

45. The dual heat-exchange generator according to claim 44 wherein said tubular members are thin-walled, twisted fluted tube having formed therein spiraling crests and flutes on an outer tubular surface and corresponding and respective flutes and crests formed on a respective inner tubular surface.

46. The dual heat-exchange generator according to claim 45 wherein said second fluid space further comprising an upper annular fluid distribution manifold formed by:
  a) an outer cylinder,
  b) an inner cylinder,
  c) an upper end cap,
  d) an upper header plate having apertures formed therein for receiving said tubular members with said tubular members sealed to said header plate said interiors of said tubular members opening into said upper annular distribution manifold; and
  e) said upper annular fluid distribution manifold having a first heat exchange fluid passage.

47. The dual heat-exchange generator according to claim 46 with said upper annular fluid distribution manifold further comprising an annular fluid distribution plate having fluid distribution apertures formed therein.

48. The dual heat-exchange generator according to claim 46 further comprising a lower annular fluid collection manifold formed by:
  a) an outer cylinder,
  b) an inner cylinder,
  c) an lower end cap,
  d) a lower header plate having apertures formed therein for receiving said tubular members with said tubular members sealed to said header plate with said interiors of said tubular members opening into said lower annular fluid collection manifold; and
  e) said lower annular fluid collection manifold having a first heat exchange fluid passage.

49. The dual heat-exchange generator according to claim 48 wherein said first heat exchange fluid passage of said upper annular fluid distribution manifold is an inlet passage for first heat exchange fluid and first heat exchange fluid passage of said lower annular fluid collection manifold is an outlet passage for said first heat exchange fluid.

50. The dual heat-exchange generator according to claim 33 wherein said third fluid space is an interior cylindrical space formed by the interior of an inner cylinder.

51. The dual heat-exchange generator according to claim 50 wherein said third fluid space is an interior annular tubular space formed by a cylindrical insert placed within said inner cylinder.

52. The dual heat-exchange generator according to claim 51 with said cylindrical insert comprising:
  a) a cylindrical base;
  b) a plurality of cylindrical rings successively placed on top of said cylindrical base; and
  c) a cylinder placed on top of said plurality of cylindrical rings.

53. The dual heat-exchange generator according to claim 50 further comprising strips of fins positioned toward the top of said third fluid space.

54. The dual heat-exchange generator according to claim 53 wherein said strips of fins extend radially from said interior of said inner cylinder into said third fluid space.

55. The dual heat-exchange generator according to claim 50 further comprising a burner located at the base of said third fluid space.

56. The dual heat-exchange generator according to claim 55 wherein said burner is a natural gas burner.

57. The dual heat-exchange generator according to claim 33 with:
  a) said first fluid space being an annular space formed from:
    1) an outer cylinder; and
    2) an inner cylinder;
    3) said first space having:
      i) a lower working solution inlet;
      ii) an upper working solution outlet;
      iii) a plurality of horizontal, spaced-apart, open-annular-sector baffle plates with:
        (a) an interior edge of said baffle plates attached perpendicularly to said exterior surface of said inner cylinder;
        (b) an exterior edge of said baffle plates attached perpendicularly to an interior surface of said outer cylinder;
        (c) a first set of radially formed apertures located near said interior edge of said baffle plates with each aperture receiving and aligning a twisted fluted tube;
        (d) a second set of radially formed apertures located near said exterior edge of said baffle plates with each aperture receiving and aligning a twisted fluted tube; and
        (e) with said apertures from said first and second sets alternating with each other about said sector annular baffle plate; and
  4) wherein a working solution
    i) enters said working solution inlet;
    ii) flows between and among said twisted fluted tubes in an upwardly biased horizontal first direction within an annular space below the first open, annular sector baffle plate;
    iii) then flows generally upward in the open portion of said first open, annular sector baffle plate;

iv) then flows between and among said twisted, fluted tubes in an upwardly biased horizontal second direction generally opposite said horizontal first direction between said first, open, annular sector baffle plate and a second open, annular sector baffle plate; and v) then flows generally upward in the open portion of said second open, annular sector baffle plate, and vi) then between and among said twisted fluted tubes in an upwardly biased horizontal direction parallel to said horizontal first direction between said second open, annular sector baffle plate and a third open, annular sector baffle plate; and vii) repeating said reversal of said direction between adjacent sets of open, annular sector baffle plates and between and among said twisted, fluted tubes until said working solution emerges from said first fluid space through said working solution outlet;

b) a second fluid space is an interior tubular space formed by:

1) the interiors of a plurality of said thin-walled, twisted, fluted tubes with spiraling crests on an exterior surface of said tubes and associated flutes on an interior surface of said tubes and with spiraling flutes on said exterior surface of said tubes and associated crests on said interior surface of said tube;

2) an upper annular fluid distribution manifold comprising:
   i) said outer cylinder;
   ii) said inner cylinder;
   iii) an upper end cap,
   iv) an upper header plate having apertures formed therein for receiving said twisted fluted tubes with said twisted fluted tubes sealed to said header plate and with said interior tubular space of said twisted fluted tubes opening into said upper annular distribution manifold;
   v) an annular fluid distribution plate having fluid distribution apertures formed therein; and
   vi) a heat exchange fluid inlet;

3) a lower annular fluid collection manifold comprising:
   i) said outer cylinder,
   ii) said inner cylinder,
   iii) a lower end cap,
   iv) a lower header plate having apertures formed therein for receiving said twisted, fluted tubes with said twisted fluted tubes sealed to said header plate with said interior tubular space of said twisted fluted tubes opening into said lower annular fluid collection manifold; and
   v) a first heat exchange outlet;

c) a third annular fluid space formed by:
   1) said inner cylinder; and
   2) a cylindrical insert placed within said inner cylinder with said cylindrical insert comprising:
      i) a cylindrical base;
      ii) a plurality of cylindrical rings successively placed on top of said cylindrical base; and
      iii) a cylinder placed on top of said plurality of cylindrical rings; and
   3) said third annular fluid space having in its lower portion a fossil fuel burner.

58. The dual heat-exchange generator according to claim 33 wherein:

a) said first fluid space is an annular space formed from an exterior of a first cylinder and an interior of a second cylinder, and a portion of base; with said annular space having an inlet and an outlet;

b) said second fluid space in heat exchange relation with said first fluid space is an annular space formed from an exterior of said second cylinder, an interior of a third cylinder, an annular top and a portion of base and having an inlet and an outlet; and c) said third fluid space, in heat exchange relation with said first fluid space, is an annular space formed from an interior of said first cylinder, an exterior of a fourth cylinder and a portion of base with a fossil fuel burner located in said base portion of said third fluid space.

59. The dual heat-exchange generator according to claim 58 further comprising a separator with an inlet connection from said first fluid space, a vapor outlet, and a solution outlet.

60. The dual heat-exchange generator according to claim 33 wherein:

a) said first fluid space is an annular space having a horizontal section and a vertical section with said horizontal section formed from an exterior of a horizontal portion of a first cylinder, an interior of a horizontal portion of a second cylinder, and a portion of base and open to a vertical section formed from an exterior of a vertical section of said first cylinder, and an interior of a vertical portion of said second cylinder, with said horizontal section having an inlet formed therein and said vertical section having an outlet;

b) said second fluid space is an annular space comprising a horizontal section and a vertical section with said horizontal and said vertical section formed as the interior tube spiral-wrapped about said exterior of said horizontal cylinder and said vertical cylinder and having an inlet and an outlet for said first heat exchange fluid; and c) said third fluid space is a cylindrical space comprising a horizontal section and a vertical section and containing a burner in said horizontal section.

61. The dual heat-exchange generator according to claim 60 further comprising a separator with an inlet connection from said first fluid space vertical section, a vapor outlet, and a solution outlet.

62. The dual heat-exchange generator according to claim 60 further comprising an exhaust distributor attached to the interior wall of vertical section of said vertical cylinder.

63. The dual heat-exchange generator according to claim 33 wherein:

a) said first fluid space is a cylindrical space formed from an interior of a first cylinder;

b) said second fluid space in heat exchange relation with said first fluid space is an interior tubular space formed by a plurality of tubular vertical members opening to an upper manifold with an inlet and a lower manifold with an outlet; and c) said third fluid space, in heat exchange relation with said first fluid space, is an interior tubular space formed from by a plurality of tubular vertical members and having a fossil fuel burner located in a base portion of said third fluid space.

64. The dual heat-exchange generator according to claim 63 further comprising a separator with an inlet connection from said first fluid space, a vapor outlet, and a solution outlet.

65. The dual heat-exchange generator according to claim 63 further comprising a set of alternating sector baffle plates having apertures formed therein for said tubular vertical members forming said second fluid space and said tubular vertical members forming said third fluid space.

66. The heat engine according to claim 2 further comprising a water pump driven by said expander work output and used to pump ground water.

67. The heat engine according to claim 6 further comprising a water pump driven by said expander work output and used to pump ground water.

68. The heat engine according to claim 8 further comprising a water pump driven by said expander work output and used to pump ground water.

69. The heat engine according to claim 2 further comprising a condenser heat exchanger for exchanging heat from said condenser to ground water.

70. The heat engine according to claim 6 further comprising a condenser heat exchanger for exchanging heat from said condenser to ground water.

71. The heat engine according to claim 8 further comprising a condenser heat exchanger for exchanging heat from said condenser to ground water.

72. The heat engine according to claim 5 further comprising a heat source for providing heat to said heat-source input heat exchanger.

73. The heat engine according to claim 72 further comprising a backup heat source for said heat source.

74. The heat engine according to claim 6 further comprising a heat source for providing heat to said heat-source input heat exchanger.

75. The heat engine according to claim 74 further comprising a backup heat source for said heat source.

76. The heat engine according to claim 8 further comprising a heat source for providing heat to said heat-source input heat exchanger.

77. The heat engine according to claim 76 further comprising a backup heat source for said heat source.

78. The heat engine according to claim 10 further comprising a heat source for providing heat to said heat-source input heat exchanger.

79. The heat engine according to claim 78 further comprising a backup heat source for said heat source.

80. The heat engine according to claim 11 further comprising a heat source for providing heat to said heat-source input heat exchanger.

81. The heat engine according to claim 80 further comprising a backup heat source for said heat source.

82. The heat engine according to claim 12 further comprising a second heat source for providing heat to said second generator heat-source input heat exchanger wherein said second heat source is a gas burner.

83. The heat engine according to claim 82 wherein said second generator heat source input heat exchanger is a annular tube with an interior side contacting hot combustion products from said gas burner and an exterior side contacting said generator.

84. The heat engine according to claim 13 further comprising a second heat source for providing heat to said second generator heat-source input heat exchanger wherein said second heat source is a gas burner.

85. The heat engine according to claim 12 wherein both said first generator heat-source input heat exchanger and said second generator heat-source input heat exchanger simultaneously transfer heat to said generator.

86. The heat engine according to claim 12 wherein said heat-source input heat exchanger is inoperative and said generator is heated by said second generator heat-source input heat exchanger, said generator transferring heat to said heat transfer medium in said first generator heat-source input heat exchanger which in turn transfers heat to said boiler heat-source input heat exchanger thereby heating said boiler.

87. The heat engine according to claim 2 wherein said working fluid is an organic refrigerant with operating pressures and temperatures lower than operating pressures and temperatures of a water working fluid.

88. The heat engine according to claim 3 herein said working fluid is an organic refrigerant with operating pressures and temperatures lower than operating pressures and temperatures of a water working fluid.

89. The heat engine according to claim 6 wherein said working fluid is an organic refrigerant with operating pressures and temperatures lower than operating pressures and temperatures of a water working fluid.

90. The heat engine according to claim 2 wherein said expander is a scroll expander or a gerotor expander.

91. The heat engine according to claim 3 wherein said expander is a scroll expander or a gerotor expander.

92. The heat engine according to claim 6 wherein said expander is a scroll expander or a gerotor expander.

93. The heat engine according to claim 4 wherein said working fluid circulating in said heat engine components is the same as the working fluid circulating in said compression heat-transfer device components.

94. The heat engine according to claim 93 wherein said working fluid in said heat-engine components and in said compression heat-transfer device components is ammonia.

95. The heat engine according to claim 5 wherein said working fluid circulating in said heat engine components is the same as the working fluid circulating in said compression heat-transfer device components.

96. The heat engine according to claim 95 wherein said working fluid in said heat-engine components and in said compression heat-transfer device components is ammonia.

97. The heat engine according to claim 2 wherein at least one working fluid pump, working solution pump or heat-exchange medium circulating pump is driven by said expander work output.

98. The heat engine according to claim 3 wherein at least one working fluid pump, working solution pump or heat-exchange medium circulating pump is driven by said expander work output.

99. The heat engine according to claim 6 wherein at least one working fluid pump, working solution pump or heat-exchange medium circulating pump is driven by said expander work output.

* * * * *